US012568069B2

(12) United States Patent
Lim et al.

(10) Patent No.: US 12,568,069 B2
(45) Date of Patent: Mar. 3, 2026

(54) COMMUNICATION LINK

(71) Applicants: Han Chuen Lim, Singapore (SG);
Maotong Liu, Singapore (SG)

(72) Inventors: Han Chuen Lim, Singapore (SG);
Maotong Liu, Singapore (SG)

( * ) Notice: Subject to any disclaimer, the term of this
patent is extended or adjusted under 35
U.S.C. 154(b) by 89 days.

(21) Appl. No.: 18/691,649

(22) PCT Filed: Sep. 13, 2022

(86) PCT No.: PCT/SG2022/050649
§ 371 (c)(1),
(2) Date: Mar. 13, 2024

(87) PCT Pub. No.: WO2023/043368
PCT Pub. Date: Mar. 23, 2023

(65) Prior Publication Data
US 2024/0396880 A1        Nov. 28, 2024

(30) Foreign Application Priority Data

Sep. 17, 2021    (SG) ............................ 10202110284W

(51) Int. Cl.
*H04L 9/40* (2022.01)
*H04L 9/08* (2006.01)
(52) U.S. Cl.
CPC ........ *H04L 63/0428* (2013.01); *H04L 9/0869*
(2013.01)
(58) Field of Classification Search
CPC ... H04L 9/0825; H04L 9/0869; H04L 9/0631;
H04L 9/3247; H04L 63/0428; G06F
21/606

USPC .......................................................... 713/153
See application file for complete search history.

(56) References Cited

U.S. PATENT DOCUMENTS

| | | | |
|---|---|---|---|
| 8,831,222 B2 | 9/2014 | Menoher et al. | |
| 9,009,371 B1 | 4/2015 | Mincher | |
| 9,202,215 B2 * | 12/2015 | Leighton | H04W 12/084 |
| 10,084,600 B1 * | 9/2018 | Irwan | H04L 63/08 |

(Continued)

FOREIGN PATENT DOCUMENTS

| | | |
|---|---|---|
| CN | 111543036 A | 8/2020 |
| WO | 2020118342 A1 | 6/2020 |

OTHER PUBLICATIONS

Korean Intellectual Property Office, International Search Report for
International Patent Application No. PCT/SG2022/050649, Feb. 27,
2023.

(Continued)

*Primary Examiner* — Amare F Tabor
(74) *Attorney, Agent, or Firm* — ICE MILLER LLP;
Justin D. Swindells

(57)        ABSTRACT

A communication link 13 for transferring data between a
computer system 19 and a data handling device 11 for the
computer system is disclosed herein. The communication
link 13 comprises a first unidirectional link 25 for transfer-
ring data from the user computer system 19 to the data
handling device 11 and comprising a hardware encryption
device 53 to encrypt data prior to being received at the data
handling device 11; and a second unidirectional link 27 for
transferring data from the data handling device 11 to the
computer system 19. A computer apparatus 2 including the
communication link 13 is also disclosed herein.

28 Claims, 38 Drawing Sheets

(56) References Cited

U.S. PATENT DOCUMENTS

| | | | |
|---|---|---|---|
| 10,270,745 B2 | 4/2019 | Rotvold et al. | |
| 10,812,457 B1 * | 10/2020 | Ramirez | H04L 67/04 |
| 10,834,057 B1 * | 11/2020 | Ferguson | H04L 63/0428 |
| 10,958,983 B1 * | 3/2021 | Soffer | G09G 5/006 |
| 10,965,646 B2 * | 3/2021 | Clark | H04L 69/22 |
| 11,405,203 B2 * | 8/2022 | Nelson | H04W 12/041 |
| 11,582,204 B2 * | 2/2023 | Vaisband | G06F 21/606 |
| 11,838,409 B2 * | 12/2023 | Fischer | H04L 9/0833 |
| 2008/0052533 A1 | 2/2008 | Lida et al. | |
| 2013/0054957 A1 | 2/2013 | Boring et al. | |
| 2014/0365761 A1 | 12/2014 | Deyoung | |
| 2020/0099519 A1 * | 3/2020 | Kol | H04L 9/0894 |
| 2020/0100106 A1 | 3/2020 | Black et al. | |
| 2021/0250339 A1 * | 8/2021 | Chumura | H04L 9/14 |

OTHER PUBLICATIONS

Korean Intellectual Property Office, Written Opinion for International Patent Application No. PCT/SG2022/050649, Feb. 27, 2023.
Korean Intellectual Property Office, International Preliminary Report on Patentability for International Patent Application No. PCT/SG2022/050649, Jan. 8, 2024.
May 30, 2025 Extended Search Report issued in European Patent Application No. 22870409.4.

* cited by examiner

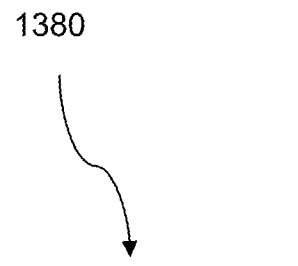
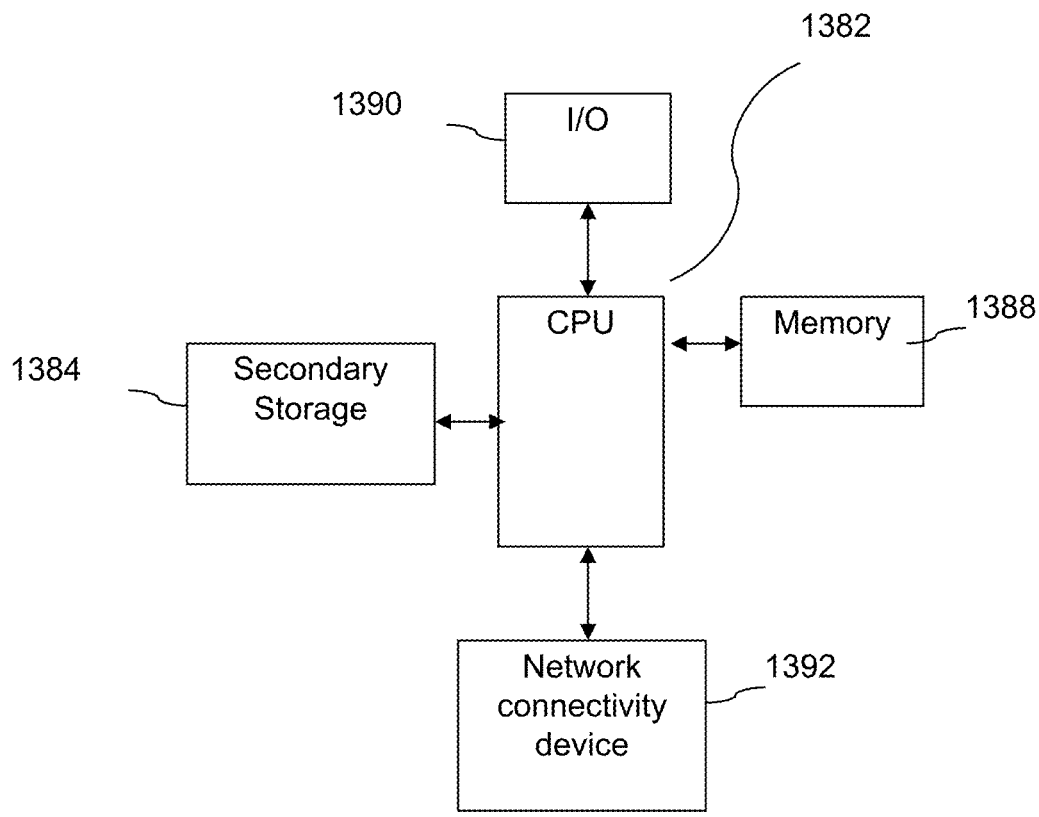
Fig. 1b

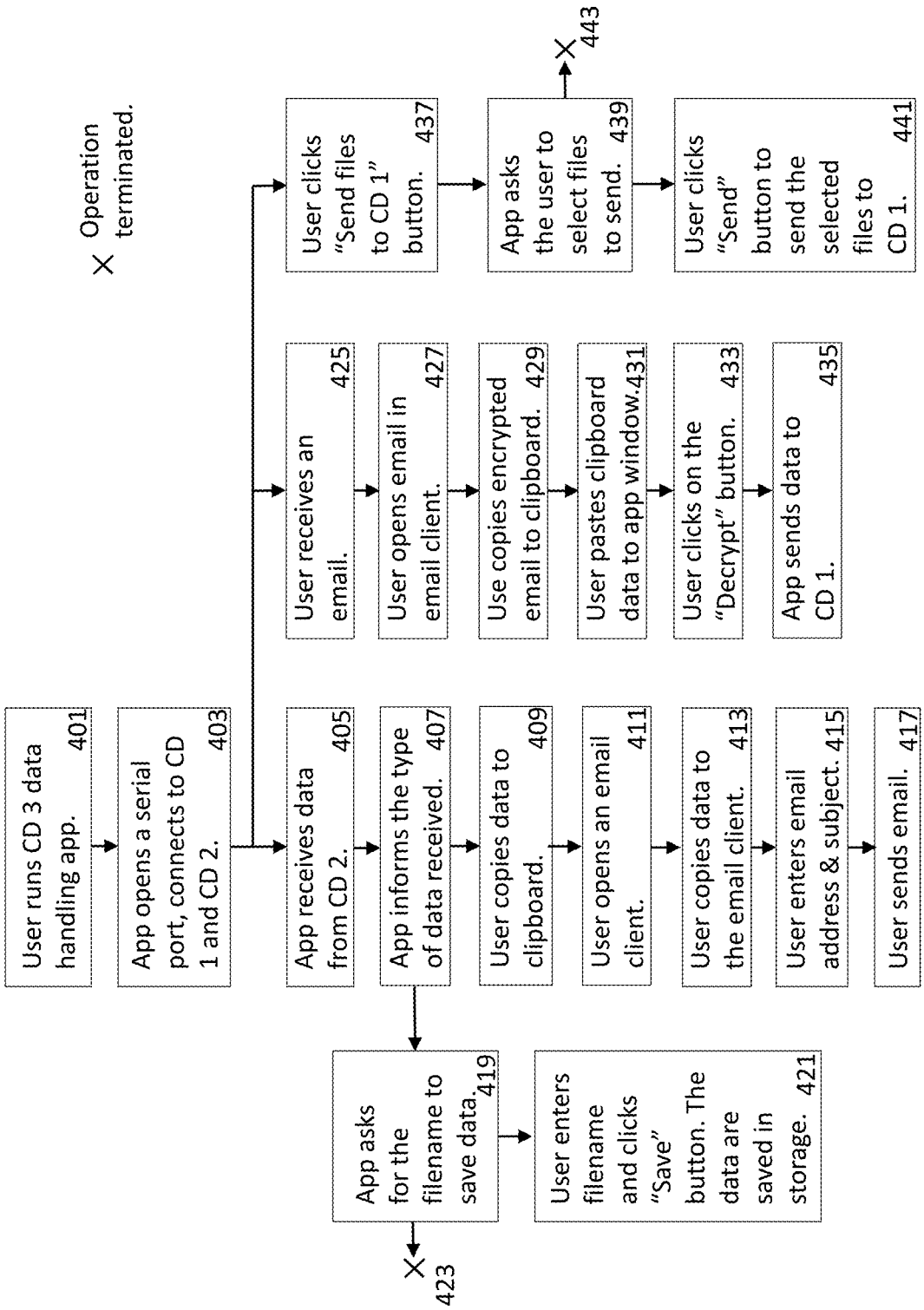

Fig. 4

Operation terminated. 443

User runs CD 3 data handling app. 401

App opens a serial port, connects to CD 1 and CD 2. 403

App receives data from CD 2. 405

App informs the type of data received. 407

User copies data to clipboard. 409

User opens an email client. 411

User copies data to the email client. 413

User enters email address & subject. 415

User sends email. 417

App asks for the filename to save data. 419

User enters filename and clicks "Save" button. The data are saved in storage. 421

423

User receives an email. 425

User opens email in email client. 427

Use copies encrypted email to clipboard. 429

User pastes clipboard data to app window. 431

User clicks on the "Decrypt" button. 433

App sends data to CD 1. 435

User clicks "Send files to CD 1" button. 437

App asks the user to select files to send. 439

User clicks "Send" button to send the selected files to CD 1. 441

Figure 13B:
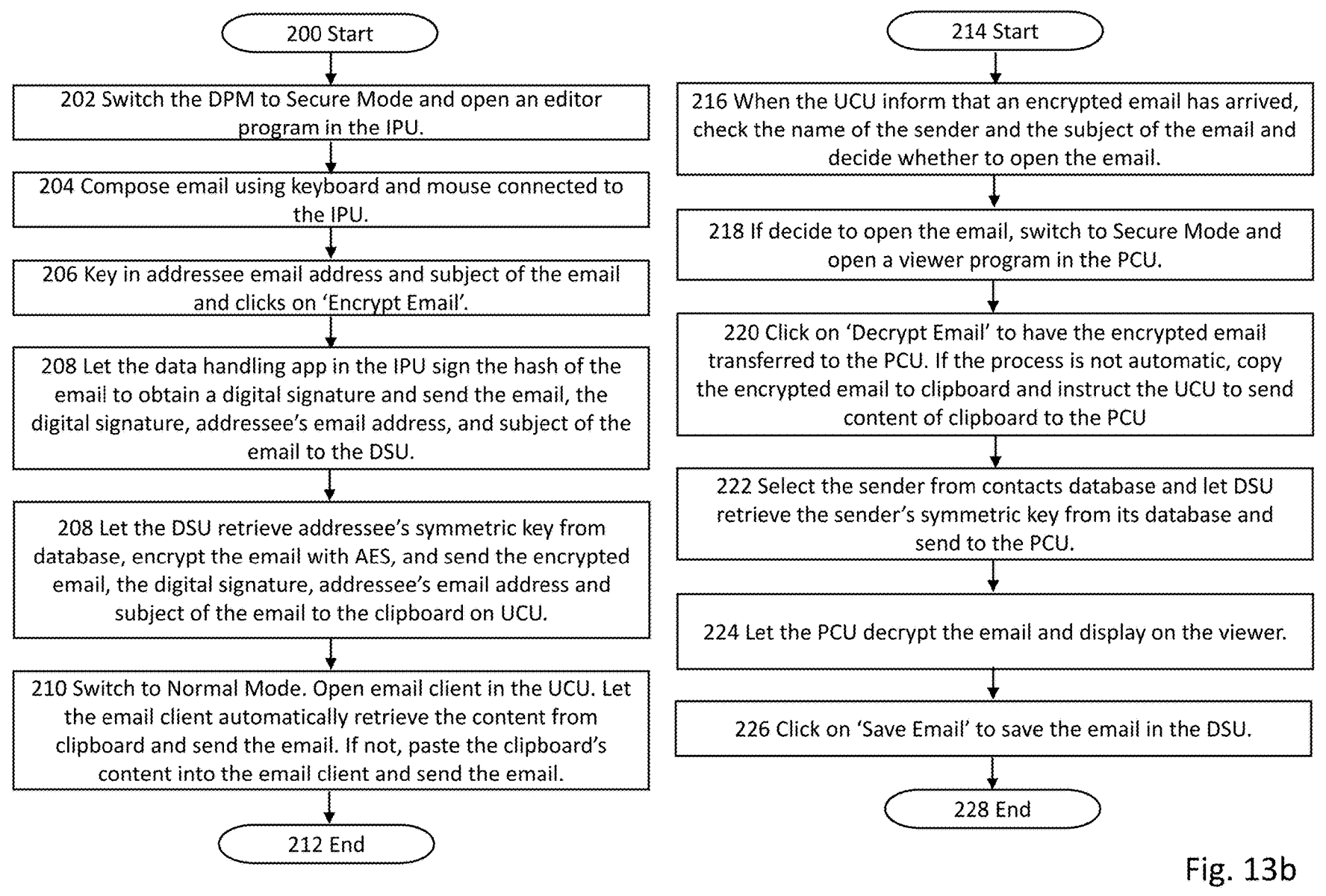

214 Start

216 When the UCU inform that an encrypted email has arrived, check the name of the sender and the subject of the email and decide whether to open the email.

218 If decide to open the email, switch to Secure Mode and open a viewer program in the PCU.

220 Click on 'Decrypt Email' to have the encrypted email transferred to the PCU. If the process is not automatic, copy the encrypted email to clipboard and instruct the UCU to send content of clipboard to the PCU 222 Select the sender from contacts database and let DSU retrieve the sender's symmetric key from its database and send to the PCU.

224 Let the PCU decrypt the email and display on the viewer.

226 Click on 'Save Email' to save the email in the DSU.

228 End

---

200 Start

202 Switch the DPM to Secure Mode and open an editor program in the IPU.

204 Compose email using keyboard and mouse connected to the IPU.

206 Key in addressee email address and subject of the email and clicks on 'Encrypt Email'.

208 Let the data handling app in the IPU sign the hash of the email to obtain a digital signature and send the email, the digital signature, addressee's email address, and subject of the email to the DSU.

208 Let the DSU retrieve addressee's symmetric key from database, encrypt the email with AES, and send the encrypted email, the digital signature, addressee's email address and subject of the email to the clipboard on UCU.

210 Switch to Normal Mode. Open email client in the UCU. Let the email client automatically retrieve the content from clipboard and send the email. If not, paste the clipboard's content into the email client and send the email.

212 End

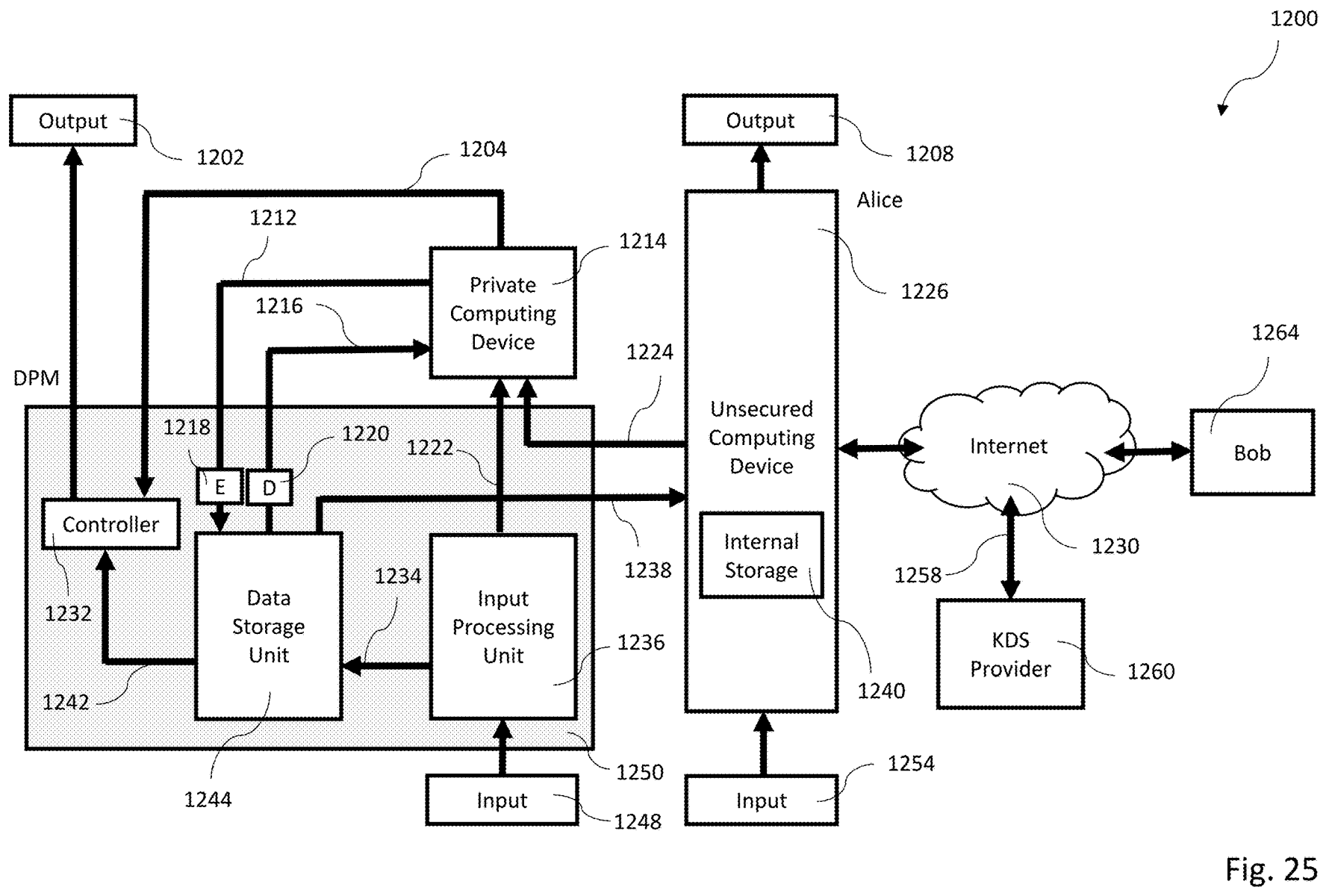

1200

Bob 1264

Internet 1230

KDS Provider 1260

1258

Alice 1208

Output

1226

Unsecured Computing Device

Internal Storage 1240

Input 1254

1214

1224

1238

Private Computing Device

Input Processing Unit 1236

Input 1250

Input 1248

1204

1212

1216

1220

1222

1234

D

E 1218

Data Storage Unit

1244

1242

1202

Output

Controller

1232

DPM

Fig. 25

COMMUNICATION LINK

CROSS-REFERENCE TO RELATED APPLICATIONS

This application is the U.S. National Stage of International Patent Application No. PCT/SG2022/050649, filed on Sep. 13, 2022 and claims benefit of Singapore patent application Ser. No. 10202110284 W filed on Sep. 17, 2021, the entire disclosures of which are incorporated herein by way of reference.

FIELD

This invention relates to a communication link which may be used in data security applications.

BACKGROUND

Malicious software, or malware in short, is a serious threat today. Cybercriminals use spyware such as keyloggers, screen-capturers, etc. to spy on computer users and steal important data such as personal credentials, login passwords, credit card numbers, financial documents, etc. Ransomware attacks are also on the rise in recent years. In these attacks, cybercriminals gain unlawful access to computer users' data and threaten to publicize or sell those data or perpetually block access to critical data unless the victims pay a ransom.

It has become increasingly difficult to detect malware because sophisticated malware can disguise as legitimate software to evade detection based on malware signature or behaviour. There is also malware that exploits zero-day vulnerabilities in operating systems or application software to bypass security measures.

It is desirable to provide an effective and reliable method that protects data from malware.

SUMMARY

In a first aspect, there is provided a communication link for transferring data between a computer system and a data handling device for the computer system. The communication link comprises a first unidirectional link for transferring data from the computer system to the data handling device and comprising a hardware encryption device to encrypt data prior to being received at the data handling device, and a second unidirectional link for transferring data from the data handling device to the computer system. By employing unidirectional links and a hardware encryption device, the communication link may enable the data handling device to provide malware-resistant data handling services (e.g., storage and/or output of data) to the computer system, without requiring malware detection.

The first unidirectional link may transfer first data from the computer system to the data handling device and the second unidirectional link may transfer second data from the data handling device to the computer system. Preferably, the hardware encryption device includes a random number generator for generating encryption keys. In a specific embodiment, the hardware encryption device is configured to receive random bits for use at the hardware encryption device as encryption keys from the data handling device. Preferably, the hardware encryption device is configured not to provide the generated or received encryption keys to the computer system.

In a specific embodiment, the first and second unidirectional links comprise Universal Asynchronous Receiver Transmitter (UART) interface links.

Advantageously, the first unidirectional link further includes a first data diode, and the second unidirectional link includes a second data diode. Specifically, the first data diode may be positioned between the computer system and the hardware encryption device.

In a specific embodiment, the hardware encryption device includes an integrated circuit. Preferably, the hardware encryption device includes an exclusive-or (XOR) logic gate. Advantageously, the hardware encryption device is configured to perform an encryption operation on received data, preferably, via an XOR operation based on Advanced Encryption Standard (AES) counter mode or one-time-pad encryption.

It is envisaged that the second unidirectional link may comprise a hardware decryption device to decrypt data prior to being received at the computer system. Advantageously, the second data diode (if present) is positioned between the data handling device and the hardware decryption device. It is envisaged that the hardware decryption device may comprise an integrated circuit.

In a specific embodiment, the communication link further includes a network interface in first unidirectional communication with the computer system, and second unidirectional communication with the data handling device, wherein the first unidirectional link is configured to transfer data from the network interface to the computer system, and wherein the second unidirectional link is configured to transfer data from the data handling device to the network interface.

In a second aspect, there is provided a computing apparatus including at least one user computer system; a data handling device for the at least one user computer system; and at least one communication link for transferring data between the computer system and the data handling device. The communication link comprises a first unidirectional link for transferring data from the user computer system to the data handling device and comprising a hardware encryption device to encrypt data prior to being received at the data handling device, and a second unidirectional link for transferring data from the data handling device to the user computer system. Preferably, the computing apparatus comprises only the at least one communication link between the data handling device and the at least one user computer system, i.e., no other communicative connections between the data handling device and the at least one computer system. It is also envisaged that the at least one user computer system may be configured to transfer data out of the at least one user computer system only via the first unidirectional link of the at least one communication link. Further, it is envisaged that the data handling device may be configured not to receive transferred data into the data handling device except via the first unidirectional link of the at least one communication link. It is yet further envisaged that the at least one user computer system may be configured to receive transferred data into the at least one computer system only via the second unidirectional link of the at least one communication link.

It should be appreciated that one or both of the data handling device and the at least one user computer system may be configured to receive direct user inputs.

In a specific embodiment the computing apparatus may comprise: a first user computer system; a second user computer system; a data handling device for the first and second user computer systems; a first communication link for transferring data between the data handling device and the first user computer system, and a second communication link for transferring data between the data handling device and the first user computer system. Each of the first and second communication links comprises a first unidirectional link for transferring data from the respective user computer system to the data handling device and comprising a hardware encryption device to encrypt data prior to being received at the data handling device, and a second unidirectional link for transferring data from the data handling device to the respective user computer system.

In a specific embodiment, the computing apparatus further includes a networked computer system; a third unidirectional link for transferring data from the networked computer system to the at least one user computer system; and a fourth unidirectional link for transferring data from the data handling device to the networked computer system. Preferably, only the fourth unidirectional link is provided between the networked computer system and the data handling device, and wherein only the third unidirectional link is provided between the at least one user computer system and the networked computer system, i.e., no other direct communicative connection is provided between them. It is envisaged that the computing apparatus may further include a network interface in bidirectional communication with the networked computer system and that the fourth unidirectional link is operable to transfer data from the data handling device to the network interface, and the third unidirectional link operable to transfer data from the network interface to the at least one computer system.

In a specific embodiment, the computing apparatus may include a networked computer system that is connected to external network and a communication link for transferring data between the networked computer system and the data handling device, the communication link comprising a first unidirectional link for transferring data from the networked computer system to the data handling device and comprising a hardware encryption device to encrypt data prior to being received at the data handling device, and a second unidirectional link for transferring data from the data handling device to the networked computer system. It is envisaged that the one or more user computer systems may themselves be connected to a network that is isolated from the external network, i.e., an intranet.

In a third aspect, there is provided a method of handling data in a computing apparatus. The computing apparatus comprises at least one user computer system; a data handling device for the at least one user computer system; and at least one communication link for transferring data between the user computer system and the data handling device. The communication link comprises a first unidirectional link for transferring data from the user computer system to the data handling device and comprising a hardware encryption device to encrypt data prior to being received at the data handling device, and a second unidirectional link for transferring data from the data handling device to the user computer system. The method comprises receiving the data at the networked computer system from the network; transferring the data to the at least one user computer system for display to a user; transferring the data to the data handling device via the at least one communication link; and storing the data in the data handling device or in a data storage device connected to the data handling device.

In a fourth aspect, there is provided a method of transmitting data to a network using a computing apparatus. The computing apparatus comprises at least one user computer system; a data handling device for the at least one user computer system; at least one communication link for transferring data between the computer system and the data handling device a networked computer system; a third unidirectional link for transferring data from the networked computer system to the at least one user computer system; and a fourth unidirectional link for transferring data from the data handling device to the networked computer system. The communication link comprises a first unidirectional link for transferring data from the user computer system to the data handling device and comprising a hardware encryption device to encrypt data prior to being received at the data handling device; and a second unidirectional link for transferring data from the data handling device to the user computer system. The method comprises receiving a user input at the at least one user computer system indicating the data to be transmitted; transferring the data to be transmitted from the at least one user computer system to the data handling device via the at least one communication link; transferring the data to be transmitted to the networked computer system from the data handling device; and transmitting, from the networked computer system, the data to be transmitted to the network. In a specific embodiment, receiving a user input at the at least one user computer system comprises receiving the user input at the data handling device and relaying it to the at least one user computer system.

It is envisaged that the method may further comprise sending a public key of an intended recipient of the data and a session key from the data handling device to the at least one user computer system; encrypting, at the at least one user computer system, the data to be transmitted with the session key, and the session key with the public key of the intended recipient; transferring the encrypted data to be transmitted and the encrypted session key to the data handling device from the at least one user computer system via the at least one communication link; and transmitting, from the networked computer system, the encrypted data to be transmitted and the encrypted session key to the network. Preferably, the method further comprises removing the hardware encryption by the hardware encryption device of the at least one communication link at the networked computer system. In a specific embodiment, the hardware encryption of the data to be transmitted may be converted from a first encryption type to a second encryption type at the data handling device. It is envisaged that the method may further comprise labelling the data to be transmitted with a tag at the at least one user computer system and identifying the tag at the data handling device to determine how the data to be transmitted is to be handled at the data handling device.

In a fifth aspect, there is provided a method of authenticating a user using a computing apparatus. The computing apparatus includes at least one user computer system; a data handling device for the at least one user computer system; and at least one communication link. The communication link comprises a first unidirectional link for transferring data from the user computer system to the data handling device and comprising a hardware encryption device to encrypt data prior to being received at the data handling device; and a second unidirectional link for transferring data from the data handling device to the user computer system. The method of authenticating the user includes receiving a nonce at the at least one user computer system from a verifier; displaying it to the user at the at least one user computer system;

inputting, by the user, the nonce at the data handling device;

performing, at the data handling device, a cryptographic operation using the nonce and a user password and transmitting an output of the cryptographic operation to the verifier for authentication of the user. In a specific embodiment, the method further includes inputting, by the user, the password at the data handling device. In a further specific embodiment, the data handling device includes a data storage device, and the method further comprises retrieving, by the data handling device, the password from the data storage device.

In a sixth aspect, there is provided a computing apparatus comprising a networked computer system; a user computer system; a first unidirectional communication link for transferring data from the networked computer system to the user computer system; a data handling device; a data handling communication link between the user computer system and the data handling device and configured to transfer data between the user computer system and the data handling device; a second unidirectional communication link for transferring data from the data handling device to the networked computer system; and at least one peripheral input device in communicative connection with the data handling device. Preferably, the data handling device is configured to receive data from the user computer system only in response to a command being received at the peripheral input device. In a specific embodiment, the data handling device is configured to store received data in encrypted form at the data handling device. Alternatively, or additionally, the computing apparatus further includes a storage device connected to the data handling data and the data handling device is configured to transmit data received by the data handling device to the storage device in encrypted form for storage in the storage device.

Advantageously, the data handling device is configured to transfer data out of the data handling device only in response to a further command being received at the at least one peripheral input device. In a specific embodiment, the data handling device is configured to transfer a decryption key from the data handling device only in response to a decryption key transfer command being received at the at least one peripheral input device.

Preferably, the data handling communication link comprises a bidirectional communication link for transferring data between the user computer system and the data handling device, and the computing apparatus is configured to encrypt, using an encryption key, all data received by the data handling device from the user computer system via the bidirectional communication link, and wherein the user computer system does not have access to the encryption key.

In a seventh aspect, there is provided a networked computer system; a data handling device; at least one peripheral input device in communicative connection with the data handling device; a bidirectional communication link for transferring data between the networked computer system and the data handling device, wherein the computing apparatus is configured to encrypt, using an encryption key, all data received by the data handling device from the networked computer system via the bidirectional communication link, and wherein the networked computer system does not have access to the encryption key, and further wherein the data handling device is configured to transfer data out of the data handling device to the networked computer system only in response to a command being received at the at least one peripheral input device.

In an eighth aspect, there is provided a data transfer method. The method comprises transferring data via two unidirectional data transfer links in opposite directions between two computing devices, where one of the unidirectional data transfer links is an encrypted link containing hardware that encrypts all data passing through it.

In a specific embodiment, the encryption keys may be generated within the hardware encryption module or provided by an external random bit generator connected to the hardware encryption module or provided by the computing device receiving the encrypted data. In addition, it is preferred that the computing device sending the data does not have access to the encryption and decryption keys. The decryption keys may be kept in the computing device receiving the encrypted data, for example in a data storage drive, or in a removable memory device.

In a specific embodiment, the unidirectional data transfer links of the data transfer method may be implemented with UART (Universal Asynchronous Receiver Transmitter) interfaces. Other unidirectional data transfer protocols such as UDP (User Datagram Protocol) may be used as well.

In a specific embodiment, data diodes such as optocouplers or optical isolators may be used to enforce strict unidirectionality of the data transfer.

In a specific embodiment, the hardware encryption module may be implemented with integrated circuits, for example an FPGA (field programmable gate array). The encryption operation may be implemented with an XOR (exclusive-or) gate with random bits used as keys for one-time-pad encryption. Other forms of data encryption such as AES (Advanced Encryption Standard) may also be used.

In a specific embodiment, a unidirectional link that does not contain a hardware encryption module may contain a hardware decryption module (HDM). Upon receiving encrypted data and decryption key from the data-transmitting computing device, the HDM performs decryption of the data before transferring the decrypted data to the data-receiving computing device. The HDM may be implemented with integrated circuits, for example an FPGA.

Preferably, on a unidirectional data transfer link where data diode is used, the hardware encryption module or hardware decryption module is placed after the data diode, with respect to the direction of data flow, to prevent data traveling to the hardware encryption module or hardware decryption module from re-entering the data-sending computing device. In implementations where such risk is not of concern, their positions may be swapped.

In a ninth aspect, there is provided a method comprising a first computing device and a second computing device. The two computing devices are connected by the data transfer method of the eighth aspect. The first computing device may receive data from the second computing device and other computing devices only via unidirectional links. The second computing device may send data to the first computing device or other computing devices only via unidirectional links. The second computing device may receive data from the first computing device only via a unidirectional encrypted link. This method may prevent data leakage from the first computing device and protects data stored in the second computing device. In more specific terms, the first computing device, where data may be decrypted and displayed, may be protected from spyware and the second computing device, where critical data may be stored, may be protected against ransomware.

In a specific embodiment, the first computing device receives encrypted data, for example an encrypted email or message, from a third computing device that is connected to external network. The first computing device decrypts the received encrypted data and displays the decrypted data on computer screen. The second computing device receives user instruction to send data, for example an email or a message, to a recipient of external network. The second computing device encrypts the data and sends the encrypted data to the third computing device or another computing device that is connected to external network for it to send the data out to external network.

In a specific embodiment, both the first computing device and the second computing device may receive user input data such as commands via peripheral input devices. Alternatively, user input data received from peripheral input devices connected to the second computing device may be relayed to the first computing device.

In a tenth aspect, there is provided yet another method comprising a first computing device and a second computing device. The two computing devices are connected by the data transfer method of the eighth aspect. The first computing device may receive data only from the second computing device via unidirectional links. The second computing device may send data to the first computing device or other computing devices only via unidirectional links. The second computing device may receive data from the first computing device and other computing devices only via unidirectional encrypted links. This method may be particularly secure because the first computing device receives data only from the second computing device and not from others, thus reducing its attack surface. Second, this arrangement facilitates multiple connections to the second computing device, which can now play the role of a hub or a bridge to multiple users.

In a specific embodiment, the second computing device receives encrypted data, for example an encrypted email or a message, from a third computing device connected to external network. The second computing device forwards the encrypted data to the first computing device. The first computing device decrypts the received encrypted data and displays the decrypted data on computer screen. The second computing device receives user input data from peripheral input devices connected to the second computing device. The user input data received from the peripheral input devices may be relayed to the first computing device for display on computer screen. The second computing device receives instruction from the user to send data, for example an email or a message, to a recipient of external network, the second computing device encrypts the data and sends the encrypted data to the third computing device or another computing device that is connected to external network for it to send the data out to external network.

In a specific embodiment, both the first computing device and the second computing device may receive user input data such as commands via peripheral input devices. Alternatively, user input data received from peripheral input devices connected to the second computing device may be relayed to the first computing device.

In a specific embodiment of either the ninth aspect or the tenth aspect, the second computing device may be connected to other computing devices via bidirectional data transfer links without one-way encryption, provided the other computing devices are neither connected to external network nor connected to other computing devices that are connected to external network, nor do they decrypt any data. For example, the second computing device may be connected to a private file server that has no connection to external network via a bidirectional data transfer link without one-way encryption. So long as the file server is not connected to external network or computing devices other than the second computing device, and it does not decrypt any data, it may have the same level of security as the second computing device.

It is envisaged that there may be more than one computing devices that are connected to the second computing device only by the data transfer method of the eighth aspect. Each of these computing devices may perform a different function. For example, a first computing device may be used for decrypting emails and messages received from a third computing device, while a fourth computing device may be used for drafting confidential documents.

It is further envisaged that the ninth aspect and the tenth aspect may be combined into a system comprising a first computing device and a fourth computing device that are connected to a second computing device only by the data transfer method of the eighth aspect. The first computing device may receive data from the second computing device and other computing devices such as a third computing device only via unidirectional links. The second computing device may send data to the first computing device, the fourth computing device, and other computing devices such as the third computing device only via unidirectional links. The second computing device may receive data from the first computing device and the fourth computing device only via a unidirectional encrypted link. The fourth computing device may receive data only from the second computing device via unidirectional links. This may make it more efficient for the first computing device to receive data from the third computing device.

In an eleventh aspect, there is provided yet another method where a first computing device is connected to a first network interface by the data transfer method of the eighth aspect, where data received from the first network interface are encrypted by a hardware encryption module before they can enter the first computing device. The first network interface further connects to one or more computing devices that have connection to external network such that a plurality of users may utilize the functions of the first computing device simultaneously through connecting to the first network interface. Additionally, the first computing device may be connected to a second network interface by the data transfer method of the eighth aspect, where data received from the second network interface are encrypted by a hardware encryption module before they can enter the first computing device. The second network interface further connects to one or more computing devices that have no connection to external network. Encrypted data from a user may be decrypted and processed in one of the computing devices with no connection to external network and the data may be transferred to the first computing device and stored in encrypted form in a storage device connected to the first computing device.

In a specific embodiment, a relay device receives user input data entered via a peripheral input device. The relay device feeds the received user input data into the first computing device through an input interface. Additionally, only commands received via the relay device are allowed to process or transfer the data stored in the storage of the first computing device. Additionally, a second computing device that is connected to the second network interface may receive commands relayed through the first computing device and the relay device. Additionally, only commands received via peripheral input device connected to the second computing device or via relay through the first computing device and the relay device are allowed to transfer data into and out of the second computing device. Additionally, a third computing device that is connected to the first network interface may receive commands either directly from peripheral input device connected to the third computing device or via the relay device and the first computing device. Additionally, the data travelling from a peripheral input device to the relay device may be encrypted.

In another specific embodiment, the first computing device may receive user input data directly from a peripheral input device, without the need for a relay device.

In another specific embodiment, a first computing device and a second computing device are connected by the data transfer method of the eighth aspect, where all data from the first computing device are encrypted by a hardware encryption module before they can enter the second computing device. Additionally, a network interface connects to the first computing device and the second computing device with unidirectional data transfer links, such that the network interface can only send data to the first computing device and only receive data from the second computing device. The network interface is connected to a first network switch such that multiple computing devices may connect to the network interface via the first network switch to send data to the first computing device or to receive data from the second computing device. A second network switch sends computer screen data to the respective users, while a third network switch relays user input data to the second computing device. Preferably, the data being handled by all the network switches are encrypted for security.

In a twelfth aspect, there is provided a method, where receiving data from external network and decrypting data is performed by a first computing device, while encrypting data and sending encrypted data to external network is performed by a second computing device. The two computing devices are connected only by the data transfer method of the eighth aspect, where all data from the first computing device are encrypted by a hardware encryption module before they can enter the second computing device. The first computing device receives encrypted data from external network or from another computing device, via a unidirectional data transfer link. The first computing device may decrypt the encrypted data and display the decrypted data on computer screen. The second computing device receives user input data from peripheral input devices or data from the first computing device encrypted by the hardware encryption module. The second computing device may encrypt data and send the encrypted data to external network or to another computing device that has a connection to external network, via a unidirectional data transfer link. This may ensure that any malware that may reside in received data has no access to the user's private data, which may be vulnerable before encryption.

In a thirteenth aspect, there is provided a method, where displaying and processing of decrypted data is performed by a first computing device, and storage of encrypted data is performed by a second computing device. The two computing devices are connected only by the data transfer method of the eighth aspect, where all data from the first computing device are encrypted by a hardware encryption module before they can enter the second computing device. Unencrypted data are being processed in a first computing device and transferred to a second computing device for storage in encrypted form. The encryption keys are not accessible by the first computing device. Having different computing devices for different tasks, and the two computing devices connected only by the communication method of the eighth aspect, any malware that may enter the first computing device may have no direct access to the data stored in encrypted form in the second computing device.

In a specific embodiment, the second computing device may, without decrypting the stored data, process the stored data or transfer the stored data to the first computing device, upon receiving a command from the user directly via peripheral input interface of the second computing device. The keys needed for decryption are transferred to the first computing device together with the encrypted data.

In a fourteenth aspect, there is provided a method comprising a first computing and a second computing device connected only by the data transfer method of the eighth aspect, where all data from the first computing device are encrypted by a hardware encryption module before they can enter the second computing device. The first computing device sends a tag or label of a predetermined number of bytes to the second computing device, where each tag or label represents a piece of information which may be in accordance with a look-up table. The second computing device decrypts the predetermined number of bytes to obtain the tag or label and learns the information conveyed which may be based on the same look-up table. The look-up tables may be preinstalled in the two computing devices. It is envisaged that the size of the tag or label can be as short as 2 bytes, or in certain cases longer, for example 256 bytes. The second computing device may perform an action dependent on the information conveyed by the tag or label. Thus, the received data is converted to a short label in a first computing device and only the short label is sent to the second computing device, and the second computing device is allowed to decrypt the short label to obtain information.

In a fifteenth aspect, there is provided a method of encryption comprising a first computing device and a second computing device. The two computing devices are connected by the data transfer method of the eighth aspect, where all data from the first computing device are encrypted by a hardware encryption module before they can enter the second computing device. A public key of a recipient that has been stored in encrypted form in the second computing device is sent from the second computing device to the first computing device together with a first decryption key and a session key. The session key is used to encrypt data to send to the recipient, where the encryption of data occurs in the second computing device. The first computing device obtains the public key of recipient by decrypting using the first decryption key and uses the public key of recipient to encrypt the session key. The first computing device then sends the encrypted session key back to the second computing device, in the process the encrypted session key is further encrypted by the hardware encryption module. The second computing device forwards the encrypted session key that has been encrypted by the hardware encryption module to a third computing device connected to external network, together with data to the recipient that has been encrypted by the session key and a second decryption key for decrypting the encryption by the hardware encryption module. The third computing device obtains the encrypted session key by decrypting using the second decryption key and then sends the encrypted session key together with the encrypted data to the recipient of external network.

In a sixteenth aspect, there is provided a method of encryption comprising a first computing device and a second computing device. The two computing devices are connected by the data transfer method of the eighth aspect, where all data from the first computing device are encrypted by a hardware encryption module before they can enter the second computing device. The user has data in the first computing device to encrypt and send to a recipient of external network. The user transfers the data to the second computing device. In the process, the data is encrypted by the hardware encryption module. In the second computing device, the encryption by the hardware encryption module may be converted to encryption by a session key generated within the second computing device. The session key is further encrypted by the public key of the recipient by the method of the fifteenth aspect. The user may then send the data encrypted by the session key and the session key encrypted by the public key of the recipient out to the external network.

In a specific embodiment, conversion of encryption may be performed. The encryption by hardware encryption module may be an XOR operation based on one-time-pad encryption. The second computing device receives both the encrypted data and the one-time-pad keys. In the second computing device, the one-time-pad encrypted data is again encrypted by an encryption method such as AES counter-mode using a session key, for example an AES key, and an initialization vector. Subsequently, another XOR operation is performed on the encrypted data using the one-time-pad keys to obtain data encrypted only by the AES counter-mode using the session key and the initialization vector.

In another specific embodiment, the encryption by hardware encryption module may be an XOR operation based on AES counter mode. The second computing device receives from the hardware encryption module the encrypted data, the initialization vector, and the AES key, which may be used directly as session key (i.e., there is no need for further conversion in the second computing device).

In a seventeenth aspect, there is provided a method of user authentication comprising a first computing device and a second computing device. The two computing devices are connected by the data transfer method of the eighth aspect, where all data from the first computing device are encrypted by a hardware encryption module before they can enter the second computing device. The first computing device receives a nonce sent from a verifier and displays the nonce on computer screen. The user reads the nonce and enters the nonce and a password into the second computing device using a peripheral input device connected to the second computing device but disconnected from the first computing device. The second computing device performs a cryptographic operation, for example a hash function, using the nonce and the password and sends the result of the operation to the verifier. The verifier compares the received result of the operation to the expected result, which is obtained independently by the verifier. If the two results are equal, the authentication is successful. In some implementations, the user's password may be stored in the second computing device and there may be no need for user to enter the password during authentication. Thus, two-factor authentication may be implemented and the nonce is sent to the first computing device that may not leak data to external network and the user enters the nonce and password into the second computing device that may be free from malware.

In some embodiments, the disclosed invention may be implemented in the form of a data protection module (DPM). The DPM may comprise one or more input processing units (IPUs), one or more private computing units (PCUs), one or more unsecured computing units (UCUs), one or more data storage units (DSUs), one or more hardware encryptors, one or more hardware decryptors, one or more random number generators (RNGs), one or more non-volatile memory or data storage devices, one or more unidirectional links, and without limitation, a plurality of supporting subsystems, components, cables, input/output interfaces, etc. that are necessary for the DPM to function.

In a further aspect, peripheral input devices such as keyboard, mouse, touchscreen, microphone, webcam, sensors, etc. that take in user inputs are not connected to any computing unit, device or system that has Internet connection. These peripheral input devices are directly connected to an IPU via appropriate input interfaces such as USB, Bluetooth, etc. The IPU is a secure input space consisting of a computing unit that takes input only from peripheral input devices. This ensures that there is no possibility of malware accessing or entering the IPU from the Internet.

In a further aspect of the invention, the IPU is connected to a UCU via a unidirectional link. The UCU is a computing unit that serves as a gateway for the user to access the Internet. The link between the IPU and the UCU is unidirectional to ensure that data can move only from the IPU to the UCU, but not in the opposite direction. This prevents malware from accessing or entering the IPU from the UCU. Important data is preferably always be encrypted in the IPU before they are sent to the UCU, which is an unsecured space. A unidirectional link may be implemented with a data diode such as an optocoupler, an optical isolator over an optical link, or with any other data transmission device, protocol, or method that achieves the same effect.

According to another aspect of the invention, important data such as texts, images, audio, etc. are decrypted only in the PCU, which is a secure private space. The PCU consists of a computing unit that has output interfaces such as HDMI, USB, Bluetooth, etc. for connection to monitor displays, headphones, or speakers. The PCU takes input only from the IPU and the UCU via unidirectional links and it has no output pathway to the Internet. This prevents malware that might reside and hide in the PCU from connecting to command and control (C&C) servers or transferring the user's data back to cybercriminals.

According to another aspect of the invention, important data is preferably always be transferred from the PCU to a DSU for secure storage. Preferably, important data is not saved in the PCU. The DSU comprises a computing unit and non-volatile memory such as hard-disk drive (HDD), solid-state drive (SSD), etc. forming a secure storage space. A unidirectional link enables data to travel from the PCU to the DSU. This link is hardware-encrypted, such that all data that traverse the link are encrypted during transit. The hardwired encryption ensures that no malware can alter or bypass the encryption, even if it is disguised as legitimate software or data. The encryption keys used for the hardware encryption may be obtained from a random number generator (RNG) or from user-provided entropy. The decryption keys may be stored together with the encrypted data in the DSU or in a separate location such as a password-protected thumb drive. Data are never decrypted in the DSU. When the user wishes to view, edit, or process a file stored in the DSU, the user instructs the DSU to transfer the file together with its corresponding decryption key to the PCU where the file may be decrypted. The DSU takes instructions only from the user through the IPU. Since both the DSU and the IPU are free from malware, the DSU may be incorporated in its entirety into the IPU without compromising security.

According to another aspect of the invention, only the user who has direct physical access to the IPU via its input interfaces such as keyboard, mouse, touchscreen, microphone, camera, etc. can issue commands to transfer files into or out of the DSU. In some embodiments, the user may be replaced by a computer program or artificial intelligence (AI). In this case, the computer screen and/or audio data sent to output devices may be provided to the computer program or AI for interpretation, decision making, and action on behalf of the human user.

According to another aspect of the invention, a data handling app, which is a computer program or software, may be activated by the user when there is a need to enter, view or edit private and sensitive data. The data handling app is installed on the IPU, the PCU, the UCU and the DSU, and its role is to interpret and execute the user's commands. The data handling app may be disabled by the user during normal usage not handling important data, such as when surfing the web or playing online games on the UCU.

In the event of a ransomware attack, the PCU and the UCU may become locked by the ransomware, but the data stored in the DSU would remain protected. Since the PCU and the UCU do not store important data, the damage to the user would be minimal. The user can simply reformat the hard drives of the PCU and the UCU and reinstall the operating systems and application software. The files in the DSU may be copied to a clean PCU for malware signature scanning or heuristic analysis when information about the malware becomes available from antivirus software vendors or cybersecurity experts.

The DPM may be implemented in a wide variety of ways in different embodiments. In some embodiments, the UCU may be replaced by an unsecured computing device of the user that has Internet access, for example, a desktop computer, a laptop, a tablet, a smartphone, etc. In some embodiments, the PCU may be replaced by an isolated computing device of the user that is not connected to the Internet. In some embodiments, both the UCU and the PCU may be replaced by the user's computing devices. In some embodiments, there may be more than one PCU, where each PCU has a different role. In some embodiments, the IPU may be replaced by an isolated computing device of the user that is not connected to the Internet. In some embodiments, the DSU may be replaced by one or more removable storage devices of the user that are connected to the IPU.

The DPM may be used to secure private emails, private messaging, teleconferencing, telework, etc. It may be implemented as a secure thin client or a secure thick client for accessing remote servers or cloud services. It may also be used to protect symmetric keys shared with or provided by another party such as a key distribution service provider.

In some embodiments, the DPM may take the form of a printed circuit board with interfaces such as USB, Ethernet, SATA, PCIe, etc. that can be connected to or mounted on a computer motherboard and be enclosed inside the chassis of a server, desktop computer or laptop.

In other embodiments, the DPM may be miniaturized in the form of an integrated chip (IC) or system-on-chip (SoC) that can be embedded into portable computing devices such as laptops, tablets, smartphones, etc.

In some embodiments, the disclosed invention may be implemented in the form of a zone separation module (ZSM) that separates a computer system or a computing network into unsecured and secure zones. In general, the unsecured zone may contain a plurality of unsecured computing devices (UCDs) and unsecured data storage devices that are connected to the Internet, while the secure zone may contain a plurality of private computing devices (PCDs) and secure data storage devices that are not connected to the Internet.

The ZSM may comprise one or more IPUs, one or more hardware encryptors, one or more hardware decryptors, one or more RNGs, one or more unidirectional links, one or more optional network interface cards or routers or network switches, and without limitation, a plurality of supporting subsystems, components, cables, input/output interfaces, etc. that are necessary for the ZSM to function.

The conventional method of using an air gap also separates a computer system or a computing network into an unsecured zone that is connected to the Internet and a secure zone that is isolated from the Internet. Unlike the air gap method, in the embodiments disclosed herein, the user can conveniently and securely transfer files across the two zones, without having to physically connect or disconnect any device or module before or after the file transfer.

In one embodiment, the ZSM may be implemented as a standalone secure data storage product that can be connected to the user's UCD via an interface such as USB, Ethernet, SATA, etc. In another embodiment, the ZSM may be implemented as a secure data storage unit that can be connected to or mounted onto the computer motherboard via a suitable interface such as PCIe, SATA, etc. and be enclosed within the chassis of a server, desktop computer or laptop.

Various embodiments based on the ZSM are possible. In another embodiment, the ZSM may be implemented as a secure network attached storage (NAS) such that a plurality of users may have simultaneous access to it. In another embodiment, the ZSM may incorporate routing or switching functions such that the overall module may be perceived as a router or network switch with secure data storage. In yet another embodiment, the ZSM may be implemented as a secure remote file server and placed on the cloud.

In another embodiment, the ZSM may be implemented as a bridge between an unsecured zone computing device and a secure zone computing device. In another embodiment, the ZSM may be implemented as a bridge between an unsecured zone computing network and a secure zone computing network.

It should be appreciated that the at least one peripheral input device as discussed in the above aspects may receive commands from either a human or a computer program, depending on the design of the overall system. The computer program may be rule-based or AI-based, for example running on an external processor, taking in data from the PCU and analyzing the data before sending commands to the IPU. The peripheral input device may be equipped with an input interface for taking in data and it may comprise a processor such as an FPGA on printed circuit board that is configured to send commands to the IPU via a unidirectional UART connection to the IPU.

It should be appreciated that features relevant to one aspect may be relevant to the other aspects.

BRIEF DESCRIPTION OF THE DRAWINGS

Exemplary embodiments will now be described with reference to the accompanying drawings, in which:

FIG. 1b illustrates an exemplary structure of a computing device of the apparatus of FIG. 1a;

FIG. 2 illustrates communication links of the apparatus of FIG. 1a;

FIG. 4 illustrates a method/operations performed by executing software on a computing device of the apparatus of FIG. 1a;

FIG. 5 illustrates a method/operations performed by executing software on another computing device of the apparatus of FIG. 1a;

FIG. 7 illustrates a method/operations performed by executing software on yet another computing device of the apparatus of FIG. 1a;

FIGS. 9a and 9b illustrate two alternative hardware encryption modules suitable for use with the computing apparatus of FIG. 1a;

FIG. 12 illustrates a third embodiment computing apparatus;

FIG. 13b illustrates a method performed using the computing apparatus of FIG. 13a in order to send and receive an email;

FIG. 25 illustrates a twelfth embodiment computing apparatus in which an unsecured computing unit and a private computing unit in a data protection module are in the form of a user's computing devices;

DETAILED DESCRIPTION OF EMBODIMENTS

Figure 1A:
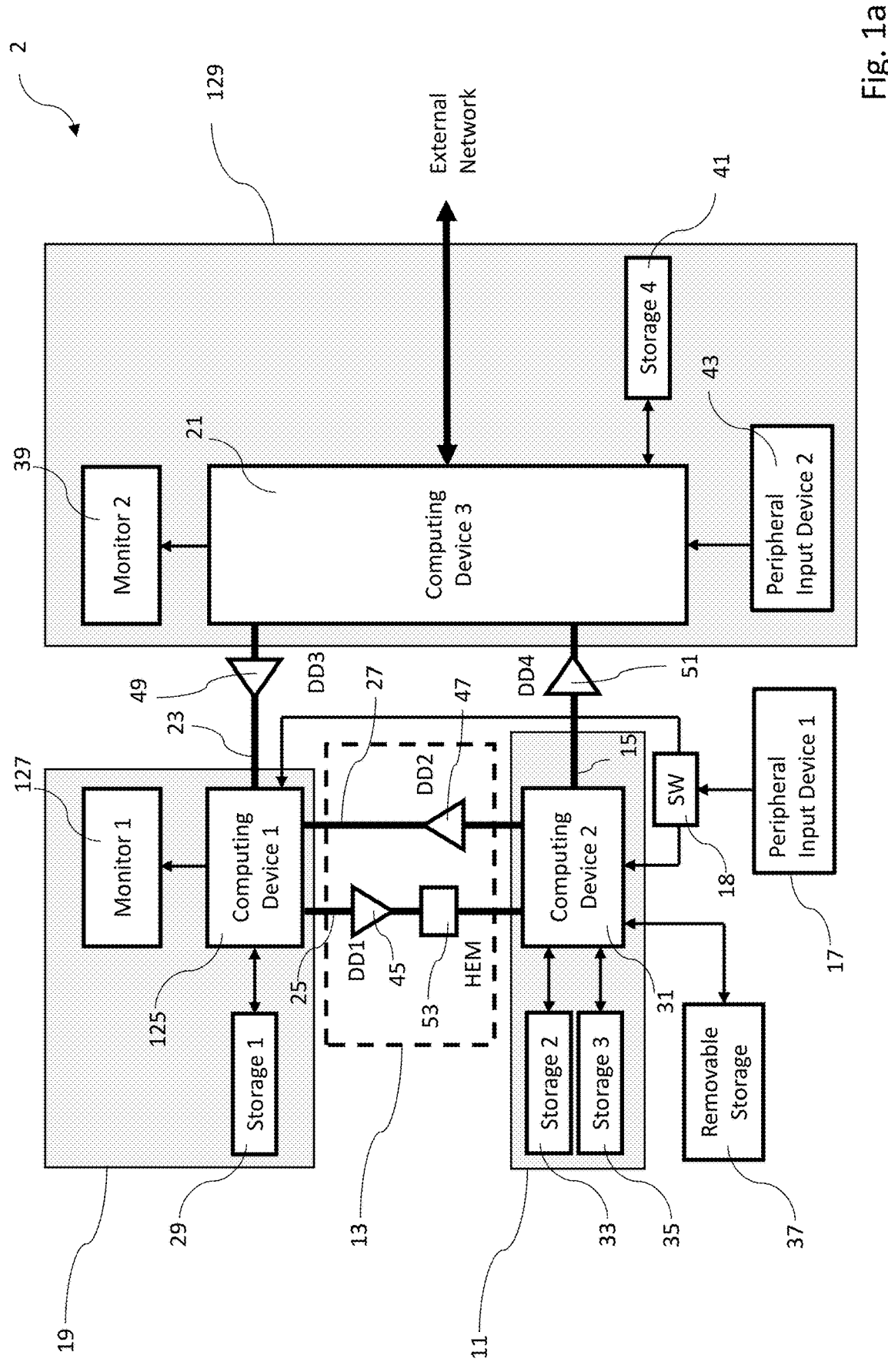
FIG. 1a illustrates a computing apparatus according to a first embodiment.

FIG. 1a illustrates a computing apparatus 2 according to a first embodiment. The computing apparatus 2 includes two computer systems, specifically a user computer system 19 and a networked computer system 129, and a data handling device 11. The networked computer system 129 is in two-way communication with an external network, for example the Internet, by means of which the computing apparatus 2 as a whole is in communication with the external network. In the described embodiment, the user computer system 19 and the data handling device 11 are not in direct communicative connection with any external network.

The user computer system 19 includes a first computing device 125 (also called Computing Device 1, CD1 or private computing unit, PCU). The first computing device 125 may comprise, for example, a laptop or desktop computer, or a single-board computer, such as a Raspberry Pi running the Raspbian operating system (OS) with an exemplary structure 1380 such as that shown in FIG. 1b.

The exemplary structure 1380 includes a processor 1382 (which may be referred to as a central processor unit or CPU) that is in communication with a main memory 1388 and input/output (I/O) interfaces and/or devices 1390. The processor 1382 may be implemented as one or more CPU chips.

The I/O interfaces and/or devices 1390 may include (but are not limited to) an HDMI interface, a VGA interface, one or more USB ports, SATA interfaces, SD card slots, Universal Asynchronous Receiver Transmitter (UART) interfaces, General-Purpose Input/Output (GPIO) pins or other well-known input/output interfaces and/or devices.

The first computing device 125 may further optionally include a secondary storage 1384, and network connectivity devices 1392. As noted above, the user computer system 19 is not in direct communicative connection with any external network and, as such, any network connectivity devices 1392 provide connection to internal networks only.

It is understood that by programming and/or loading executable instructions onto a computing device having the exemplary structure 1380, at least one of the CPU 1382 and the memory 1388 are changed, transforming the computing device in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Specifically, after the computing device having the exemplary structure 1380 is turned on or booted, the CPU 1382 may execute a computer program or application. For example, the CPU 1382 may execute software or firmware stored in the memory 1388 or in another memory device, such as a read only memory (ROM) accessed via the I/O interfaces and/or devices 1390. In some cases, on boot and/or when the application is initiated, the CPU 1382 may copy the application or portions of the application from the relevant storage device to memory space within the CPU 1382 itself, and the CPU 1382 may then execute instructions that the application is comprised of. During execution, an application may load instructions into the CPU 1382, for example load some of the instructions of the application into a cache of the CPU 1382. In some contexts, an application that is executed may be said to configure the CPU 1382 to do something, e.g., to configure the CPU 1382 to perform the function or functions promoted by the subject application. When the CPU 1382 is configured in this way by the application, the CPU 1382 becomes a specific purpose computer or a specific purpose machine.

The memory 1388 may be referred to in some contexts as computer readable storage media and/or non-transitory computer readable media.

The processor 1382 executes instructions, codes, computer programs, scripts which it accesses from hard disk, floppy disk, optical disk, flash drive, accessed via the I/O interfaces or devices 1390 or memory 1388. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from storage devices, for example, hard drives, floppy disks, optical disks, and/or other device, and/or the memory 1388 may be referred to in some contexts as non-transitory instructions and/or non-transitory information.

In an embodiment, the exemplary structure 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

In an embodiment, some or all of the functionality disclosed herein may be provided as a computer program product. The computer program product may comprise one or more computer readable storage medium having computer usable program code embodied therein to implement the functionality disclosed herein. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading at least portions of the contents of the computer program product to the memory 1388, and/or to other non-volatile memory and volatile memory in the structure 1380. The processor 1382 may process the executable instructions and/or data structures in part by directly accessing the computer program product, for example by reading from a CD-ROM disk inserted into a disk drive peripheral to the structure 1380. The computer program product may comprise instructions that promote the loading and/or copying of data, data structures, files, and/or executable instructions to external storage or to the memory 1388, and/or to other non-volatile memory and volatile memory included in the structure 1380.

In some contexts, external storage and the memory 1388 may be referred to as a non-transitory computer readable medium or a computer readable storage media. A dynamic random-access memory (RAM) embodiment of the memory 1388, likewise, may be referred to as a non-transitory computer readable medium in that while the dynamic RAM receives electrical power and is operated in accordance with its design, for example during a period of time during which the computing device is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

The user computer system 19 further includes a first monitor 127 arranged to receive computer screen data from the first computing device 125, for example via an interface such as an HDMI interface or a VGA interface included in the I/O interfaces of the first computing device 125. Additionally, the user computer system 19 includes a first storage device 29, for example, a solid-state drive connected to a USB port, or a microSD card inserted into a microSD card slot, of the first computing device 125.

The data handling device 11 includes a second computing device 31 (also called Computing Device 2, CD2 or input processing unit, IPU), for example a single-board computer also having the exemplary structure 1380 shown in FIG. 1*b* and described above. Again, as noted above, the data handling device 11 is not in direct communicative connection with any external network and therefore, as such, the optional network connectivity devices 1392 of the data handling device 11 (if present) provide connection to internal networks only.

The data handling device 11 also includes a second storage device 33, such as a microSD card inserted into a microSD card slot of the second computing device 31 and which may store the OS and application software for the second computing device 31. Also included in the data handling device 11 is a third storage device 35, for example a solid-state drive or a hard disk drive which may be connected to a USB port or SATA interface included in the second computing device 31 for storing user files in an encrypted form. In the described embodiment, the data handling device 11 further includes an optional removable storage device 37 such as a USB flash drive, or a microSD card, etc. for storing cryptographic keys needed to decrypt user files stored in encrypted form, or user files for the purpose of backup, for example.

The computing apparatus 2 also includes a first peripheral input device 17, for example a Human Interface Device (HID) including a keyboard, a mouse, or some other peripheral input device, and a selector switch 18 (not to be confused with a network switch), for example a USB switch having an input port to which the first peripheral input device 17 is connected. The selector switch 18 is connected to the first computing device 125 as well as the second computing device 31, for example via USB connection from the selector switch 18 to the respective USB ports included in the first computing device 125 and the second computing device 31. The selector switch 18 is configured to be operated by the user and determines the destination for user inputs received at the first peripheral input device 17.

The networked computer system 129 includes a third computing device 21 (also called Computing Device 3, CD3 or unsecured computing unit, UCU, or unsecured computing device, UCD), which for example, may be in the form of a laptop or desktop computer running Windows or Linux OS. Alternatively, it may simply be a router device that provides access to external network. In the described embodiment, the third computing device 21 also has the has the exemplary structure 1380 shown in FIG. 1*b* and described above. However, in contrast to the first computing device 125 and the second computing device 31, the network connectivity devices 1392 of the third computing device 21 include at least one device for connecting to an external network, and, as such, the network connectivity devices 1392 of the third computing device 21 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices.

With such a network connection, it is contemplated that the processor 1382 might receive information from the network or it might output information to the network in the course of performing the herein-described method steps.

Such information, which may include data or instructions to be executed using processor 1382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal. A second monitor 39 is also included in the networked computer system 129 and is arranged to receive computer screen data from the third computing device 21, for example via an interface such as an HDMI interface or a VGA interface included in the third computing device 21. The networked computer system 129 further includes a fourth storage device 41, for storing the OS of the third computing device 21, application software, non-sensitive data such as files downloaded from the Internet, etc. Additionally, the networked computer system 129 includes a second peripheral input device 43, for example a Human Interface Device (HID) including a keyboard, a mouse, or some other peripheral input device which is communicatively connected to the third computing device 21, for example via a USB interface included in the third computing device 21.

The computing apparatus 2 further includes a communication link 13 for transferring data between the user computer system 19 and the data handling device 11, the communication link 13 including a first unidirectional link 25 for transferring data from the user computer system 19 to the data handling device 11 and a second unidirectional link 27 for transferring data from the data handling device 11 to the user computer system 19. The computing apparatus 2 also includes two further unidirectional links, specifically, a third unidirectional link 23 for transferring data from the networked computer system 129 to the user computer system 19, and a fourth unidirectional link 15 for transferring data from the data handling device 11 to the networked computer system 129. Although not shown in FIG. 1*a*, in the described embodiment, the networked computer system 129 optionally utilizes a serial-to-USB adapter 55 via which the third unidirectional link 23 and the fourth unidirectional link 15 are connected to the third computing device 21, the third computing device 21 further including, for example a USB port via which a USB connector of the serial-to-USB adapter 55 is connected. This apparatus will be described in more detail with respect to FIG. 2 below. The four unidirectional links 25, 27, 15, 23 may be optical or electrical communication links.

In the described embodiment, all four unidirectional links 25, 27, 15, 23 each includes an optional data diode, specifically the first unidirectional link 25 includes a first data diode 45, the second unidirectional link 27 includes a second data diode 47, the third unidirectional link 23 includes a third data diode 49 and the fourth unidirectional link 15 includes a fourth data diode 51. For example, each of the four data diodes 45, 47, 49, 51 may include an optocoupler that converts electrical signals to optical signals and then back to electrical signals or alternatively an optical isolator may be used if the transmission link is optical. The first unidirectional link 25 further includes a hardware encryption module 53, which, in the described embodiment, includes an integrated circuit such as a field programmable gate array (FPGA) 81 on a printed circuit board which will be described in more detail below.

It should be appreciated from FIG. 1*a* that by virtue of having only unidirectional links between the user computer system 19, the data handling device 11, and the networked computer system 129 (i.e., the four unidirectional links 25, 27, 15, 23) the only means of transferring data directly between the user computer system 19 and the data handling device 11 is via the communication link 13. Further, the only mechanism of transferring data out of the user computer system 19 is via the first unidirectional link 25 and the data handling device 11, and the only mechanism of transferring data into the data handling device 11 is also via the first unidirectional link 25 (note that, as used herein, the term "transferring data" is not intended to encompass the receipt of user inputs via the two peripheral input devices 17, 43). As such, receiving transmitted data at the data handling device 11 is performed only via the user computer system 19 and the communication link 13, and transmitting data from the user computer system 19 is performed only via the communication link 13 and the data handling device 11.

Likewise, only the third unidirectional link 23 is provided for transferring data from the networked computer system 129 to the user computer system 19 and only the fourth unidirectional link 15 is provided for transferring data from the data handling device 11 to the networked computer system 129.

It should be appreciated that in variations of the described embodiment, multiple communication links of the same type may be connected in parallel to increase data transfer capacity. For example, more than one communication link 13 may operate in parallel between the user computing system 19 and the data handling device 11. Similarly, for the unidirectional links 23 and 15, there may be multiples of them operating in parallel. Further, there may be more than one user computer system 19 and more than one data handling device 11 that may be connected to one networked computing system 129. Or there may be more than one networked computing system 129 connected to one user computer system 19 and one data handling device 11.

Figure 2:
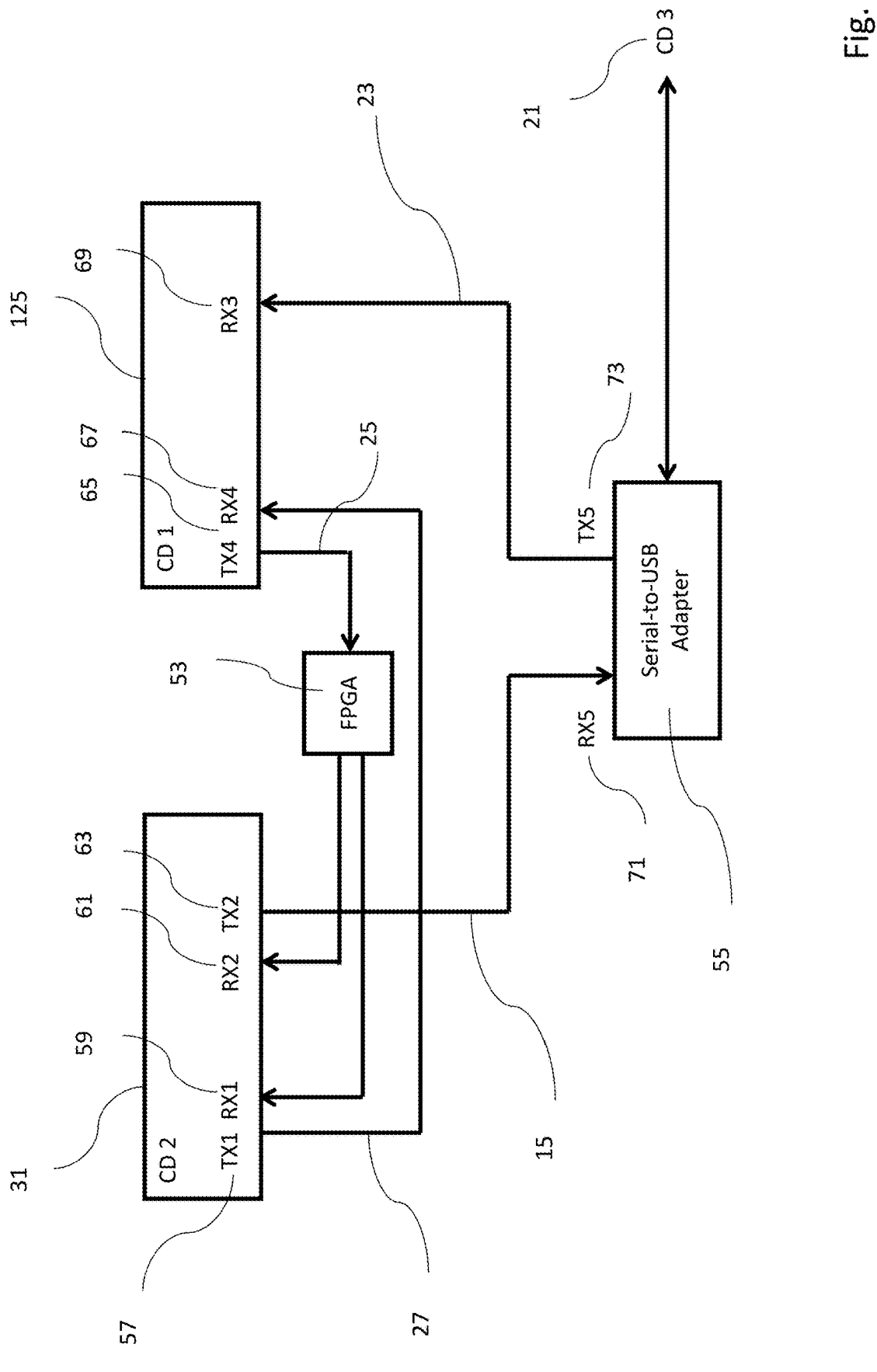

FIG. 2 shows a more detailed illustration of the four unidirectional links 25, 27, 15, 23 (the four data diodes 45, 47, 49, 51 are omitted from FIG. 2 for clarity) which, in the described embodiment are implemented with Universal Asynchronous Receiver Transmitter (UART) interface links. As shown in FIG. 2, in the described embodiment, the second computing device 31 includes first and second UART interfaces, specifically a first UART interface having a first transmitter (TX) pin 57 and a first receiver (RX) pin 59, and a second UART interface having a second TX pin 63 and a second RX pin 61. Similarly, the first computing device 125 includes a third UART interface having a third RX pin 69. It will be appreciated that the first computing device also includes a further, unused, TX pin (not shown), and a fourth UART interface including a fourth TX pin 65 and a fourth RX pin 67. The serial-to-USB adapter 55 includes a fifth UART interface including a fifth TX pin 73 and a fifth RX pin 71. A corresponding device driver installed in the third computing device 21 may create a COM port in the third computing device 21, enabling data to be sent and received via the fifth UART interface.

As noted above, the first unidirectional link 25 includes hardware encryption module 53 and, in the described embodiment further includes a UART link from the fourth TX pin 65 of the first computing device 125 to the two RX pins 59, 61 included in the second computing device 31 via the hardware encryption module 53.

Figure 3:
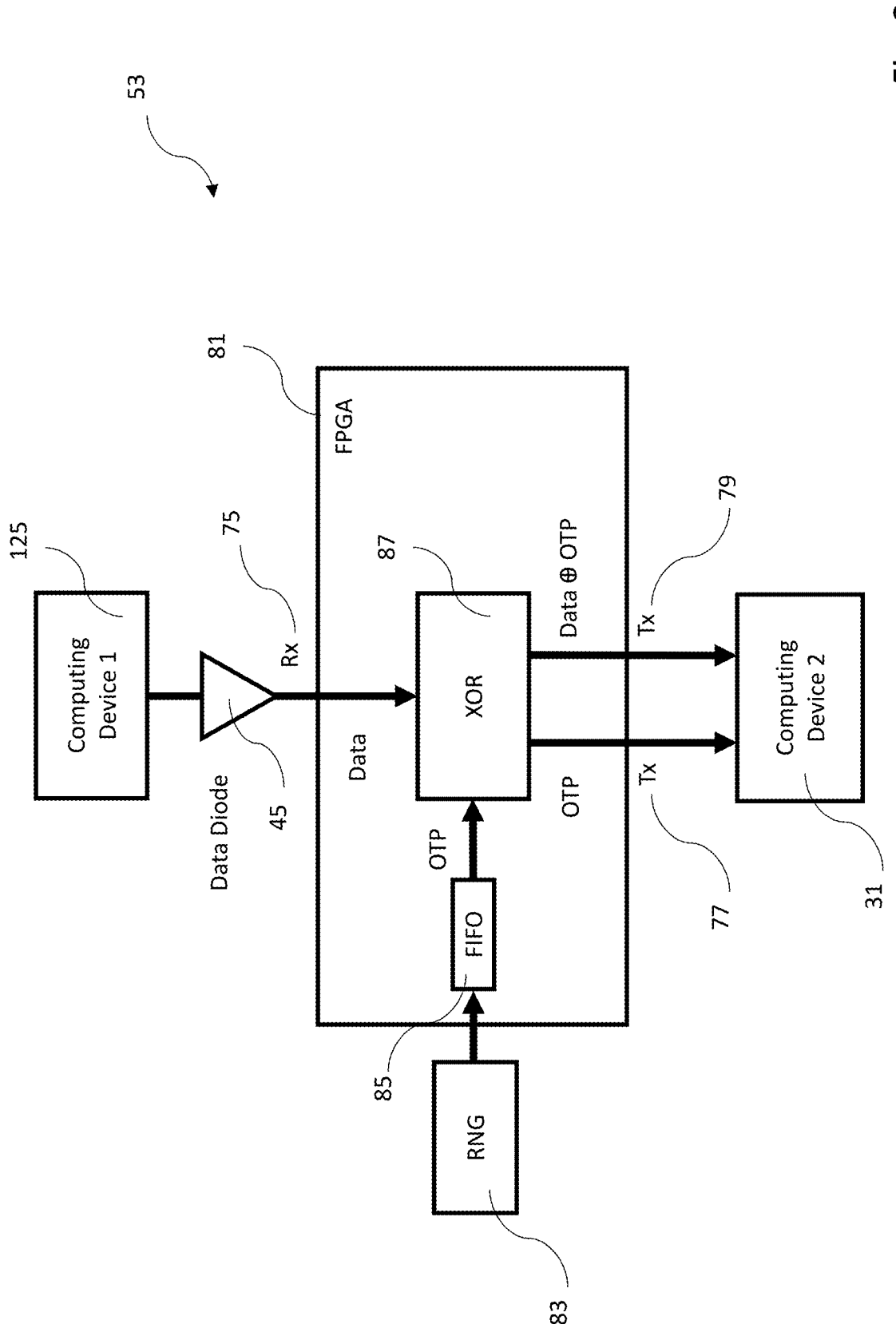
FIG. 3 illustrates a hardware encryption module included in a communication link of FIG. 2.

FIG. 3 illustrates the hardware encryption module 53 in more detail. As discussed above, the hardware encryption module 53 includes an FPGA 81 on a printed circuit board, such as Zedboard™ from Digilent™ or a Spartan™-6 FPGA evaluation board from Xilinx™, or other types of integrated circuit on printed circuit board suitable for implementing digital logic operations. In addition, the hardware encryption module 53 may further include a source of randomness, for example a random number generator (RNG) 83, preferably a quantum random bit generator (QRNG) such as Quantis from IDQ, which may provide true random bits at a rate of 4 Mbps.

The hardware encryption module 53 further includes a HEM RX pin 75 which may be implemented, for example with a General-Purpose Input/Output (GPIO) pin on the FPGA 81 and a first HEM TX pin 77 and a second HEM TX pin 79, both which may also be implemented, for example with GPIO pins on the FPGA 81. A further number of GPIO pins (not shown in FIG. 3) via which the FPGA 81 receives random numbers from the RNG 83 is also included in the FPGA 81. Also included are a first-in first-out (FIFO) memory 85 arranged to take in random bits from the RNG 83 via the further number of GPIO pins and an exclusive-OR (XOR) gate 87 arranged to receive data from both the FIFO memory 85 and HEM RX pin 75 and to output data via both the first HEM TX pin 77 and the second HEM TX pin 79.

As will be appreciated from FIGS. 2 and 3, the fourth TX pin 65 of the first computing device 125 is connected to the HEM RX pin 75, the first HEM TX pin 77 is connected to one of the two RX pins 59, 61 included in the second computing device 31, and the second HEM TX pin 79 is connected to the other of the two RX pins 59, 61 included in the second computing device 31.

In operation, the FPGA 81 may take in random bits from the RNG 83, which are then stored in the FIFO memory 85. The FPGA 81 performs encryption with the XOR gate 87 on data coming from the first computing device 125 (received via the HEM RX pin 75) using random bits retrieved from the FIFO memory 85. In the described embodiment, the encryption operation is a bitwise XOR gate operation on the data bits using the random bits as encryption keys. Henceforth, this process of encryption is referred to as one-time-pad (OTP) encryption and the random bits used for the encryption as an OTP key as they are used only once, and one random bit encrypts one data bit via the XOR gate operation 87. The FPGA 81 then sends the OTP-encrypted data to the first RX pin 59 of the second computing device 31 from the second HEM TX pin 79 and the OTP key to the second RX pin 61 of the second computing device 31 from the first HEM TX pin 77, i.e., over two separate UART interfaces.

Thus, all data being transmitted from the first computing device 125 to the second computing device 31 via the first unidirectional link 25 undergo hardware encryption by the hardware encryption module 53. The role of the data diode 45 placed between the first computing device 125 and the FPGA 81 is to prevent data leakage including the leakage of OTP keys from the FPGA 81 to the first computing device 125.

Returning now to FIG. 2, the second unidirectional link 27 comprises a direct UART interface link from the first TX pin 57 of the first computing device 31 to the fourth RX pin 67 of the first computing device 125.

The third unidirectional link 23 comprises a UART interface link from the fifth TX pin 73 of the serial-to-USB adapter 55 to the third RX pin 69 of the first computing device 125.

The fourth unidirectional link 15 comprises a UART interface link from the second TX pin 63 of the second computing device 31 to the fifth RX pin 71 of the serial-to-USB adapter 55.

It should be appreciated, therefore, that in contrast to conventional systems employing UART interfaces in which a pair of TX and RX pins of an UART interface is typically connected to another pair of RX and TX pins of another UART interface of another computing device for bidirectional UART communication, in the described embodiment, the fifth TX pin 73 is connected to the first computing device 125, whereas the fifth RX pin 71 is connected to the second computing device 31, thereby achieving unidirectionality in data transfer between the first computing device 31 and the third computing device 21 and between the second computing device 31 and the third computing device 21. It should be appreciated that data diodes may be employed to strictly enforce unidirectionality of the data transfer.

In the described embodiment, data being sent between the three computing devices 125, 31, 21 may be appended with end-of-file (EOF) tags that provide information on the type of data being sent. For example, two bytes of ASCII non-printable characters b'\x1A\x1A' may be used to indicate an email. Similarly, b'\x1B\x1A' may be used to indicate a filename, whereas b'\x1C\x1A' may be used to indicate a non-encrypted file, and so on. Here, the character b in front of each string indicates encoding to bytes, as expressed in Python programming language.

As explained above, in the case of the second computing device 31, the received data is OTP-encrypted. In the described embodiment, software executed on the second computing device 31 computes the XOR of the last two bytes of the OTP-encrypted data and the last two bytes of the OTP key used to encrypt the data to decrypt the EOF tag. In this way, the program can read the EOF tag to know the type of data received and it may be determined at the second computing device 31 how to handle the data. It should be appreciated that other means for identifying the type of data being sent, not limited to the example method given above, may be alternatively employed.

In the described embodiment, separators may be used to separate specific chunks of data and for identification purposes. For example, the filename of a file may be prepended to the file content using a separator such as b'\x1B\x1A' to separate the filename from the file content. Since data received by the second computing device 31 are OTP-encrypted, to obtain the filename, software executed on the second computing device 31 computes and reads the XOR of the OTP-encrypted data and OTP key, two bytes at a time, from the beginning of the received data until the separator is found. Once found, the software is configured to cause the second computing device 31 to understand that the data before the separator give the filename by looking at the type of the separator. Similarly, addressee's email address may be prepended to an email using a different separator such as b'\x1F\x1A'. For security reasons, it is preferable to set a limit to the size of the data chunk before each separator, such as 32 bytes. When no separator is found after 32 bytes, the process of finding the separator is stopped. A lookup table indicating the meaning of each separator may be stored in both the user computer system 19 and the data handling device 11. It should be appreciated that many different variations of the separator method are possible. Also, other means of identifying filenames, email addresses, etc., not limited by the example method given above, may be alternatively employed according to embodiments.

It will be appreciated from FIGS. 1-3 that the only means of outputting data from the user computer system 19 to another computing device is via the first unidirectional link 25, via which all data is hardware encrypted as discussed above. Conversely, the only means of inputting data from another computing device to the data handling device 11 is also via the hardware encrypted first unidirectional link 25. The significance of this will be discussed below.

In operation, each of the two computer systems 129, 19 and the data handling device 11 are configured to perform different functions as part of the computing apparatus 2.

Specifically:

The user computer system 19 receives data from the user as well as the external network (via the networked computer system 129), and is configured to decrypt data, and to display and process decrypted data. It is further configured to allow the user to view and edit private data.

The data handling device 11 is configured to enable the user to input private data and commands, to encrypt data, to send encrypted data to external network (via the networked computer system 129), and to store data in encrypted form making it accessible only to the user.

The networked computer system 129 is configured to enable connection to the external network, i.e. the Internet, to allow the user to surf the web, to download files from the Internet, to receive encrypted data such as messages/emails, to send out data including encrypted messages/emails, and so on.

Thus, computing functions that conventionally are performed within a single computing device are performed in three different computing devices, where each plays a different role and handles data having different privacy and security requirements.

The operation of the two computer systems 129, 19 and the data handling device 11 according to the described embodiment will now be described in detail.

Operation of the Networked Computer System 129

As described above, the networked computer system 129, specifically the third computing device 21 of the networked computer system 129 is connected to an external network, for example the Internet, and configured to allow the user to surf the web and download data from the external network. It is also configured to enable the sending and receiving of encrypted files to and from the external network.

The operations of the networked computer system 129 according to the described embodiment and implemented at least in part by executing software on the third computing device 21 (herein after referred to as CD 3 data handling app) may be captured in the form of a workflow diagram or flowchart. (For naming consistency, the application software running in the computer systems shall be called CD X data handling app hereafter, where X=1, 2 or 3.) The flowchart as illustrated in FIG. 4 shows an example of how the networked computer system 129 may operate.

In step 401, a user runs the CD 3 data handling app on the third computing device 21 of the networked computer system 129.

In step 403, the CD 3 data handling app opens a serial port with the serial-to-USB adapter 55 connecting to both the first computing device 125 and the second computing device 31 and listens for communication coming from the second computing device 31.

In step 405, data are received from the second computing device 31 (i.e., the data handling device 11).

In step 407, the CD 3 data handling app determines the type of data received by reading the EOF tag as described above and informs the user the type of data received by opening a pop-up message box to be displayed on the second monitor 39, asking the user for action, such as whether to display the data or copy the data to clipboard, and providing selection boxes (e.g. in the form of a user-interface) enabling the user to select "yes" or "no".

If the user sees that the data are an encrypted email that the user wishes to send out, the user selects the option "Copy to clipboard" in the selection box and in step 409, the app copies the received data to clipboard.

For example, in step 411, the user may run other software; the user may open an email client application on the third computing device 21, such as Gmail.

In step 413, the user may then enter an instruction for the data received from the second computing device 31 to be copied from the clipboard into, for example, a compose window of the email client application.

In step 415, the user may then enter the addressee's email address and the subject of the email.

Finally, in step 417, the user may then proceed to have the email sent.

If public key cryptography, for example RSA, is used to transport the AES key that encrypts the contents of the email received from the data handling device 11, the email client preferably also sends the public-key-encrypted AES key to the addressee. For multiple addressees, it is important to account for the fact that the public key used to encrypt the AES key is unique to each addressee. To resolve this issue, preferably, the second computing device 31 sends each addressee's email address accompanied by the AES key encrypted with the respective addressee's public key, separated by appropriate separators, such that the email client application may identify them by looking for the separators. If digital signature is used to sign the email, a different separator may be used to enable the email client application to locate the digital signature.

If, on the other hand, the user selects "Save data" in step 407, then in step 419, a pop-up message is displayed requesting the user to enter a filename to save the data.

If the user enters a filename and clicks on the "Save" button, then in step 421, the data are saved in storage, for example to the fourth storage device 41.

If, on the other hand, the user selects "Cancel" in step 419, the operation is terminated.

As noted above, the third computing device 21 may also receive data from the external network and the CD 3 data handling app may also be configured to enable handling of such data for the user.

For example, in step 425, an email may be received via an email client application, for example an email containing encrypted information.

In step 427, the user opens the email. It should be appreciated, however, that the contents may not be able to be read because they are encrypted.

In step 429, the user copies the encrypted contents of the email to a clipboard.

In step 431, the user pastes the copied information, i.e., the clipboard data, into a window of the CD 3 data handling app.

In step 433, the user enters instructions via the window of the CD 3 data handling app or clicks on a "Decrypt" button to instruct the app to send the information to the user computer system 19, i.e., the first computing device 125, for decryption.

In step 435, the CD 3 data handling app then sends the pasted information to the user computer system 19, i.e., the first computing device 125 via the third unidirectional link 23.

For digitally signed emails that arrive with certificates, the received certificates and the digital signatures may be verified in the first computing device 125. The root certificates may be stored in the third storage device 35 and sent to the first computing device 125 when they are both powered on. Alternatively, the root certificates may be stored in the first storage device 29.

In the described embodiment, the CD 3 data handling app is also configured to enable the user to send files from the networked computer system 129 to the user computer system 19, for example files downloaded from the external network and saved to the fourth storage device 41.

Specifically, in step 437, the user keys in a command or clicks on a corresponding button "Send files to CD 1" on the CD 3 data handling app's window to start the process of sending files to the user computer system 19.

In step 439, a message is displayed asking the user to select files from a list of files stored in the fourth storage device 41.

In step 441, if the user selects files, then the application appends an end of file (EOF) tag to each file, as discussed above, and the files are then transmitted to the user computer system 19 via the serial-to-USB adapter 55 and the third unidirectional link 23. In some embodiments, filenames may be prepended to each file with a separator, as discussed above.

Conversely, if the user selects "Cancel" in step 439, then in step 443, the operation is terminated.

Thus, in summary, by executing the CD 3 data handling app on the third computing device 21, the networked computer system 129 is configured to perform the following data transfer functions:

1. Receive data such as files or encrypted emails from the data handling device 11;
2. Send received data such as encrypted emails to the user computer system 19; and
3. Send unencrypted data such as downloaded files to the user computer system 19.

Operation of the User Computer System 19

In contrast to the networked computer system 129, the user computer system 19 is configured to decrypt private data and display the decrypted data on the first monitor 127 for the user's viewing. In the described embodiment, user inputs, for example inputs for editing data on the user computer system 19 are configured to be received via the first peripheral input device 17 and the selector switch 18.

Figure 5:
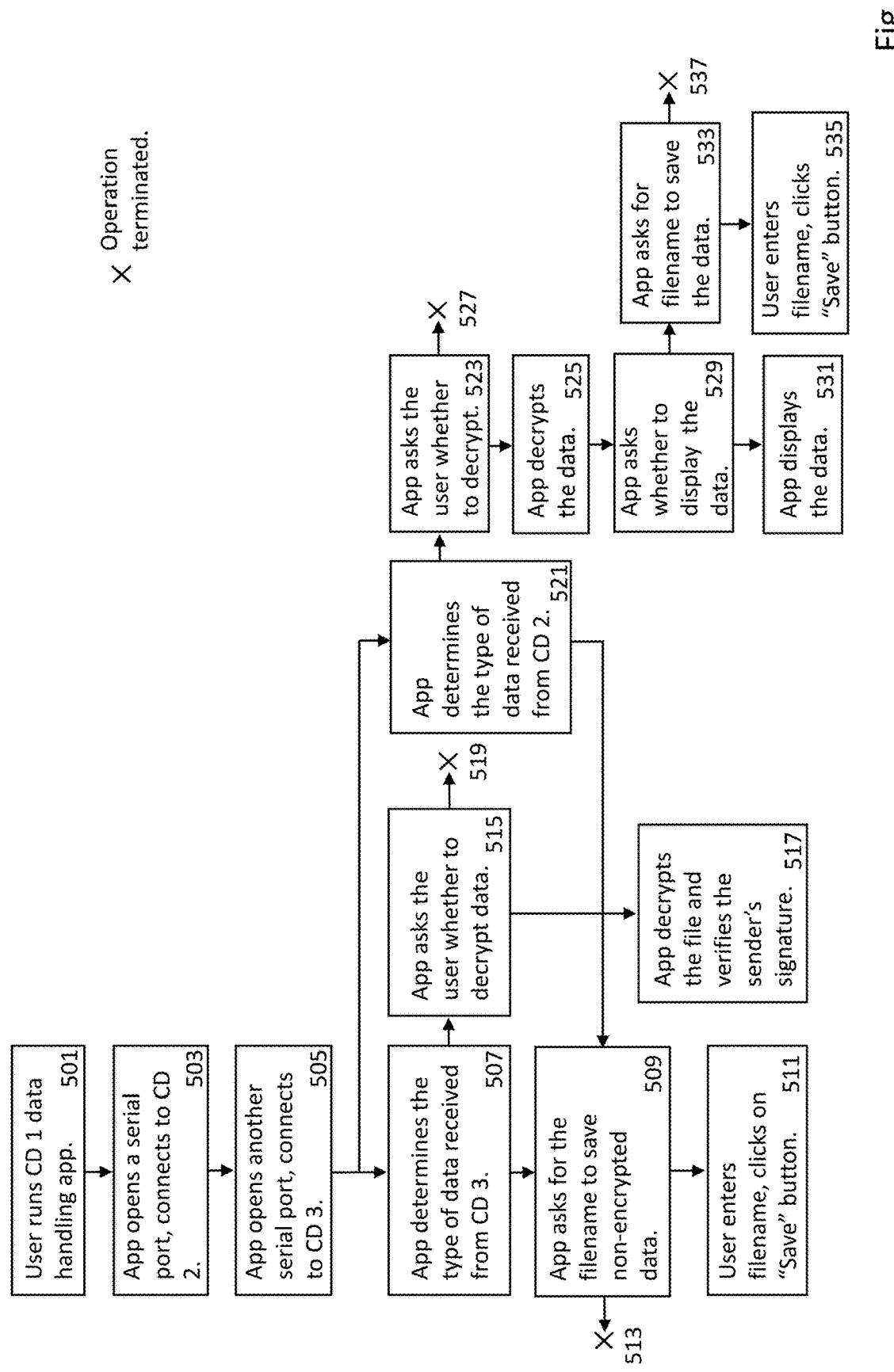

The operations of the user computer system 19 comprises receiving, decrypting, and saving of data, and these operations are performed at least in part by executing software, which in the described embodiment is in the form of a CD 1 data handling app, on the first computing device 125 of the user computer system 19. A flowchart showing an example of how the user computer system may operate is illustrated in FIG. 5.

In step 501, the user runs the CD 1 data handling app on the first computing device 125.

In step 503, the app opens a serial port, comprising the fourth RX pin 67, and listens for data from the data handling system 11.

In step 505, app opens another serial port, comprising the third RX pin 69, and listens for data from the networked computer system 129.

When data arrive from the networked computer system 129, the type of data is determined by reading the EOF tag in step 507.

If the EOF tag indicates that the received data are a non-encrypted file then, in step 509, a message is displayed to the user on the first monitor 127 asking the user for a filename to save the file.

If the user enters a filename, then in step 511, the file is saved to the first storage device 29. If the filename is sent together with the file, the user may instead simply select "Save file" without needing to enter a new filename.

If, on the other hand, the user selects "Cancel", then in step 513, the operation is terminated.

If the EOF tag indicates instead that the file is an encrypted file, then in step 515, a message is displayed to the user on the first monitor 127 asking the user if they want to decrypt the file.

If the user selects "yes", then in step 517, a private key of the user is used to decrypt the file and the sender's signature is verified using a verification key of the sender, in accordance with conventional public key cryptography. A more detailed description of the handling of public key cryptography within the computing apparatus 2 according to the described embodiment is given below. Subsequent steps (not shown) may involve asking the user whether to display or save the decrypted data.

Conversely, if the user selects "no" in step 515, then in step 519, the operation is terminated.

When data arrive from the data handler system 11, the type of file is determined by reading the EOF tag in step 521.

If the EOF tag indicates instead that the file is an encrypted file, then in step 523, a message is displayed to the user on the first monitor 127 asking the user whether to decrypt the file.

If the user selects "yes", then in step 525, the file is decrypted. As will be apparent from FIG. 7 below, in the described embodiment, encrypted files from the data handling device 11 are accompanied by the decryption key, for example an AES key and initialization vector (IV) if the encryption is AES counter-mode. The use of AES keys and IVs will be discussed in more detail below. For example, the last 64 bytes of the transferred data may be reserved for the AES key and the initialization vector (IV), if each takes 32 bytes. Hence, the CD 1 data handling app may simply retrieve the AES key and IV from the last 64 bytes of the data and use them to decrypt the data.

If, conversely, the user selects "Cancel" then in step 527, the operation is terminated.

Whether the data are received from the networked computer system 129 or the data handling device 11, once the data is decrypted, in step 529, a message is displayed to the user asking whether to display the decrypted data on the first monitor 127.

If the user selects "yes" then the data is displayed in step 531, for example in a new pop-up window.

If the user selects "no" then in step 533 a message is displayed on the first monitor 127 requesting a filename for storing the decrypted file in the first storage device 29.

If the user enters a filename, then in step 535, the decrypted file is stored in the first storage device 29.

If, conversely, the user selects "Cancel", then in step 537, the operation is terminated.

Figure 6:
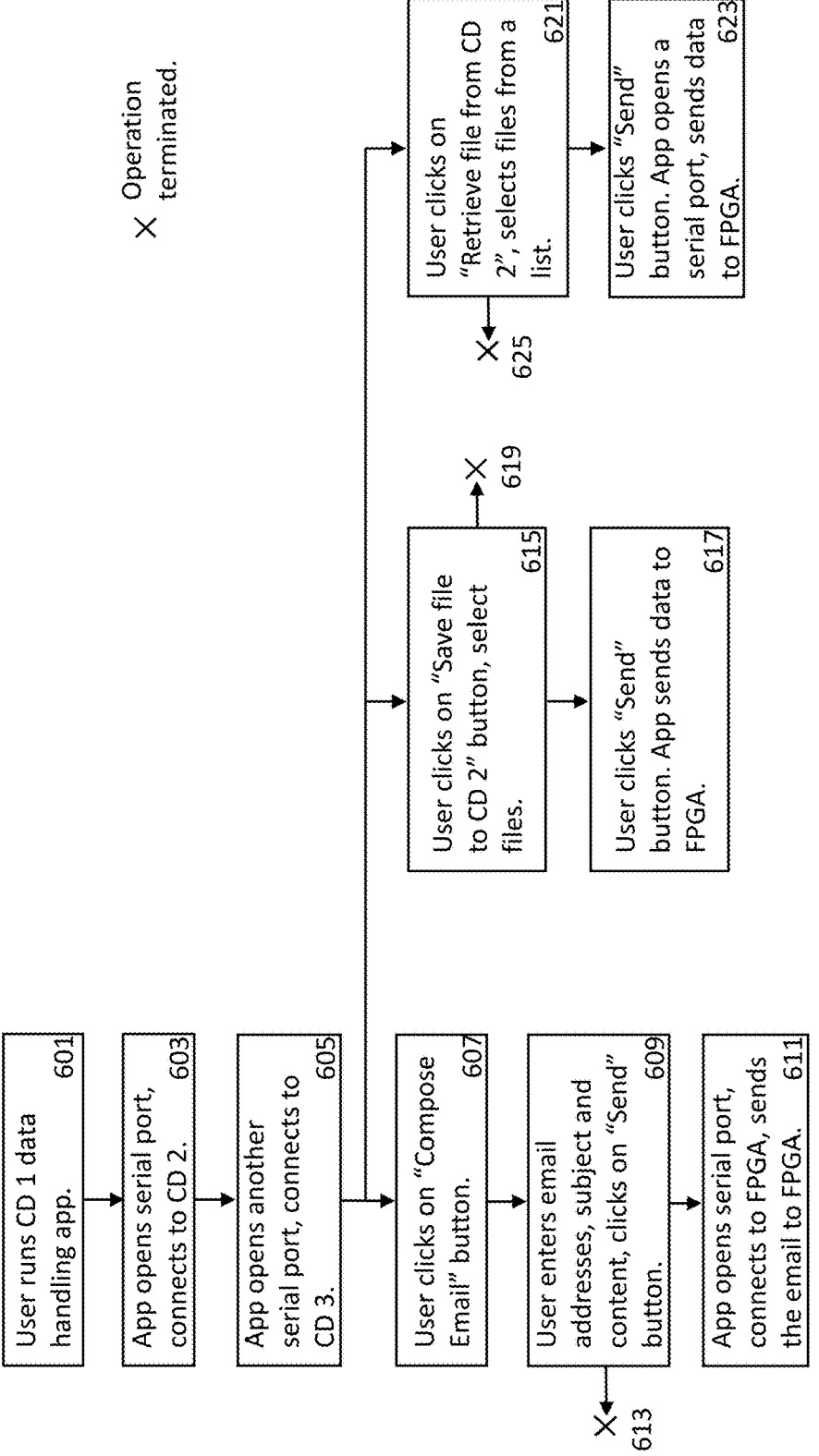
FIG. 6 illustrates another method/additional operations performed by executing software on the same computing device as in FIG. 5.

A further example of operations involving sending files and emails performed at least in part by executing software, which in the described embodiment is again in the form of the CD 1 data handling app, on the first computing device 125 of the user computer system 19 is illustrated in the flowchart of FIG. 6.

In step 601, the user runs the CD 1 data handling app on the first computing device 125.

In step 603, the app opens a serial port, comprising the fourth RX pin 67, and listens for data from the data handling system 11.

In step 605, the app opens another serial port, consisting of the third RX pin 69, and listens for data from the networked computer system 129.

In step 607, the user clicks on the "Compose email" button, a new compose window is opened.

In step 609, the user keys in the email address of addressee, the subject, and composes the email. When done, the user clicks on the "Send" button on the compose window.

In step 611, application appends an EOF tag to the email indicating that the data content is an email and sends the email to the second computing device 31 via the hardware encryptor 53. Additionally, the program prepends the addressee's email address and the subject of the email to the data sent to the second computing device 31. As will be discussed below in relation to FIG. 7, in the described embodiment, in the second computing device 31, these are read from the email before the OTP-encrypted email is converted to AES-encryption. The addressees' email addresses are decrypted so that the program in the second computing device 31 knows who the addressees are such that it may retrieve the corresponding public key of each addressee which are stored in the third storage device 35 and use them to encrypt the AES key.

Conversely, if the use selects "Cancel" in step 609, then in step 613, the operation is terminated.

If the user selects a "Save file to CD 2" button displayed on the first monitor 127, then in step 615, the user is asked to select the files to send to the second computing device 31.

If the user clicks "Cancel", the operation is terminated in step 619.

In step 617, once the user has made the selection, the program prepends each file with the filename followed by a separator, appends an EOF tag to each file, and sends the files to second computing device 31 via the hardware encryption module 53. A record of the filenames of the files saved in data handling device 11 is created in the user computer system 19.

If the user clicks on a "Retrieve file from CD 2" button displayed on the first monitor 127, then in step 621, the user is shown a window containing filenames of the files stored in CD 2. This is possible by virtue of the record of files created in step 617.

If the user clicks "Cancel", the operation is terminated in step 625.

After the user has selected the files to retrieve, in step 623, the program appends an EOF tag to each filename indicating that these data are the names of files that the user wishes to retrieve and sends the data to the second computing device 31 via the hardware encryption module 53.

It should be appreciated that the operations according to FIG. 5 and FIG. 6 may be combined, for example, the user may view data received from the third computing device by performing steps 507, 515, 517, 529, 531 and then may save the displayed data to the data handling device 11 via the subsequent performance of steps 615, 617. It is envisaged that some of the steps described above may be automated, simplified, or modified.

It will be appreciated that various types of data other than those examples described above may be received from the data handling device 11 and the CD 1 data handling app may handle and process these data in different ways.

Thus, in summary, by executing the CD 1 data handling app in the first computing device 125, the following data handling functions are performed:

1. Receiving data from the data handling device 11;

2. Sending data to the data handling device 11 via the hardware encryption module 53; and 3. Receiving data from networked computer system 129.

Operation of the Data Handling Device 11

As described above, the data handling device 11 receives data from the user computer system 19 via a unidirectional data transfer link 25 with a hardware encryption module 53 that encrypts all data passing through it. The data handling device 11 is also connected to the networked computer system 129 via another unidirectional transfer link 51 enabling data such as encrypted emails to be sent to the networked computer system 129 but not to receive data directly from the networked computer system 129. As such, the data handling device 11 has no mechanism to receive raw data from computing or networking devices connected to the Internet.

Figure 7:
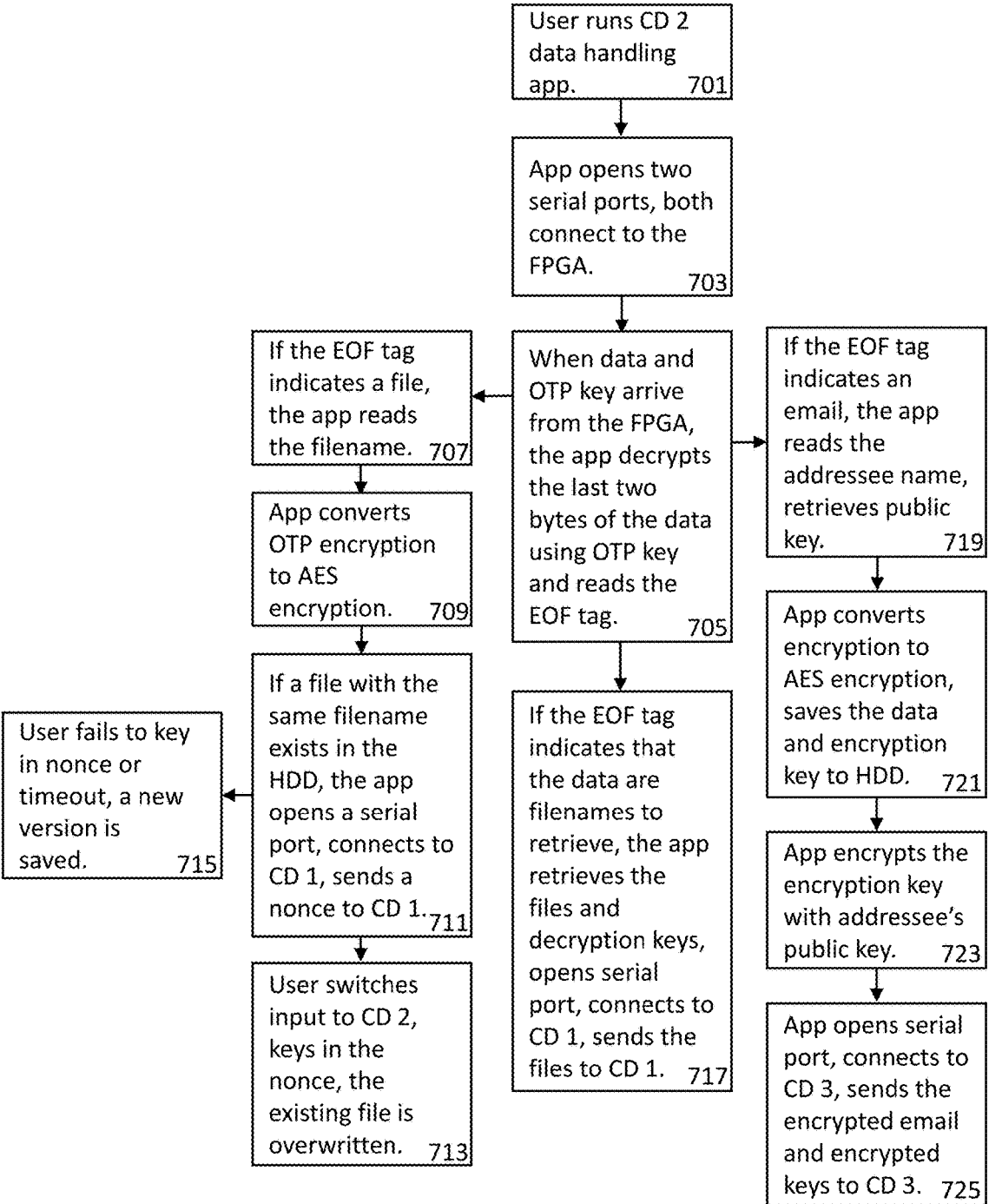

The operations for handling data in the data handling device 11 performed at least in part by executing software, which in the described embodiment is in the form of a CD 2 data handling app, on the second computing device 31 of the data handling device 11 is illustrated in the flowchart of FIG. 7.

In step 701, the user runs the CD 2 data handling app on the second computing device 31.

In step 703, the second computing device 31 opens two serial ports corresponding to the first RX pin 59 and the second RX pin 61 and listens for OTP-encrypted data and the corresponding OTP key coming from the FPGA 81. As will be appreciated from FIG. 3, one serial port is for receiving OTP-encrypted data, while the other serial port is for receiving the OTP key.

When OTP-encrypted data and the corresponding OTP key are received, in step 705 the CD 2 data handling app determines the data type by reading the EOF tag which was obtained by performing an XOR gate operation on the last two bytes of the encrypted data with last two bytes of the OTP key, as described above, to decrypt the EOF tag.

If the EOF tag indicates that the data is a file to be saved to the third storage device 35 then, in step 707, the program reads the filename which is sent together with the data. For example, the filename may be prepended to the file data using a separator such as b'\x1F\x1A' as discussed above. The second computing device 31 only needs to perform the XOR gate operation on the OTP-encrypted data and the OTP key, two bytes at a time, starting from the first two bytes of the received data, until the separator is found. The second computing device 31 may then read the filename.

Figure 8:
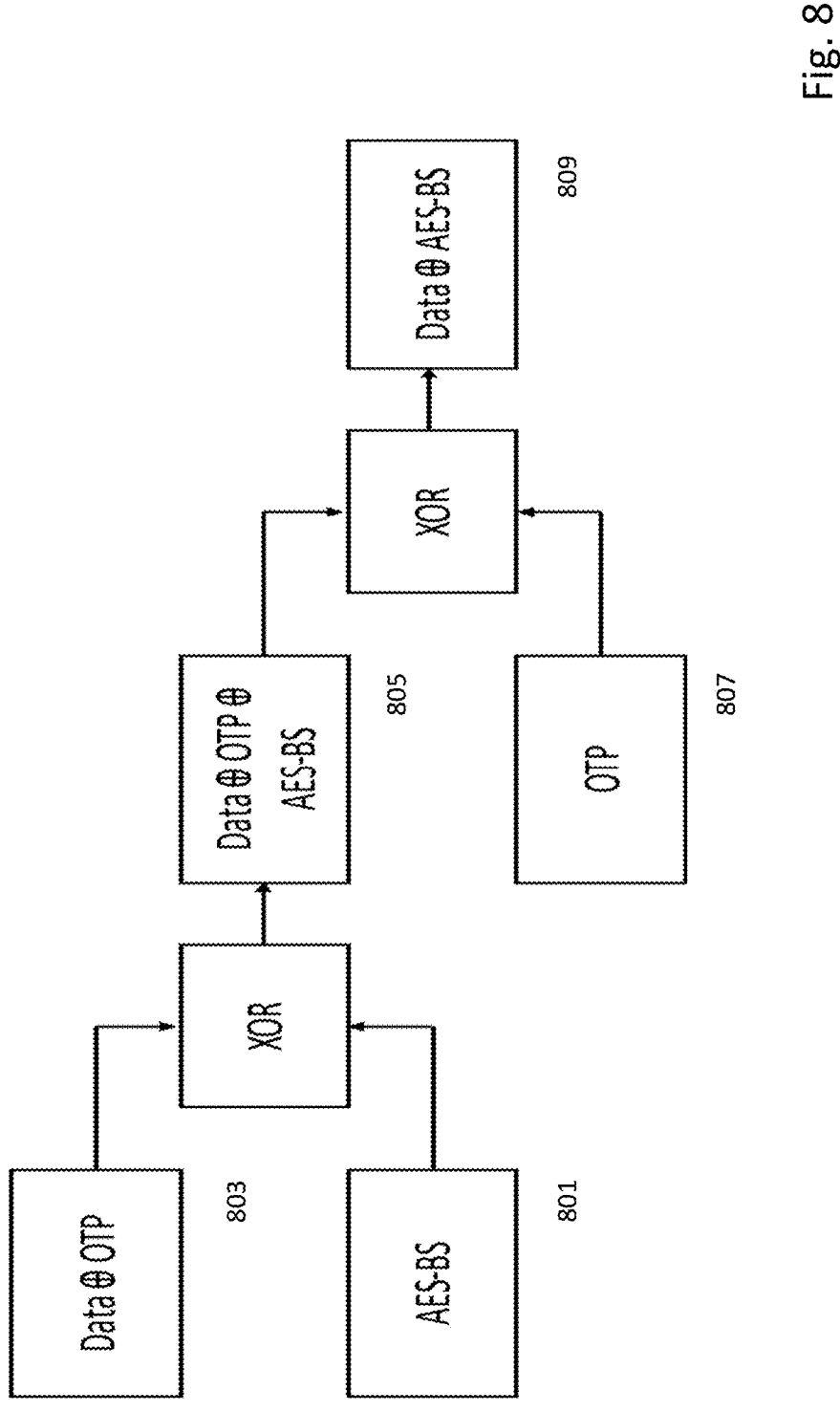
FIG. 8 illustrates a method of converting the type of encryption performed as part of the operations of FIG. 7.

In step 709, before storing the data, and as mentioned above, it may be preferred that the second computing device 31 converts the OTP-encryption to AES encryption. This process is illustrated in FIG. 8.

To achieve conversion without decrypting the OTP-encrypted data, AES counter mode may be used. It should be appreciated that other suitable ciphers may be used as well, and that AES counter mode is described here only as an example. In the counter mode, a random initialization vector (IV) is chosen, and the AES algorithm encrypts the IV producing an AES bit-stream (AES-BS) 801, using an AES key that is either randomly generated for each file or provided by the user. This AES bit-stream is XOR'ed to the OTP-encrypted data 803 to produce AES-OTP-encrypted data 805, which is further XOR'ed to the OTP key 807 to produce OTP-AES-OTP-encrypted data. This cancels the OTP-encryption and produces the AES-encrypted data 809 which is then saved in the third storage device 35. It will be appreciated that, here, the property A XOR B XOR A=B is invoked. AES-encryption may advantageously save storage space relative to OTP-encryption.

A new AES key and a random IV may be generated for each file to be saved, or there can be one "master AES key" for all files. In the latter case, only the IV needs to be stored with the files. Another approach is to have the AES key derived from a "password" provided by the user. In this case, the user may be asked to enter the "password" whenever there is a need for the CD 2 data handling app to use the AES key as the AES key is not stored.

The conversion from OTP-encryption to AES encryption may also save data transfer bandwidth when sending an encrypted file together with its decryption key out from the data handling device 11 to the networked computer system 129 or the user computer system 19 where the file may be decrypted. This is because if the file is encrypted by OTP, then the decryption key (i.e., the OTP key) as big as the size of the file must also be sent to the networked computer system 129 or the user computer system 19, thus taking up considerable data transfer bandwidth.

Returning now to FIG. 7, in the described embodiment, if there is an existing file with the same filename, as a security feature, the program may require user consent to overwrite in step 711. In this step, the CD 2 data handling app causes a nonce to be sent to the user computer system 19 to be displayed in a message box on the first monitor 127.

In step 713, the user switches the selector switch 18 to provide input to the second computing device 31 and enters the value of the nonce into the first peripheral input device 17. Upon receiving the correct input from the user, the existing file with the same username is then overwritten.

Conversely, if the user fails to key in the nonce or when there is a time-out, then in step 715, the existing file is not overwritten. In this case, the received file may be saved in the third storage device 35 as a newer version. This is to ensure that file overwrite is always consented by the user.

If, instead, the EOF tag indicates that the received data is the filename of a file that the user wishes to retrieve, then in step 717, the processor of the second computing device 31 reads the filename and retrieves the file together with the corresponding AES key and IV from the third storage device 35, appends an EOF tag to the data, opens a serial port corresponding to the first TX pin 31 and the fourth TX pin 65 and sends the data to the first computing device 125 via the second unidirectional link 27. If the received data contains multiple filenames, the same is done for each file. If the AES key is not stored but derived from a user password, the user switches the selector switch 18 to provide input to the second computing device 31 and enters the password, and the program derives the AES key. For greater security assurance, it is preferred that user consent is obtained for the sending of the file out from the second computing device 31. This may be performed in a similar way as in step 711.

Yet further, if the EOF tag indicates that the data is an email to be sent out, then in step 719, the program causes the second computing device 31 to read the email addresses to learn the names of the addressees. The public key of each addressee is also retrieved from a database, for example stored in the third storage device 35.

In step 721, the second computing device converts the OTP-encryption to AES-encryption using an AES key, and an IV, as described above. For convenience, the AES key and the IV are collectively referred to hereafter as "session key". The AES encrypted email and the session key are saved to the third storage device 35.

In step 723, a public key of each addressee is used to encrypt the AES key and the IV. If the public keys are themselves stored in encrypted form, they may be transmitted to the first computing device 125 together with the session key, decrypted and used to encrypt the session key as described above in the operation workflow example of FIG. 4, after which the encrypted session keys are then sent back to the second computing device 31. Note that it is also a common practice that only the AES key is encrypted by public key, while the IV is left unencrypted.

In step 725, the program then opens a serial port connected to the third computing device 21, i.e., corresponding to the second TX pin 63 and the fifth RX pin 71, appends an EOF tag to the data and sends the encrypted email together with the public key encrypted session key to the third computing device 21 via the serial-USB converter 55. For greater security assurance, it is preferred that user consent is obtained for the sending of the data out to the third computing device 21. This may be performed in a similar way as in steps 711 and 713 as described above.

In summary, by executing the CD 2 data handling app on the second computing device 32, the data handling device 11 is configured to perform the following data handling services:

1. Receiving data from the user computer system 19 via the hardware encryption module 53 for storage in the data handling device 11 or output via the networked computer system 21;
2. Sending stored data to the user computer system 19; and
3. Sending data to the networked computer system 21 for output to the external network.

Thus, the data handling device 11 handles secure output and storage of data for the user computer system 19.

Optionally, the software described above may be executed by the user activating a secure mode of the computing apparatus 2. It is envisaged that the computing apparatus 2 may be configured to enable the user to toggle between a secure mode and a normal mode, in which the software described above is not executed.

As discussed above, public-key encryption of, for example, emails for sending or received from another user may be handled as illustrated in FIG. 4-7. In a specific example of RSA public key cryptography, the user's private keys for decryption and for digital signing may be generated within the second computing device 31 and stored in the data handling device 11. The private keys may be sent to the first computing device 125 when there is need for decrypting received data or digital signing of data in the first computing device 125. The corresponding public keys for encryption and signature verification may be sent to the third computing device 21. Certificates signed by a certificate authority may be stored in encrypted form in the data handling device 11 and sent to the third computing device 21 and decrypted there whenever necessary.

Certificates containing public keys of recipients may be received in the first computing device 125, and they may be stored in encrypted form in the third storage device 35. The certificates may be verified in the first computing device 125.

When encrypting data to send to a recipient, there are two scenarios.

In the first scenario, the data to be encrypted has been input by the user into the data handling device 11. In this case, a session key, for example an AES key, may be generated within the second computing device 31 and used to encrypt the data in the data handling device 11. If the public key of the recipient is stored in encrypted form in the data handling device 11, the public key of the recipient and the session key are sent to the first computing device 125, where the public key in encrypted form may be decrypted and used to encrypt the session key. The encrypted session key is sent back to the data handling device 11. Since the encrypted session key would be encrypted by the hardware encryption module, when sending the encrypted session key to the third computing device 21, the decryption key is preferably also sent as well for the third computing device 21 to decrypt and obtain the encrypted session key. The user may also sign the data using the signing key stored in the data handling device 11.

In the second scenario, the data to be sent to a recipient has been input by the user into the user computer system 19. In this case, the data is transferred to the data handling device 11, in the process the data would be encrypted by the hardware encryption module. In the data handling device 11, the encryption by hardware encryption module may be converted to AES counter mode encryption with an AES key generated within the data handling device 11 for example, using the method as shown in FIG. 8. Alternatively, the hardware encryption itself may use an encryption method such as AES counter mode, in which case the AES key may be used directly as the session key. The session key may then be encrypted by the public key of the recipient using the same method as described in the first scenario. The user may also sign the data. To do this, the data handling device 11 may send the signing key to the user computer system 19, where the data is signed.

For authentication, a challenge in the form of a nonce may be received by the networked computer system 129 from a verifier, for example a server. The networked computer system 129 forwards the nonce to the user computer system 19 for it to be displayed on the monitor 127. The user reads the nonce from the monitor 127 and enters the value of the nonce and a password into the data handling device 11 using the first peripheral input device 17. The data handling device 11 performs a cryptographic operation, for example a hash function, on the nonce and the password and sends the result of the operation to the networked computer system 129. Spyware may not be able steal the user's password since the password is in the data handling device 11 which may be free from malware. In some implementations, the user may not need to key in the password as the password may be stored in the data handling device 11.

It should be appreciated that the computing apparatus 2 provides computing services in which data is protected from malware, including spyware and ransomware.

Specifically, the communication link 13 enables the data handling device 11 to provide malware-resistant data handling services in the form of handling storage and/or output of data for the user computer system 19. This is because the handling device 11 does not receive raw data from the user computer system 19; the first unidirectional link 25 is configured such that all data entering the data handling device 11 is encrypted via the hardware encryption module 53. As such, any malware (for example ransomware) entering the data handling device 11 from the user computer system 19 will also be hardware encrypted and execution of the malware on the data handling device 11 therefore may not be possible, i.e., the malware may be rendered ineffective. The second unidirectional link may also enable data to be output from the data handling device 11 to the user computer system 19 (i.e., from storage) while preventing malware from passing in the other direction. Any output from the user computer system 19 handled by the data handling device 11 is automatically encrypted and therefore outputs from the user computer system 19 via the data handling device 11 may also be resistant to spyware. Indeed, as the first unidirectional link 25 is the only output provided in the computing apparatus 2 from the user computer system 19, it will be appreciated that, in the described embodiment, the user computer system 19 may function as a private computing space for the user.

In particular, the communication link 13 may enable the services provided by the data handling device 11 to remain malware-resistant without relying on the detection of malware itself as it is based on hardware encryption of all data rather than any actions which are specifically applied to malware signature or behaviour or malware-affected data. It should be appreciated that this may enable protection against unknown and undetected malware, as well as malware that exploits zero-day vulnerabilities of operating systems or application software.

As the only means of input from any other computing device to the data handling device 31 is via the first unidirectional link 25 and hardware encryption module 53, it will also be appreciated that, in the described embodiment, there is also no mechanism for the data handling device 11 to receive malware from another source (i.e., the fourth unidirectional link 15 between the data handling device 11 and the networked computer system 129 enables data only to pass from the data handling device 11 to the networked computer system 129).

Thus, even if the user unwittingly visits compromised websites, downloads, and runs infected software, or opens phishing email attachments that introduce malware into the computing apparatus 2, the user's data in the data handling device 11, or to be specific, users' data in any storage devices connected to the second computing device 31, may remain protected. This is because no malware may be able to access the user's data in the data handling device 11.

For example, in the event of a ransomware attack, the user computer system 19 and the networked computer system 129 may become locked by the ransomware, but the data stored in the data handling device 11 may remain protected. If the user computer system 19 and the networked computer system 129 do not store important data, the damage to the user may therefore be minimal. The user may be able to simply reformat the hard drives of the user computer system 19 and the networked computer system 129 and reinstall the operating systems and application software. If desired, the files in the data handling device 11 may be copied to a clean user computer system 19 for malware signature scanning or heuristic analysis on the decrypted files, when information about the malware becomes available from antivirus software vendors or cybersecurity experts.

The user may also optionally run a virtual machine (VM) or sandbox with the latest edition of antivirus software or malware removal tools in the user computer system 19. The user may then copy all the files and their corresponding decryption keys from the third storage device 35 into the VM. The user may then decrypt the files in the VM for signature analysis. It is also possible to run static or dynamic heuristic analyses in the VM. If the malware infects the VM during analysis, the user can simply restart the VM in its original state or an earlier snapshot. After the malware is detected, the user may safely delete the malware in the third storage device 35 by issuing the appropriate command from the first peripheral input device 17. Thus, recovery from a malware attack may be straightforward.

In summary, key principles embodied by the described embodiment include but are not limited to the following:

(1) Sensitive data are input by the user only in a secure input space (the data handling device 11) and the data are encrypted before being sent to any unsecured space (the networked computer system 129).

(2) Important data are stored in encrypted form in a secure storage space (the data handling device 11) that is inaccessible to malware.

(3) Private data are decrypted for viewing, editing, or processing in a secure private space (the user computer system 19).

(4) Only the user can transfer data across the spaces.

Thus, the computing apparatus 2 provides a system architecture and practical method of protecting data, especially a user's private, sensitive, and important data, from unknown and undetected malware, including spyware and ransomware.

Note that in contrast to the air gap method typically employed in existing methods of separating a computer system or a computing network into an "unsecured zone" that is connected to the Internet and a "secure zone" that is isolated from the Internet by means of physical disconnection between the two zones, in the described embodiment, the user can conveniently and securely transfer files between "secured" and "unsecured" zones, without having to physically connect or disconnect any device or module before or after the file transfer.

The described embodiment should not be construed as limitative.

To begin with, it should be appreciated that many variations to the architecture shown in FIG. 1 without departing from the key principles listed above are envisaged. For example, both of the two computer systems 19, 129 may share a same monitor. This may be realized using a selector or controller switch for the user to toggle the display between the two computer screens.

The user may edit data in the user computer system 19 by connecting a keyboard and a mouse directly to the first computing device 125, as in the architecture of FIG. 1, or alternatively by sending inputs via relay from the data handling device 11, making use of the unidirectional link 27. In these cases, the selector switch 18 may be omitted.

While it is described above that only secure data may be stored in the third storage device 35, the first storage device 29 may configured to be read-only. In such cases, all data to be saved is saved in the third storage device 35, in which case all files to be saved are automatically sent from the user computer system 19 to the data handling device 11. For security, the user should be required to decide whether existing files in the data handling device 11 should be overwritten, or the received files should be saved as new versions.

Although the data handling device 11 is shown in FIG. 1 as not including a monitor, a monitor may be connected to the second computing device 31 and messages may be typed directly into the data handling device 11 using peripheral input devices such as a keyboard. The user may then instruct the data handling device 11 to encrypt the message and send the encrypted message to the networked computer system 129.

Other examples of variations in the architecture of FIG. 1 will be appreciated from the description of alternative embodiments below.

Variations are also envisaged to the operation of the computing apparatus 2 according to the described embodiment. For example, a combination of two keys may be employed for the AES key—an individual key that is generated for each file and saved together with the file in the third storage 35, and another key, also called the user's key, that is derived from user's password. The XOR of the two keys is then a combined key that is used for AES-encryption of the relevant file.

When sending decryption key to the user computer system 19 from the data handling device 11, only the combined key may be sent. In this way, the user computer system does not know the user's key. Moreover, it may be safer to store only the individual key with the encrypted data since having the individual key alone is insufficient to decrypt the data. Thus, this combination of two keys may provide additional security.

Figure 9A:
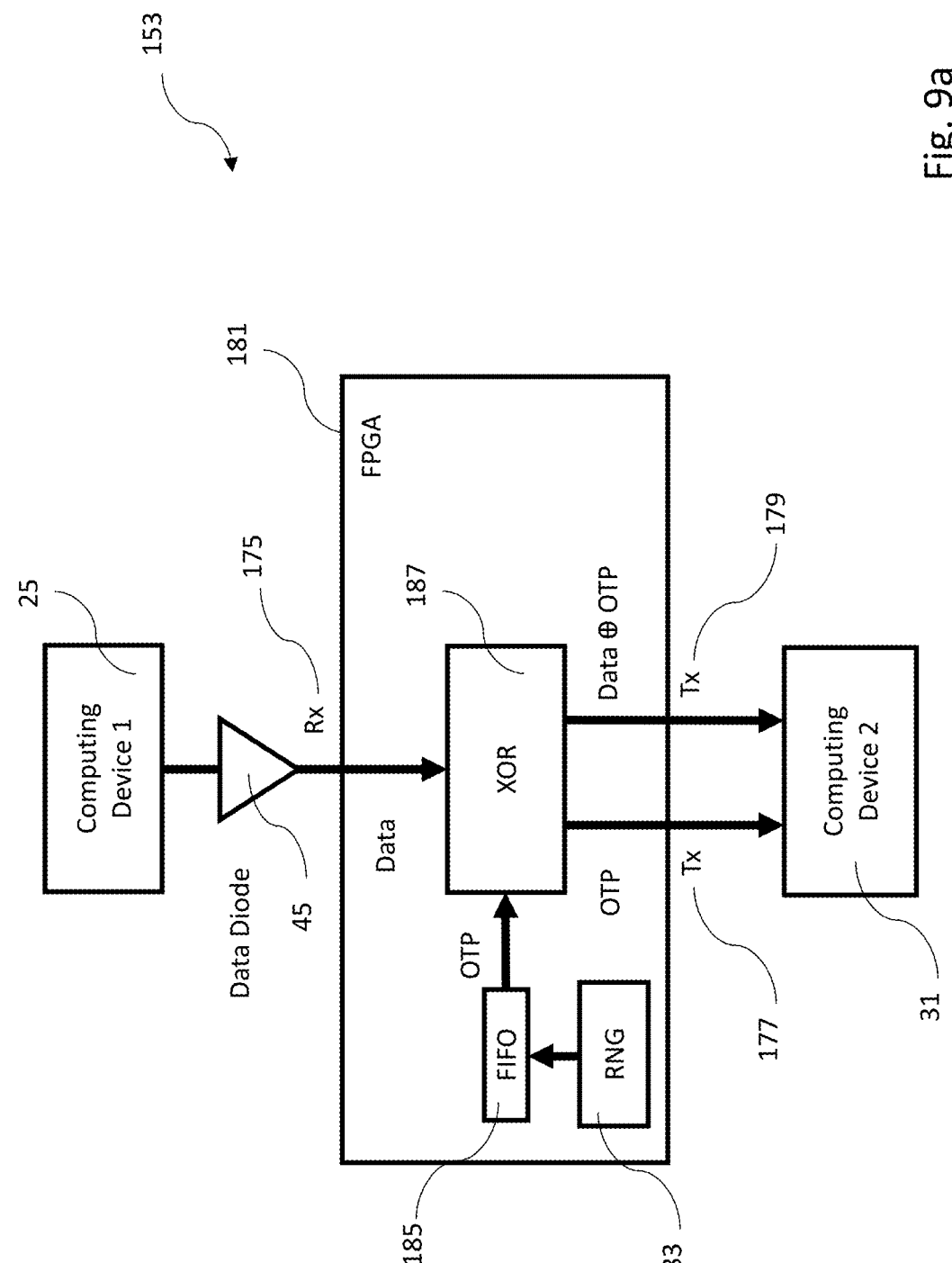
Figure 9B:
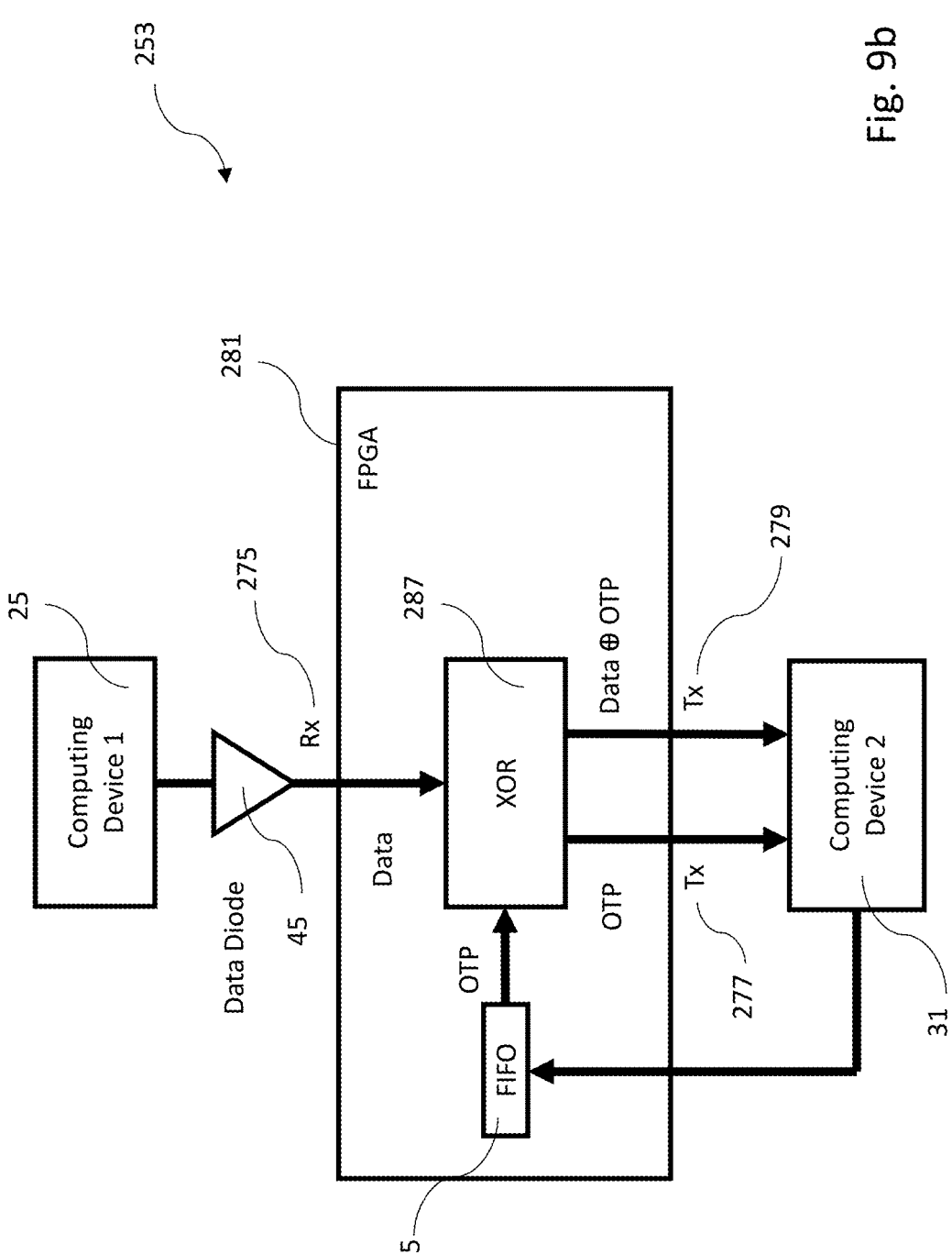

Although a specific hardware encryption module 53 has been described above, it is envisaged that alternative hardware encryption modules may be employed. FIGS. 9*a* and 9*b* illustrate two alternative examples of hardware encryption module suitable for use with the computing apparatus 2 of FIG. 1, specifically a first alternative hardware encryption module 153 and a second alternative hardware encryption module 253.

As shown in FIG. 9*a*, the first alternative hardware encryption module 153 includes an FPGA 181 with an RX pin 175, a first TX pin 177 and a second TX pin 179 that may be implemented, for example with GPIO pins on the FPGA 181. The first alternative hardware encryption module 153 further includes a FIFO memory 185 and an internal RNG 183, for example based on jitter or metastability produced from ring oscillator, flip-flop or other primitives, or architectures such as all-digital phase locked loop (ADPLL). Thus, the FPGA 181 may generate random bits internally and store them in the FIFO memory 185.

As shown in FIG. 9*b*, the second alternative hardware encryption module 253 also includes an FPGA 281 with an RX pin 275, a first TX pin 277 and a second TX pin 279 that may be implemented, for example with GPIO pins on the FPGA 281. The second alternative hardware encryption module 253 further includes a FIFO memory 285 but does not include an RNG module; instead, in this alternative, the second computing device 31 provides random bits that are obtained internally to the FIFO memory 285 on the FPGA 281. For example, in Unix-like operating systems, the random bits may be obtained from /dev/urandom.

It is envisaged that in addition to a hardware encryption module 53, 153, 253, a hardware decryption module may also be employed. Hardware decryption modules will be discussed in more detail below.

Yet further, it is envisaged that in some embodiments, a separate hardware encryption module 53, 153, 253 may not be employed and instead an encryption operation may be implemented inside the data handling device 11 itself. For example, the data encryption operation may be implemented with software that runs in a dedicated processor core in the data handling device 11 or with logic gates implemented in a system-on-chip FPGA, such as the Zynq™-7000 family from Xilinx™, in the data handling device 11. It should therefore be appreciated that different variations of the data encryption operation may be implemented in practice, and it is not a strict requirement to have the hardware encryption operation performed using a separate hardware encryption device or module physically located outside the data handling device 11. It is appreciated that software encryption in a dedicated processor core (different from the processor that handles the data in the data handling device) is one possible way to replace the standalone hardware encryption modules. It is also possible to have the encryption implemented with logic gates inside a system-on-chip FPGA that also runs the data handling app. In this case, the FPGA performing hardware encryption and the processor of the data handling device may be on the same IC chip. These are variations that might challenge the need for a "separate" hardware encryption module outside the data handling device. An important consideration is performing encryption on all incoming data prior to being received by the processor that handles the data in the data handling device, and the keys are not made available to the user computer system that sends the data. It should not be a requirement to use the hardware encryption module that is physically outside the data handling device.

Although the CD 3 data handling app is described above as being a stand-alone application, it is envisaged that it may instead be embedded directly into an email client application to remove the need for a user to copy and paste encrypted emails to and from the clipboard.

Although UART communication protocols are described above for implementing the unidirectional links, it is envisaged that communication protocols such as UDP (User Datagram Protocol) or any proprietary protocol that implements unidirectional data transfer may be suitable as well.

Although separate links between the hardware encryption module and the second computing device are described above for transmitting the encrypted data and the encryption key separately, it is envisaged that only a single TX-RX connection may be employed and that the encrypted data and the keys are sent sequentially into the second computing device.

Although a QRNG which can provide random bits at a rate of 4 Mbps is described above, it is envisaged that random bits from a lower-rate true randomness source may be used as well to seed a randomness expansion algorithm, for example a linear feedback shift register (LFSR) or an AES counter-mode-based deterministic random bit generator (CTR-DRBG) implemented in the FPGA to generate pseudo-random bits at high rate. In this case, the seed should be renewed periodically to avoid repetitive patterns in the output random bit sequence.

Although OTP-encryption is described above for the hardware encryption module, it is envisaged that alternatively other data encryption methods such as DES, AES, etc. may be used as well. Other than data encryption, data transformation methods, for example byte substitution based on a look-up table (LUT), etc., may be employed in the hardware encryption module in embodiments without using real-time RNG, so long as the first computing device does not have the means to figure out the transformation. This may be achieved by use of a data diode to prevent any data leakage from the FPGA of the hardware encryption module back to the first computing device and use of a hardware decryption device to reverse the data transformation before data are sent back to the first computing device.

It should be appreciated that operation of the computing apparatus 2 as described above assumes that the user has access to both the first peripheral input device 17 and the second peripheral input device 43 and can view the first monitor 127 and the second monitor 39 at the same time, i.e., that the user computer system 19, the networked computer system 129 and the data handling device 11 are co-located. However, it is envisaged that a user may instead be co-located with the user computer system 19 and the data handling device 11, while being remote from the networked computer system 129. In this variation, computer screen data from the remote networked computer system 129 may be sent to the user computer system's monitor 127 via the unidirectional link 23. User input data, for example keyboard and mouse data may be sent to the remote networked computer system 129 from the data handling device 11 via the unidirectional link 15. It is also envisaged that the computer screen data and the user input data may be sent over dedicated connections using methods similar to those described below.

Further, it is envisaged that a user may be remote from the user computer system 19 and the data handling device 11, while co-located with the networked computer system 129.

Figure 10:
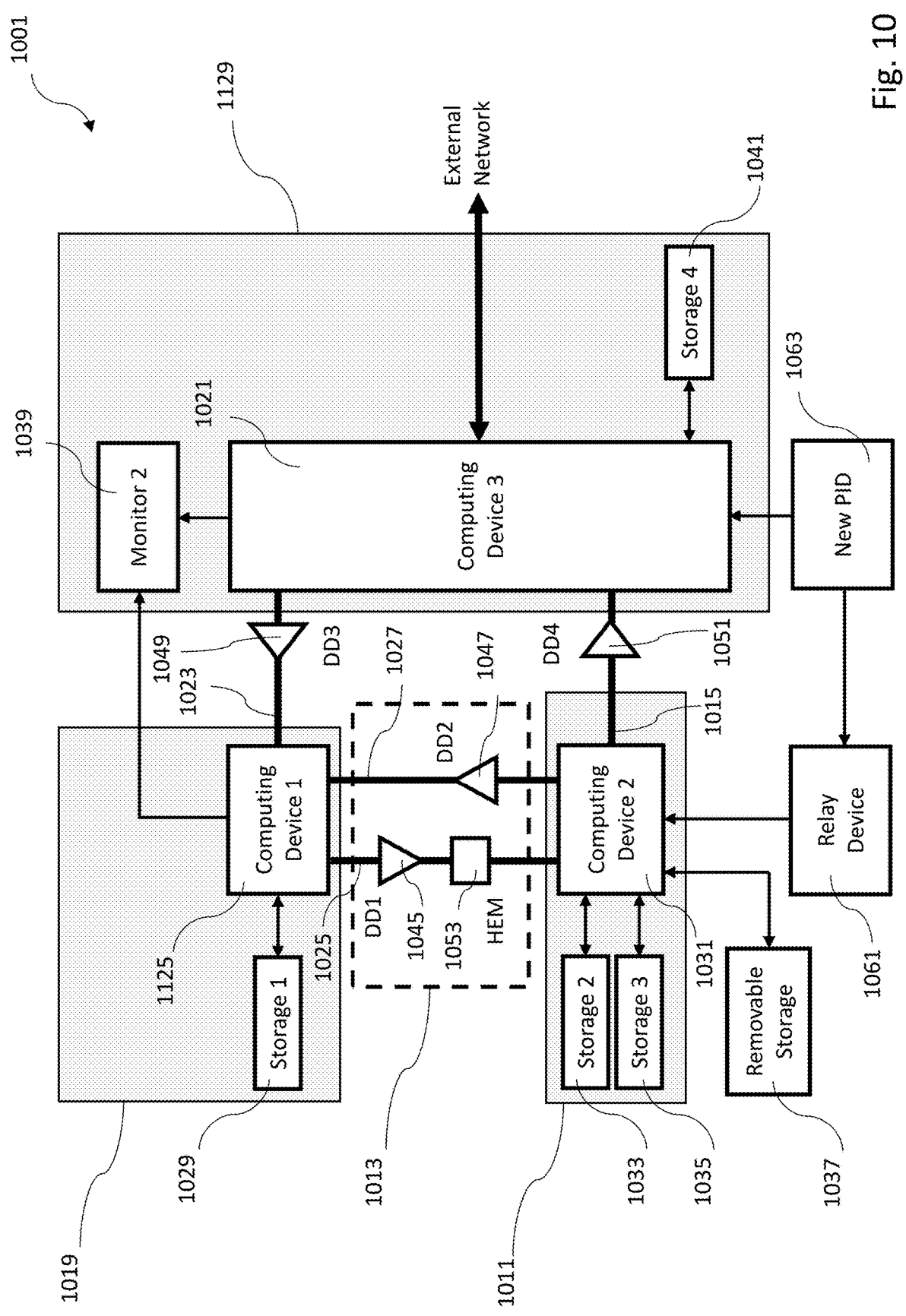
FIG. 10 illustrates a second embodiment computing apparatus.

FIG. 10 illustrates a second embodiment computing apparatus 1001 which enables a user to be remote from a user computer system 1019 and a data handling device 1011. The second embodiment is similar to the first embodiment and like features will use the same references with the addition of 1000. Specifically, the second embodiment computing apparatus 1001 includes a user computer system 1019 and a networked computer system 1129, a data handling device 1011, a communication link 1013 including a first unidirectional link 1025 including a hardware encryption module (HEM) 1053 for transferring data from the user computer system 1019 to the data handling device 1011 and a second unidirectional link 1027 for transferring data from the data handling device 1011 to the user computer system 1019, a third unidirectional link 1023 for transferring data from the networked computer system 1129 to the user computer system 1019, and a fourth unidirectional link 1015 for transferring data from the data handling device 1011 to the networked computer system 1129. Data diodes 1045, 1047, 1049 and 1051 are included to enforce strict unidirectionality of the links 1025, 1027, 1023, and 1015, respectively. The user computer system 1019 includes a first computing device 1125 and a first storage device 1029. The data handling device 1011 includes a second computing device 1031, a second storage device 1033, a third storage device 1035 and a removable storage device 1037. The networked computer system 1129 includes a third computing device 1021, a fourth storage device 1041, and a monitor 1039 (equivalent to the second monitor 39 of the first embodiment computing apparatus 2). These features are exactly the same as the corresponding features in the first embodiment computing apparatus 2 and thus, for brevity, will not be explained again.

However, unlike the first embodiment computing apparatus 2, in the second embodiment, there is no equivalence to the first monitor 127, the first peripheral input device 17, the second peripheral input device 43 and the selector switch 18. Instead, the first computing device 1125 sends its screen data to the monitor 1039 over a private connection, such as using HDMI cables for relatively short distances or HDMI-over-Ethernet or HDMI-over-IP extenders if the distance involved is longer than several metres. A selector or controller switch (not shown) may be used to toggle between different computer screens displayed on the monitor 1039. In addition, the computing apparatus 1001 includes a new peripheral input device (PID) 1063 connected to the networked computing system 1129, specifically the third computing device 1021; and a relay device 1061 connected to the data handling device 1011, specifically the second computing device 1031, and communicatively connected to the new PID 1063.

Figure 11:
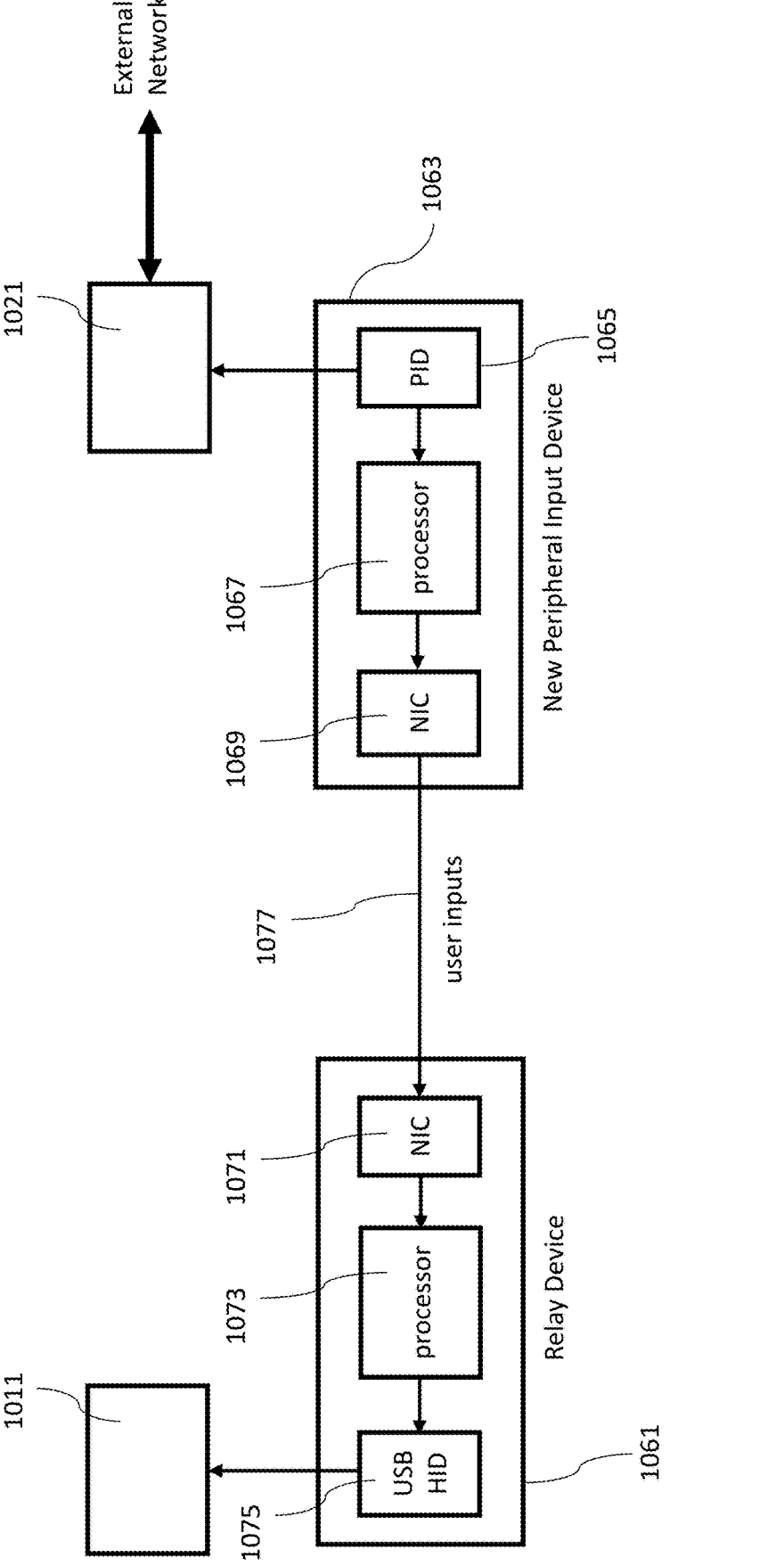
FIG. 11 illustrates a peripheral input device and a relay device of the apparatus of FIG. 10 in more detail.

FIG. 11 illustrates the new PID 1063 and the relay device 1061 in more detail.

The new PID 1063 includes a sub PID 1065 that is connected to the networked computing device 1021 which is envisaged to be local to the user. User inputs are entered into the sub PID 1065, which is for example a keyboard, a mouse, or some other peripheral input device. The new PID 1063 also includes a processor 1067 and a network interface card (NIC) 1069 to enable the user to send inputs directly to the data handling device 1011, specifically via the relay device 1061. A selector switch (not shown) in the new PID 1063 may be used to enable the user to direct inputs to either the networked computing device 1021 or the data handling device 1011 via the relay device 1061.

The relay device 1061 itself also includes a NIC 1071 for receiving data from the NIC 1069 via a dedicated private connection 1077. The dedicated private connection 1077 may be implemented with UDP, for example. In this case, the two communicating network interfaces may use static IP addresses. It is also possible to implement with direct wireless communication such as Bluetooth if the distance involved is within the range of Bluetooth, which is typically about 10 metres.

The relay device 1061 further includes a processor 1073 and a USB Human Interface Device (HID) 1075 that relays the received user inputs to the data handling device 1011 via a USB port. Alternatively, the USB HID 1075 may be replaced by a UART connection. For example, the relay device 1061 may include a Bluetooth to UART converter if the dedicated private connection 1077 is implemented with Bluetooth.

User inputs for the user computer system 1019 are further relayed by the second unidirectional link 1027. A selector switch (not shown) in the new PID 1063 may be configured to enable the user to differentiate inputs directed to the user computer system 1019 or the data handling device 1011 or the networked computer system 1021.

Thus, the new PID 1063 and the relay device 1061 together provide a private connection by which the user may send inputs to the user computer system 1019 and the data handling device 1011. The second embodiment computing apparatus 1001 may therefore enable the user to be remote from the user computer system 1019 and the data handling device 1011 while retaining the security of both.

Optionally, for added security, the processors 1067, 1073 in the new PID 1063 and the relay device 1061 may perform encryption and decryption operations of user inputs.

Figure 12:
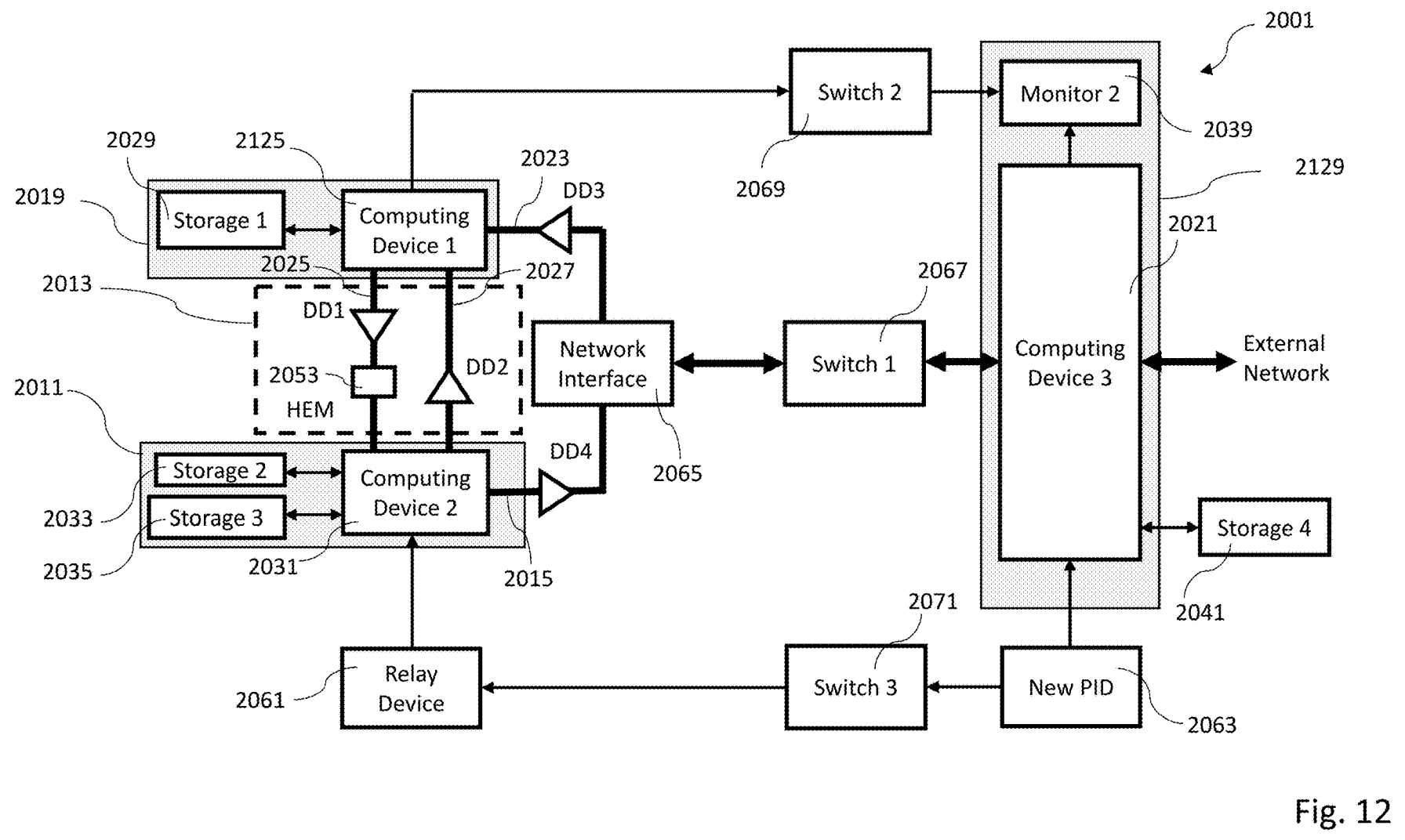

FIG. 12 illustrates a third embodiment computing apparatus 2001 which also enables a user to be remote from a user computer system 2019 and a data handling device 2011. The third embodiment is similar to the second embodiment and like features will use the same references with the addition of 1000. Specifically, the third embodiment computing apparatus 2001 includes the user computer system 2019 and an networked computer system 2129, the data handling device 2011, a communication link 2013 including a first unidirectional link 2025 including a hardware encryption module (HEM) 2053 for transferring data from the user computer system 2019 to the data handling device 2011 and a second unidirectional link 2027 for transferring data from the data handling device 2011 to the user computer system 2019, a third unidirectional link 2023 for transferring data from the networked computer system 2129 to the user computer system 2019, and a fourth unidirectional link 2015 for transferring data from the data handling device 2011 to the networked computer system 2129. The third embodiment computing apparatus 2001 additionally includes a new PID 2063 and a relay device 2061. The user computer system 2019 includes a first computing device 2125 and a first storage device 2029. The data handling device 2011 includes a second computing device 2031, a second storage device 2033, and a third storage device 2035. The networked computer system 2129 includes a third computing device 2021, a fourth storage device 2041, and a monitor 2039. These features are exactly the same as the corresponding features in the second embodiment computing apparatus 1001 and thus, for brevity, will not be explained again.

Unlike in the second embodiment, however, in the third embodiment computing apparatus 2001, three network switches, specifically a first network switch 2067, a second network switch 2069 and a third network switch 2071 are additionally included in the computing apparatus 2001 to enable connection to additional networked computer systems in addition to the networked computer system 2129 (these additional computer systems are not shown in FIG. 12) to the user computer system 2019 and the data handling device 2031.

In more detail, the third embodiment computing apparatus 2001 further includes a network interface 2065 via which the third unidirectional link 2023 and the fourth unidirectional link 2015 are connected to the networked computer system 2129 (and any additional networked computer systems). In other words, the fourth unidirectional link 2015 is operable to transfer data from the data handling device 2011 to the network interface 2065, and the third unidirectional link 2023 is operable to transfer data from the network interface 2065 to the user computer system 2125.

Specifically, the network interface is in two-way communicative connection with the first network switch 2067 to which the third computing device 2129 and respective computing devices of any additional networked computer systems are themselves in two-way connection for the transfer of data. The network interface 2065 is configured to forward all received data to the user computer system 2019 while at the same time sends out data coming from the data handling device 2011.

The second network switch 2069 is configured to receive data from the first computing device 2125 and is configured to send computer screen data to the monitor 2039 and the respective monitors of any additional networked computer systems. The monitors may be equipped with suitable network interfaces (not shown) to connect to the second network switch 2069.

The third network switch 2071 is configured to receive user inputs from the new PID 2063 and any respective peripheral input devices of any additional networked computer systems and transmit the user inputs to the relay device 2061.

In an example operation of the third embodiment computing apparatus 2001, a first user may send encrypted emails to the user computing device 2125 for decryption and viewing of the emails on the first user's own computer screen, and after viewing send a command to the data handling device 2011 to save the emails in the third storage device 2035, in the first user's folder. A second user using a different computer system (not shown) may in parallel send a command to retrieve files from the third storage device 2035, and have the files sent to the second user's own computing device. Each user may have to log into the data handling device 2011 by providing a user ID and password to access the services including allocated storage space in the third storage device 2035.

Figure 13A:
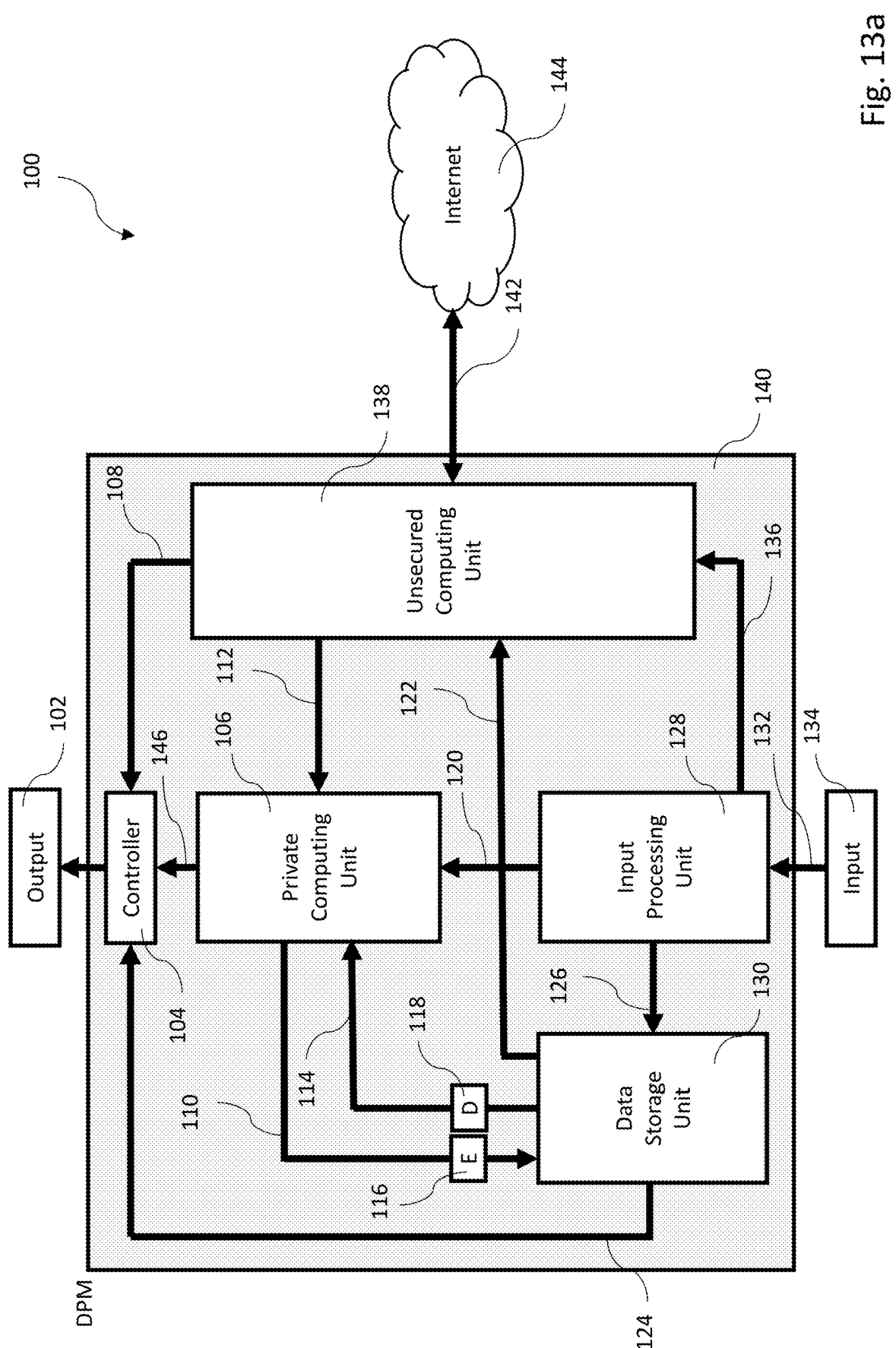
FIG. 13a illustrates a fourth embodiment computing apparatus.

FIG. 13*a* illustrates a fourth embodiment computing apparatus 100 which is functionally similar to the embodiments described above.

The fourth embodiment computing apparatus 100 includes a data protection module (DPM) 140 which may be in the form of a printed circuit board or multiple printed circuit boards, with integrated chips (ICs) or system-on-chips (SoC's) that can be embedded into desktop computers or portable computing devices such as laptops, tablets, smartphones for example. The DPM 140 includes a computer system including a first computing device (also called private computing unit, PCU 106); a controller 104; and a data handling device including a second computing device (also called input processing unit, IPU 128), itself including a processing unit 326, and a data storage unit (DSU) 130; and a networked computer system including a third computing device (also called unsecured computing unit, UCU 138), which is specifically connected to the Internet 144 in the present embodiment. The controller 104 is configured to send computer screen data, audio data, etc. to output devices 102.

As in the computing apparatuses of the previously described embodiments, the DPM 140 also includes a communication link which includes a first unidirectional link 110 for transferring data from the user computer system to the data handling device and a second unidirectional link 118 for transferring data from the data handling device to the user computer system. Unlike the previously described embodiments, however, the first unidirectional link and the second unidirectional link 114 are specifically arranged between the DSU 130 of the data handling device and the user computer system. The first unidirectional link 110 also includes a hardware encryption module 116. In contrast to the previously described embodiments, however, the second unidirectional link 114 additionally includes a hardware decryption module 118.

The DPM 140 also includes a third unidirectional link 108 for transferring computer screen data and/or audio data from the UCU 138 to the controller 104, a fourth unidirectional link 112 for transferring data from the UCU 138 to the PCU 112, a fifth unidirectional link 136 for transferring data from the IPU 128 to the UCU 138, a sixth unidirectional link 122 for transferring data from the DSU 130 to the UCU 138, a seventh unidirectional link 124 for transferring computer screen data from the DSU 130 to the controller 104, an eighth unidirectional or bidirectional link 126 for transferring data from the IPU 128 to the DSU 130, and a ninth unidirectional link 120 for transferring data, for example user inputs directly from the IPU 128 to the PCU 106. A tenth unidirectional link 146 for transferring computer screen data and/or audio data from the PCU 106 to the controller 104. If the eighth link 126 is bidirectional, then the sixth link 122 may be omitted since data from the DSU 130 may reach the UCU 138 via links 126 and 136. The DPM 140 may further include an optional key store 344 (see FIG. 14).

Further included in the computing apparatus 100 are one or more output devices 102, such as such as monitor displays, headphones, speakers, etc. configured to receive computer screen data and/or audio data from the controller 104, and peripheral input devices 134 such as a keyboard and a mouse or a microphone, configured to provide inputs to the IPU 128. Optionally the IPU 128 may further include its own output devices (not shown). Otherwise, user inputs may be relayed to the output devices 102 through the PCU 106 and the controller 104.

A method of using the computing apparatus 100 according to an embodiment will now be described.

It will be appreciated that the IPU 128 is a secure input space in the sense that it is a computing unit that does not have a direct Internet connection. If private information input by user is meant for sending out to a recipient over the Internet connection 142, it may be first encrypted within the IPU 128 before being transferred to the UCU 138 that serves as a gateway to the Internet. The IPU 128 is connected to the UCU 138 via the fifth unidirectional link 136 such that data can move from the IPU 128 to the UCU 138 but not in the opposite direction. If there is malware in the UCU 138, the malware would not be able to enter the IPU 128 via the fifth unidirectional link 136.

The UCU 138 is a computing unit that is directly connected to the Internet. Thus, the user may use the UCU 138 to surf the web, view blog posts, play online games, engage in social media, etc. When the user performs computing activities that do not involve the handling of important data in unencrypted form, however, in the present embodiment, user inputs are directly forwarded to the UCU 138 via the fifth unidirectional link 136. The UCU 138 is considered unsecured because the user may visit risky sites or open phishing email attachments causing malware to be downloaded onto the UCU 138. The UCU 138 may also be susceptible to cyberattacks that exploit the Internet connection. It should be appreciated that security may not be guaranteed by conventional methods such as a firewall or anti-virus software. Thus, according to a method of using the apparatus according to described embodiment, activities that involve the keying in, editing or viewing of private or sensitive data are not carried out on the UCU 138.

As noted above, one or more output devices 102 are connected to the PCU 106. According to a method of using the apparatus according to the described embodiment, private and sensitive data are decrypted only in the PCU 106. Encrypted data received from the Internet are transferred from the UCU 138 to the PCU 106 over the unidirectional link 112 for decryption. The PCU 106 does not have a direct Internet connection. Therefore, malware that might enter or access the PCU 106 through the unidirectional link 112 may not be able to find a direct pathway to connect to its command and control (C&C) servers or to secretly send data out of the PCU 106 to cybercriminals via the Internet connection 142. Thus, the user may view, edit, or process important data securely in the PCU 106. As such, the PCU 106 may be a secure private space.

While ransomware may potentially attack the PCU 106, damage may be minimal because the PCU 106 does not store important data. Another role of the PCU 106 is to take user inputs via the ninth unidirectional link 120 and send them to the appropriate output devices 102. For example, when the user is typing a command in the IPU 128, the user may wish to see what is being typed in real-time. According to the described embodiment user inputs such as keystrokes, mouse movements, voice, etc. may be forwarded to the PCU 106 via the ninth unidirectional link 120.

According to the described embodiment, important data is stored in the DSU 130, which is a secure storage space comprising a non-volatile memory such as hard disk drive (HDD), solid-state drive (SSD), etc., and a processor. After viewing or editing important data in the PCU 106, the data are saved in the DSU 130. The data are transferred from the PCU 106 to the DSU 130 via the first unidirectional link 110. As described above in relation to the first embodiment, the hardware encryptor 116 encrypts all the data that pass through the first unidirectional link 110. Any malware that enters the DSU 130 via the first unidirectional link 110 would therefore be disabled and rendered harmless by the encryption. Provided the encryption key is random and secret, there may be no way for an attacker or malware to guess the key or tailor an attack to circumvent the hardware encryption. It will be appreciated from FIG. 13a, that in the described embodiment, the DSU 130 takes user instructions only via the eighth unidirectional link 126. Thus, there may be no way for malware to perform malicious actions on the DSU 130. Since both the DSU 130 and the IPU 128 are potentially free from malware, it should be appreciated that in a variation to the fourth embodiment, the DSU 130 may be incorporated in its entirety into the IPU 128 without compromising security. In this case, the DSU 130 is equivalent to the third storage device 35 in the first embodiment (FIG. 1a).

The user may wish to send files from the DSU 130 to an external destination such as a cloud storage for backup or to a recipient as email attachments. Take for example the case of sending the files to a cloud storage in which the user is required to either enter an appropriate command and filenames at a command prompt or select the files from the window of an application software or perform an equivalent action. In the described embodiment, the information is sent from the IPU 128 to the DSU 130 via the eighth unidirectional link 126 so that the DSU 130 knows which files to retrieve from storage and transfer to the UCU 138 via the sixth unidirectional link 122. By virtue of its unidirectionality, any malware residing in the UCU 138 may not be able to access the DSU 130 via the sixth unidirectional link 122. The selected files from the DSU 130 are sent across the sixth unidirectional link 122 without the decryption key because there is no need to decrypt the files in this case. The user's command is also sent to the UCU 138 via the fifth unidirectional link 136, so that the UCU 138 can expect the arrival of the files from the DSU 130 and forward them to the correct destination, which in this example, is the cloud storage. If the destination is a recipient who needs to decrypt the files, then the decryption keys are sent as well. For confidentiality, the decryption keys are encrypted in the DSU 130 before sending over the public network.

In the fourth embodiment, only a user having physical access to the peripheral input devices 134 such as keyboard and mouse may be able to move files into and out of the DSU 130. For example, when the user wishes to view or edit a particular file stored in the DSU 130, the user types the filename at a command prompt or selects the file from a list or performs an equivalent action in the IPU 128. The IPU 128 then sends the filename to both the PCU 106 and the DSU 130 via the ninth unidirectional link 120 and the eighth unidirectional link 126, respectively. The DSU 130 then retrieves the file from its storage and sends it to the PCU 106 over the link 114. The PCU 106 would also get ready to receive the file once it receives the user's command from the link 120. Since the file from the DSU 130 is encrypted, an optional hardware decryptor 118 may be used to decrypt the file as it traverses the second unidirectional link 114. Alternatively, the PCU 106 may run a program to perform the decryption so long as the decryption key is also sent across the second unidirectional link 114 to the PCU 106 together with the encrypted file. According to the described embodiment, no files are decrypted in the DSU 130 to protect its potentially malware-free status.

It should be appreciated that the controller 104 is optional. It is envisaged that, as in second embodiment computing apparatus 1001, the UCU 138 may share the same output devices 102 such as monitor display, speakers, etc. with the PCU 106, and the controller unit 104 may allow the user to select the input to these output devices 102. It will be appreciated that the third unidirectional link 108 is unidirectional to prevent leakage of important data from the PCU 106 to the UCU 138 via this link 108. It is envisaged that, alternatively, the UCU 138 may have its own set of output devices and the controller 104 would then be unnecessary. The seventh unidirectional link 124 from the DSU 130 to the controller 104 is also optional. It will be appreciated that, if present, the seventh unidirectional link 124 is unidirectional to prevent malware accessing the DSU 130 via the controller 104.

As described above in association with the first embodiment (FIG. 1a), a Secure Mode for the DPM 140 may be provided such that the user may activate and deactivate either by manually flipping a physical selector switch (not shown) or pressing a button (not shown) located on the DPM's chassis, or by hitting a specific key on the keyboard, such as one of the function keys, or a combination of those keys or some other method. When the Secure Mode is deactivated, the DPM 140 is said to be in the Normal Mode.

Under the Normal Mode, the various data security related operations in the IPU 128, the PCU 106, and the DSU 130 are disabled. The user may perform a wide variety of normal computing activities on the UCU 138 that do not involve handling important information, such as surfing the web, playing online games, viewing postings on social media, reading a blog, and so on. User inputs into the IPU 128 are simply forwarded to the UCU 138 via the unidirectional link 136. Alternatively, the user may have a dedicated set of peripheral input devices that are connected to the UCU 138 and use them for normal computing activities.

When the user wishes to perform activities that involve keying in, editing, viewing, or processing important information or data, such as submitting login passwords, composing private emails, reading private emails, viewing private photos, editing confidential reports, recording voice messages, teleconferencing, etc., the user activates the Secure Mode.

As in the above-described embodiments, in the Secure Mode, the PCU 106, IPU 128 and UCU 138 are configured to perform data handling methods by executing software on their respective processors. FIG. 13b illustrates an overall method according to the fourth embodiment performed using the computing apparatus 100 including via the user of the Secure Mode of the computing apparatus 100.

In the described embodiment private emails are encrypted before they are passed to the UCU 138 for sending out. For received encrypted emails, they are decrypted only in the PCU 106 for viewing. Private emails are saved in encrypted form in the DSU 130 to protect from file exfiltrating malware. Details are described below.

In step 200, Alice wishes to send a private email to Bob.

In step 202, Alice switches to the Secure Mode and opens an editor program in the IPU 128.

In step 204, Alice composes her private email using keyboard and mouse 134 connected to the IPU 128. Her keystrokes are sent from the IPU 128 to the PCU 106 via the ninth unidirectional link 120 in real-time and displayed on the monitor screen 102 so that Alice may view her inputs while typing.

In step 206, when she is done with the composing of the email, Alice keys in the email address of Bob or selects it from a contact list. She enters the subject of the email and clicks on the 'Encrypt Email' button located on the editor's window. The contact list contains all the previous email addresses that Alice has ever keyed into the IPU 128.

In step 208, the IPU 128 (i.e., the data handling app running in the IPU 128) calculates the hash of the email and signs the hash using Alice's signing key to obtain a digital signature. It then transfers the email, the digital signature, Bob's email address, and the subject of the email to the DSU 130. The DSU 130 has in its contact database a symmetric key or session key that Alice shares with Bob. The DSU 130 uses the key to encrypt the email with a symmetric cipher such as Advanced Encryption Standard (AES) and sends the encrypted email, the digital signature, Bob's email address and subject of the email to the clipboard on the UCU 138 via the fifth unidirectional link 136. If the email has more than one addressee, the encryption of the email would have to be repeated for each addressee using the corresponding symmetric key. The content that is transferred to the clipboard on the UCU 138 would specify which encrypted email is for which addressee.

In step 210, Alice switches back to Normal Mode and opens an email client in the UCU 138. The email client may be specifically designed and configured to automatically retrieve the encrypted email, digital signature, Bob's email address and subject of the email from the clipboard and may automatically send the email to Bob. In the case of more than one addressee, the email client may send the corresponding encrypted email to each addressee. If there is no automatic operation by the email client as described above, Alice may manually copy and paste the encrypted email and digital signature onto a new compose window of the email client for each of the addressee. She must select the correct encrypted email for each addressee.

In step 212, Alice's email is sent to Bob over the Internet.

In step 214, the email client in UCU 138 receives an encrypted email.

In step 216, the email client on the UCU 138 informs Alice that an encrypted email has arrived. Alice checks the identity of the sender and the subject of the email and decides whether to open the email.

In step 218, seeing that the sender is Bob, Alice decides to open the email. She switches to the Secure Mode and opens a viewer program in the PCU 106.

In step 220, Alice clicks on the 'Decrypt Email' button located on the window of the email client on the UCU 138. The IPU 128 instructs the UCU 138 to transfer the encrypted email to the PCU 106 via the unidirectional link 112. In some embodiments where webmail service or an incompatible email client is used, Alice may manually copy the encrypted email to the clipboard in the UCU 138 and then instruct the UCU 138 to transfer the content of the clipboard to the PCU 106.

In step 222, Alice selects the name of the sender, Bob, from her contact list and the IPU 128 instructs the DSU 130 to send Bob's symmetric key to the PCU 106. This step is necessary because the symmetric keys are stored in the DSU 130 and the DSU 130 take input only from the user. If Alice does not have the sender's symmetric key, she will not be able to decrypt the email. In this case, Alice would need to send a request to the sender to obtain the symmetric key.

In step 224, the PCU 106 decrypts the email using Bob's symmetric key received from the DSU 130 and displays the decrypted email on the monitor screen 102 for Alice to view.

In step 226, after reading the email, Alice clicks on the 'Save Email' button on the window of the viewer program. The data handling app running on the IPU 128 informs both the PCU 106 and the DSU 130, and the PCU 106 sends the email to the DSU 130 via the first unidirectional link 110. During transit over the first unidirectional link 110, the email is encrypted at the hardware encryption module 116.

In step 228, the email is stored in the DSU 130 in encrypted form together with the key that may be used for decrypting the stored email.

It should be appreciated that for optimal security, important data including private emails are not stored in the PCU 106 because a malicious email when decrypted in the PCU 106 could potentially launch a ransomware attack in the PCU 106. The damage of such an attack would be minimal if Alice does not have any important data stored in the PCU 106.

Optionally, the PCU 106 may run a virtual machine (VM) such that it may discard all changes and be reset to its original clean state whenever power up. The user may ensure that all important data have been saved in the DSU 130 before powering down the VM.

Although in the described embodiment, there is switching between the Secure Mode and Normal Mode, it should be appreciated that this separation into two operation modes is not required. For example, it is envisaged that the user may use one set of peripheral input devices connected to IPU 128 for highly secure data operations and another set of peripheral input devices connected UCU 138 for normal computing activities. In this case, there is no need to switch between two modes, which may be preferred by some users.

Figure 14:
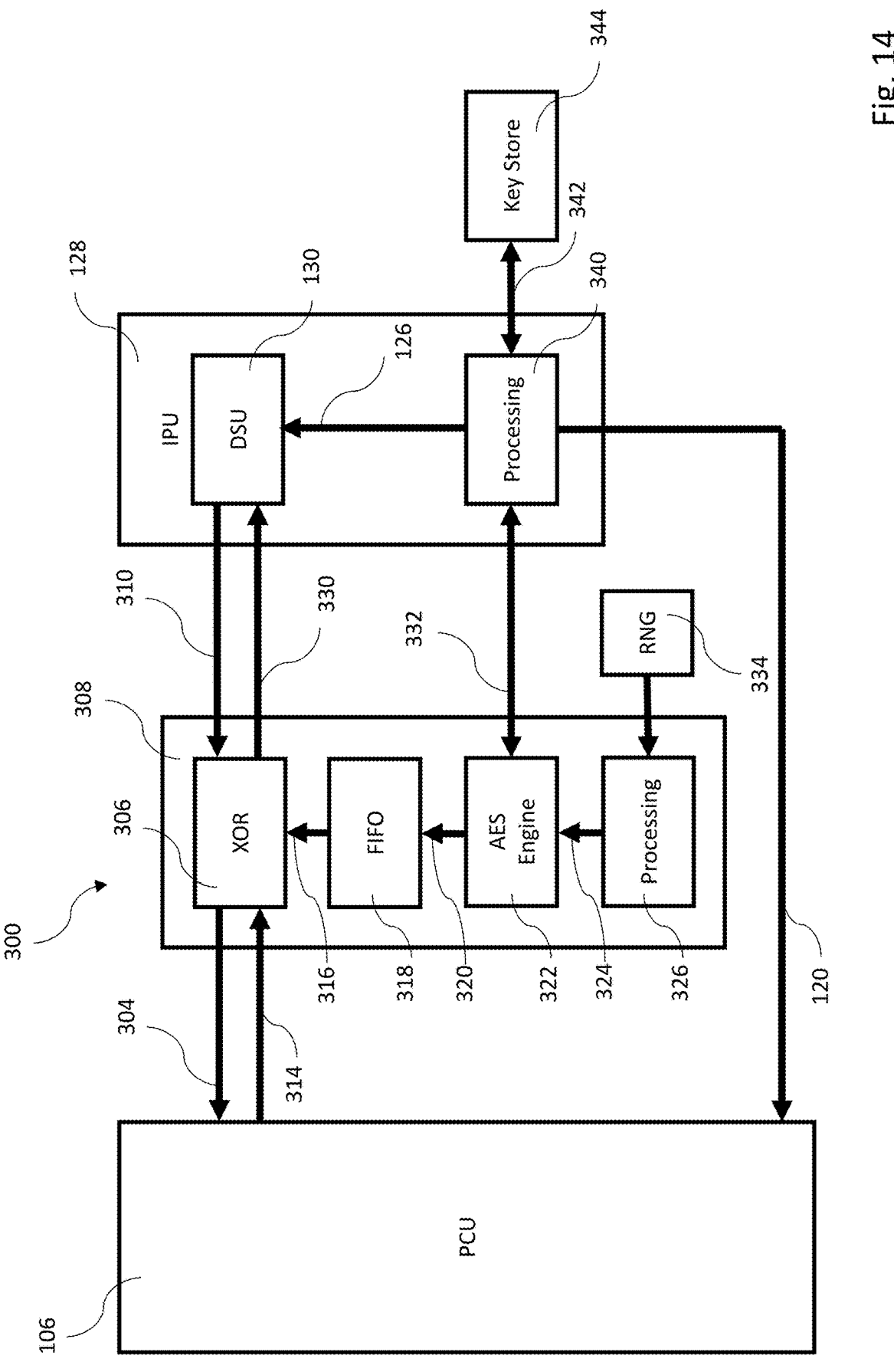
FIG. 14 illustrates a single hardware platform by which both hardware encryption and hardware decryption in the computing apparatus of FIG. 13a may be implemented.

FIG. 14 illustrates a single hardware platform 300 by which the hardware encryption module 116 and the hardware decryption module 118 are implemented according to the fourth embodiment. Note that in FIG. 14, for simplicity the DSU 130 is illustrated as being incorporated into the IPU 128.

As illustrated in FIG. 14, the first unidirectional link 110 including the hardware encryption module 116 shown in FIG. 13*a* comprises a first unidirectional sublink 310 between the DSU 130 and the single hardware platform 300, the single hardware platform 300 itself and a second unidirectional sublink 304 between the single hardware platform 300 and the PCU 106. The second unidirectional link 114, including the hardware decryption module 118 comprises a third unidirectional sublink 314 between the PCU 106 and the single hardware platform 300, the single hardware platform 300 itself and a fourth unidirectional sublink 330 between the single hardware platform 300 and the DSU 130.

The single hardware platform 300 includes, for example, a module 308 comprising an FPGA or an application specific integrated circuit (ASIC) chip or a combination of integrated chips (ICs) implemented on a printed circuit board. The single hardware platform 300 further includes an RNG 334 which is configured to provide random numbers to the module 308.

The RNG 334 may be based on a physical noise source such as, but not limited to shot noise, thermal noise, avalanche breakdown noise, etc. It may also be based on chaotic processes such as a ring oscillator, coupled lasers, etc. Processing methods such as cryptographic hashing, randomness extractors, etc. may be applied to increase the entropy per bit.

The module 308 itself includes at least one XOR logic gate 306, a FIFO memory 318, a hardware implemented AES Engine 322 and a processing unit 326.

In contrast to the hardware encryption modules 53, 153, 253 described above, encryption here is based on the Advanced Encryption Standard (AES) counter mode cipher, as is decryption.

For encrypting data coming from the PCU 106, the encryption keys and initialization vectors (Ivs) are provided by the RNG 334. The raw random bits from the RNG 334 may be processed by the processing unit 326 to increase the entropy per bit, if necessary. Using the encryption key and the IV, the hardware-implemented AES engine 322 produces an AES bitstream, denoted by AES-BS. The AES bitstream may be stored in the FIFO memory 318 before being used to encrypt the data. The encryption operation is bitwise-XOR performed on the data and the AES-BS by the XOR logic gate 306, which outputs the encrypted data, denoted by Data$\oplus$AES-BS. The encrypted data are then sent to the DSU 130 for storage. Both the encryption key and the IV are sent to the IPU 128 via link 332 and they are stored in a key store 344 such as a password-protected thumb drive that is connected to the IPU 128. In other embodiments, the encryption key and the IV may be stored together with the encrypted data in the DSU 336.

For hardware decryption, the IPU 128 retrieves the decryption key (which is the same as the encryption key) and the IV from the key store 344 and inputs them into the AES engine 322 to produce the AES bitstream, AES-BS. The AES bitstream is then sent to the FIFO memory 318 before being used to decrypt the encrypted data received via the link 310, at the bitwise XOR logic gate 306. The decrypted data are then transferred to the PCU 106 via the link 304.

Alternatively, if the decryption key and the IV have been stored in the DSU 130, the IPU 106 may instruct the DSU 130 to send them to the PCU 106 via links 310 and 304, and have the data decrypted at the PCU 106. If the decryption key and the IV have been stored in the key store 344, it is also possible for them to be sent to the PCU 106 via the unidirectional link 120.

Although the XOR gate 306 is described above as being one physical logic gate, it is envisaged that both the hardware encryptor 116 and the hardware decryptor 118, use independent XOR gates on the hardware platform 300. There may be more than one XOR gate 306 on the hardware platform 300.

Although the hardware encryptor 116 and the hardware decryptor 118 are described above as being implemented via the single hardware platform 300, it is envisaged that the hardware encryptor 116 and the hardware decryptor 118 may be implemented on two separate hardware platforms, such that each has its own AES engine, FIFO memory and logic gates. Alternatively, as in the previously described embodiments, the hardware decryptor 118 may be omitted since decryption may be implemented with software in the PCU 106 without compromising security.

Further, it should be appreciated that a data diode may be placed on each unidirectional link to strictly enforce unidirectionality of the data transfer, specifically, on the link 314 to prevent encrypted data or the encryption key from leaking to the PCU 106, on the link 310 to prevent decrypted data from leaking back to the DSU 130, and on the link 120.

Figure 15:
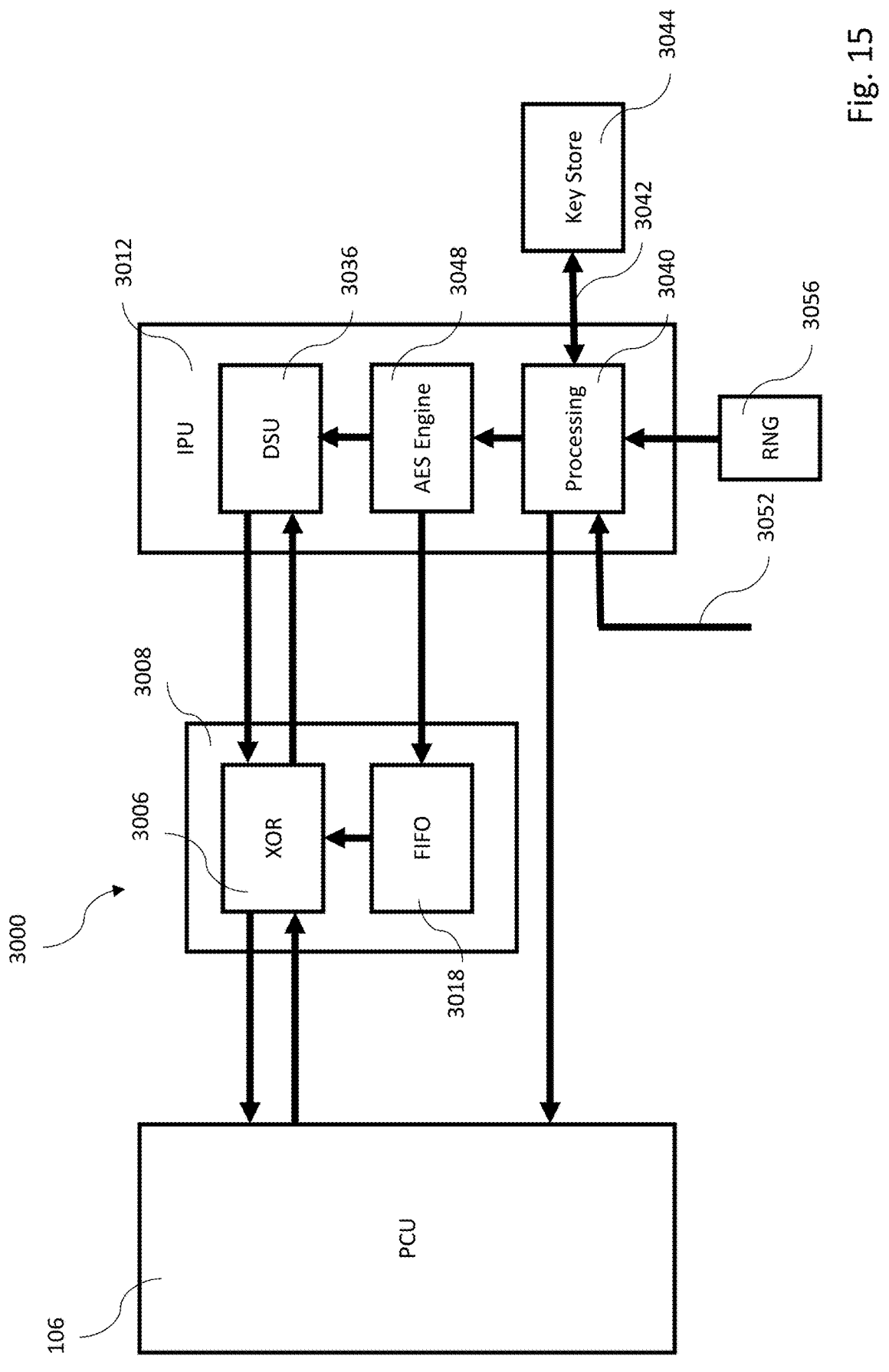
FIG. 15 illustrates fifth embodiment computing apparatus which is similar to the computing apparatus of FIG. 14.

FIG. 15 illustrates a fifth embodiment computing apparatus. The fifth embodiment computing apparatus is identical to that of the fourth embodiment illustrated in FIGS. 13 and 14. The fifth embodiment computing apparatus includes an IPU 3012 comprising a DSU 3036, a software-implemented AES engine 3048 and a processing unit 3040; a single hardware platform 3000 including an FPGA 3088 at least one XOR logic gate 3006 and a FIFO memory 3018; a RNG 3056 configured to provide random numbers to the processing unit 3040; and an optional key store 3044. The RNG 3056 may be an external device or alternatively the random bits may be taken from/dev/urandom in Unix-like OS. Note that only the relevant features are illustrated in FIG. 15.

The hardware encryption/decryption apparatus of FIG. 15 is also based on the same AES counter mode cipher described above but with the AES engine implemented in software in the IPU 3012. In this fifth embodiment, it is further envisaged that the user provides a password via a user input interface 3052, such as a keyboard.

For hardware encryption of data traveling from the PCU 106 to the IPU 3012, the user enters a password that is hashed with a salt obtained from the RNG 3056 to produce an encryption key. The encryption key is then supplied to the software AES engine 3048 with an IV, also obtained from the RNG 3056, to produce an AES bit-stream, denoted by AES-BS. The AES bit-stream may be stored in the FIFO memory 3018 before being used to encrypt the data at the bitwise-XOR logic gate 3006 to obtain Data⊕AES-BS. The salt and the IV may be stored securely in the key store 3044 such as a password-protected thumb drive. In other embodiments, the salt and the IV may be stored in the DSU 3036. In this case, the key store 3044 is not needed.

For hardware decryption, the IPU 3012 first retrieves the corresponding salt and IV from the key store 3044. The user provides the password that is hashed with the salt to obtain the decryption key, which is supplied to the software AES engine 3048 together with the IV to produce the AES bit-stream, AES-BS. The AES bit-stream may be stored in the FIFO memory 3018 before being used to decrypt Data⊕AES-BS coming from the DSU 3036. The decrypted data are then transferred to the PCU 106. If the salt and the IV have been stored in the DSU 3036, the IPU 3012 sends the user-provided password to the DSU 3036 where it is hashed with the salt to obtain the decryption key. Then the decryption key and the IV are sent to the PCU 106 for decrypting the data.

Note that the third and fourth embodiments described above in association with FIG. 14 and FIG. 15 employ the AES counter mode cipher for encryption and decryption with bitwise-XOR. This has the advantage of potentially being implemented at high throughput as compared with other modes. It is envisaged that other cipher schemes may be employed according to different embodiments.

Figure 16:
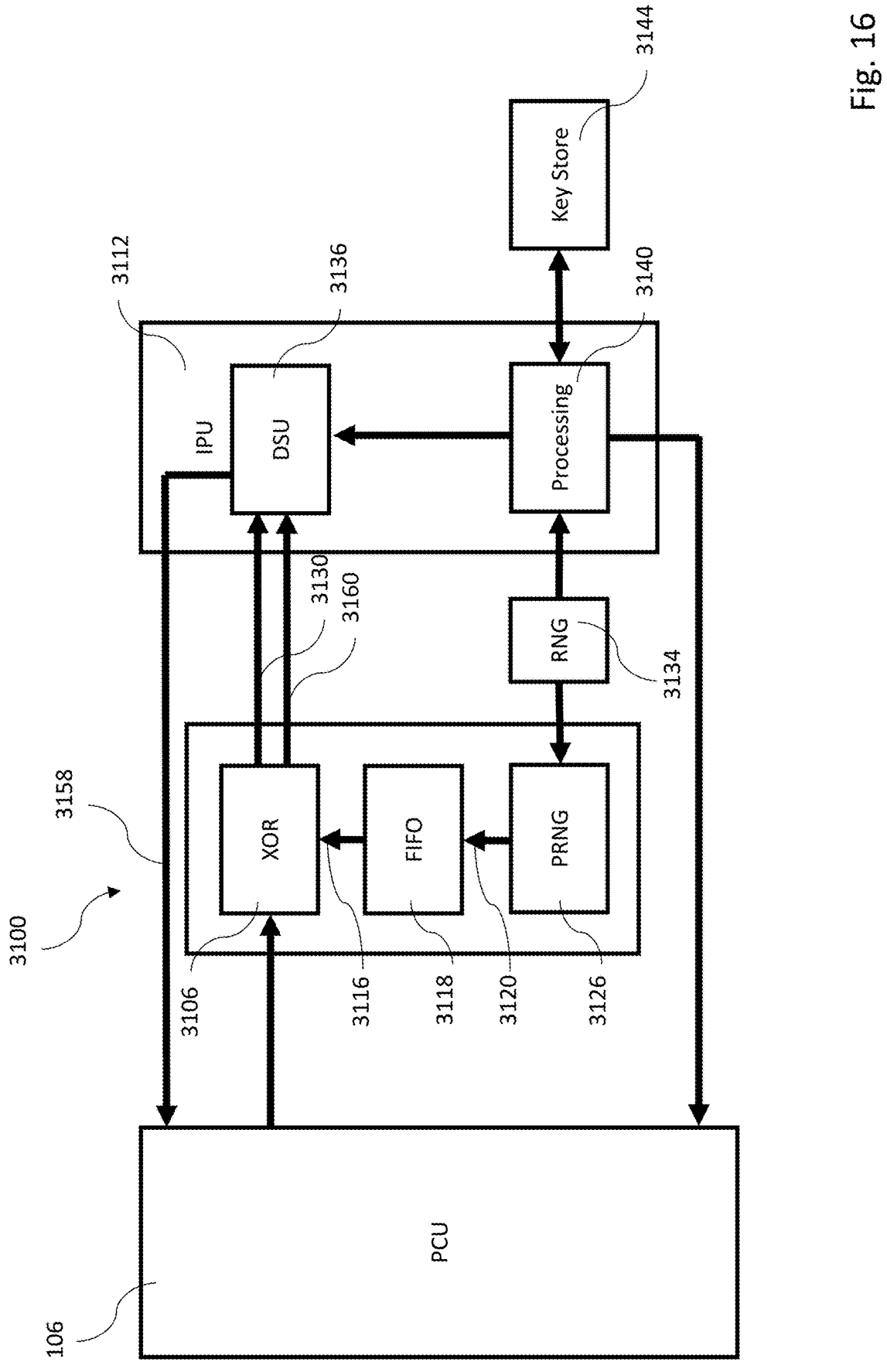
FIG. 16 illustrates a sixth embodiment computing apparatus which is similar to FIGS. 13 and 14 but implements only hardware encryption.

FIG. 16 illustrates a sixth embodiment computing apparatus which employs the OTP method for hardware encryption of data (as in the first embodiment of FIG. 1a). The sixth embodiment computing apparatus is similar to that of the fourth embodiment illustrated in FIGS. 13 and 14. The sixth embodiment computing apparatus includes a hardware encryption module 3100, instead of the single hardware platform 300, which includes a XOR logic gate 3106, a FIFO memory 3118 and a PRNG 3126; and a RNG 3134 configured to provide random numbers to both the processing unit 3140 of the IPU 3112 and the PRNG 3126. The computing apparatus further includes two parallel unidirectional links 3130, 3160 that connect the XOR-gate to the DSU 3136 and an unencrypted unidirectional link 3158 for transferring data from the DSU 3136 to the PCU 106. There is also an optional key store 3144. Note that only the relevant features are illustrated in FIG. 16.

Random bits from the RNG 3134 are used to seed a hardware-implemented PRNG 3126 such as a linear-feedback shift register (LFSR) to produce a continuous stream of pseudo-random OTP key at high speed. In the described embodiment, the seed is renewed regularly to avoid recurrent patterns in the OTP key. This OTP key is stored in the FIFO memory 3118 before being used to encrypt data at the bitwise-XOR gate 3106 to produce OTP-encrypted data, Data⊕OTP. The OTP-encrypted data and the OTP key are then sent to the DSU 3136 for storage via the parallel links 3130 and 3160. In some cases, the hardware RNG 3134 may produce truly random bits at sufficiently high speed. In such cases, the raw bits may be used directly as OTP key without randomness expansion. For decryption, the DSU 3136 sends both Data⊕OTP and the OTP key to the PCU 106 via the unidirectional link 3158. Optionally, before storage, the OTP-encryption may be converted to AES counter mode encryption inside the DSU 3136 to save storage space, as described above with respect to FIG. 8.

Figure 17:
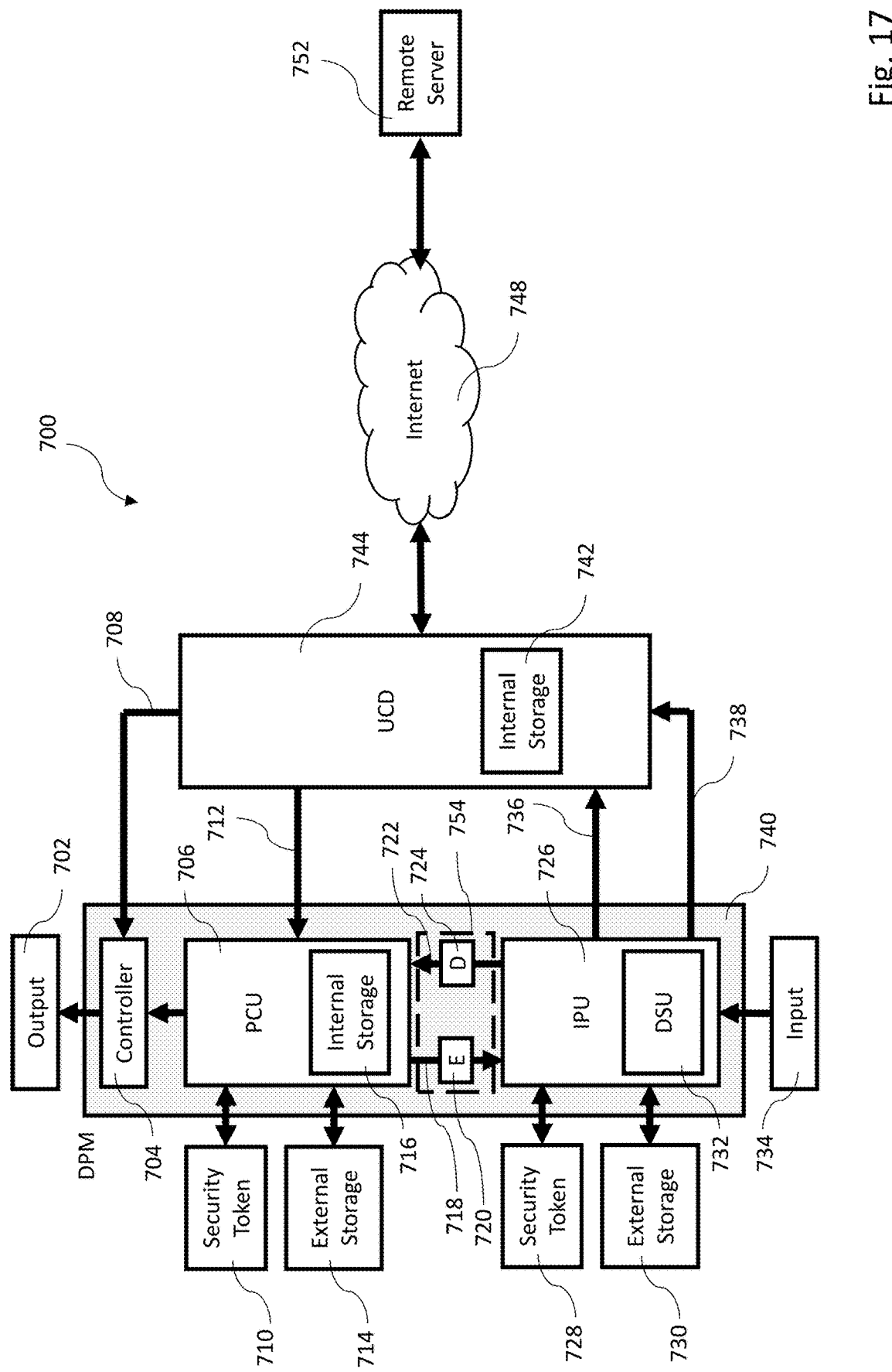
FIG. 17 illustrates a seventh embodiment computing apparatus which is functionally similar to the previously described embodiments and employed as a data protection module for a secure thick client.

FIG. 17 illustrates a seventh embodiment computing apparatus 700 which is functionally similar to the previously described embodiments. The seventh embodiment computing apparatus 700 includes a data protection module (DPM) 740 which includes a user computer system including first computing device (also called private computing unit, PCU) 706, itself including an internal storage device 716; a controller 704; and a data handling device including a second computing device (also called input processing unit, IPU) 726, itself including a data storage unit (DSU) 732. The controller 704 is configured to transfer computer screen data and/or audio data received from the PCU 706 and from an unsecured computing device (UCD) 744 to output devices 702. The UCD 744 is a computing device that has access to the Internet. It includes an internal storage device 742 and is connected to the DPM 740 via four communication links 708, 712, 736, 738 as outlined below.

As in the computing apparatuses of the previously described embodiments, the DPM 740 also includes a communication link 754 which includes a first unidirectional link 718 for transferring data from the user computer system to the data handling device and a second unidirectional link 722 for transferring data from the data handling device to the user computer system. The first unidirectional link 718 includes a hardware encryption module 720 and the second unidirectional link 722 includes a hardware decryption module 724.

The computing apparatus 700 also includes a third unidirectional link 708 for transferring computer screen data and/or audio data from the UCD 744 to the controller 704, a fourth unidirectional link 712 for transferring data from the UCD 744 to the PCU 706, a fifth unidirectional link 736 for transferring data from the IPU 726 (including the DSU 732) to the UCD 744 and a sixth unidirectional link 738 for relaying user inputs received from peripheral input devices 734 to the UCD 744. No other communication links other than the above listed unidirectional links are provided between the UCD 744, the IPU 726 and the PCU 706.

Further included in the computing apparatus 700 are at least one output device 702, such as a monitor configured to receive and display computer screen data from the controller 704; at least one peripheral input device 734, such as a keyboard and a mouse configured to provide user inputs to the IPU 726; a first security token 710 such as a password-protected smartcard or hardware security module (HSM) in two way communication with the PCU 706; a second security token 728 in two way communication with the IPU 726; a first external storage device 714 in two way communication with the PCU 706; and a second external storage device 730 in two way communication with the IPU 726. It should be appreciated that the security tokens 710, 728, and external storage devices 714, 730 are optional and not essential for the DPM 740 to perform its data operations.

In operation, the DPM 740 may be employed as a secure thick client. As illustrated in FIG. 17, the DPM 740 may be connected to a gateway, in this case a networked computer device, UCD 744, that has Internet access and may connect to a remote server 752 over the Internet 748.

Since the UCD 744 is connected to the Internet, it may be undesirable to process any important data in the UCD 744. Instead, the user may install software such as business applications in the PCU 706 and to use it to process sensitive and important data locally. The user may also save sensitive data locally in the DSU 732. It will be appreciated that the UCD 744 can be any kind of device, not limited to computers, that serves as a gateway to the Internet.

The first unidirectional link 718 and the hardware encryptor 720 may allow the user to securely move files from the PCU 706 to the DSU 732, which is embedded into the IPU 726, and save the files there in encrypted form. The second unidirectional link 722 and the optional hardware decryptor 724 allow the user to send files from the DSU 732 to the PCU 706 for viewing, editing, or processing. The second unidirectional link 722 may also relay user inputs to the PCU 706. Alternatively, a separate set of peripheral input devices (not shown) may be connected to the PCU 706 for the user to provide direct inputs to the PCU 706.

The external data storage devices 714 and 730 may be configured for backup or transfer of important files. However, it will be appreciated that it is important to ensure that these external storage devices are free from malware as introducing malware into the IPU 726 and DSU 732 compromises the security of the DPM 740.

Optionally, security tokens 710 and 728 such as password-protected smartcards or HSMs may be used to store a user's cryptographic keys. Alternatively, security tokens 710 and 728 may be omitted and the user's cryptographic keys may be stored in the IPU 726 or DSU 732 and sent to the PCU 706 when required.

Thus, the configuration of the DPM 740, particularly the communication link 754, may enable the DPM 740 to provide data protection in environments such as bring your own device (BYOD) work environments.

Figure 18:
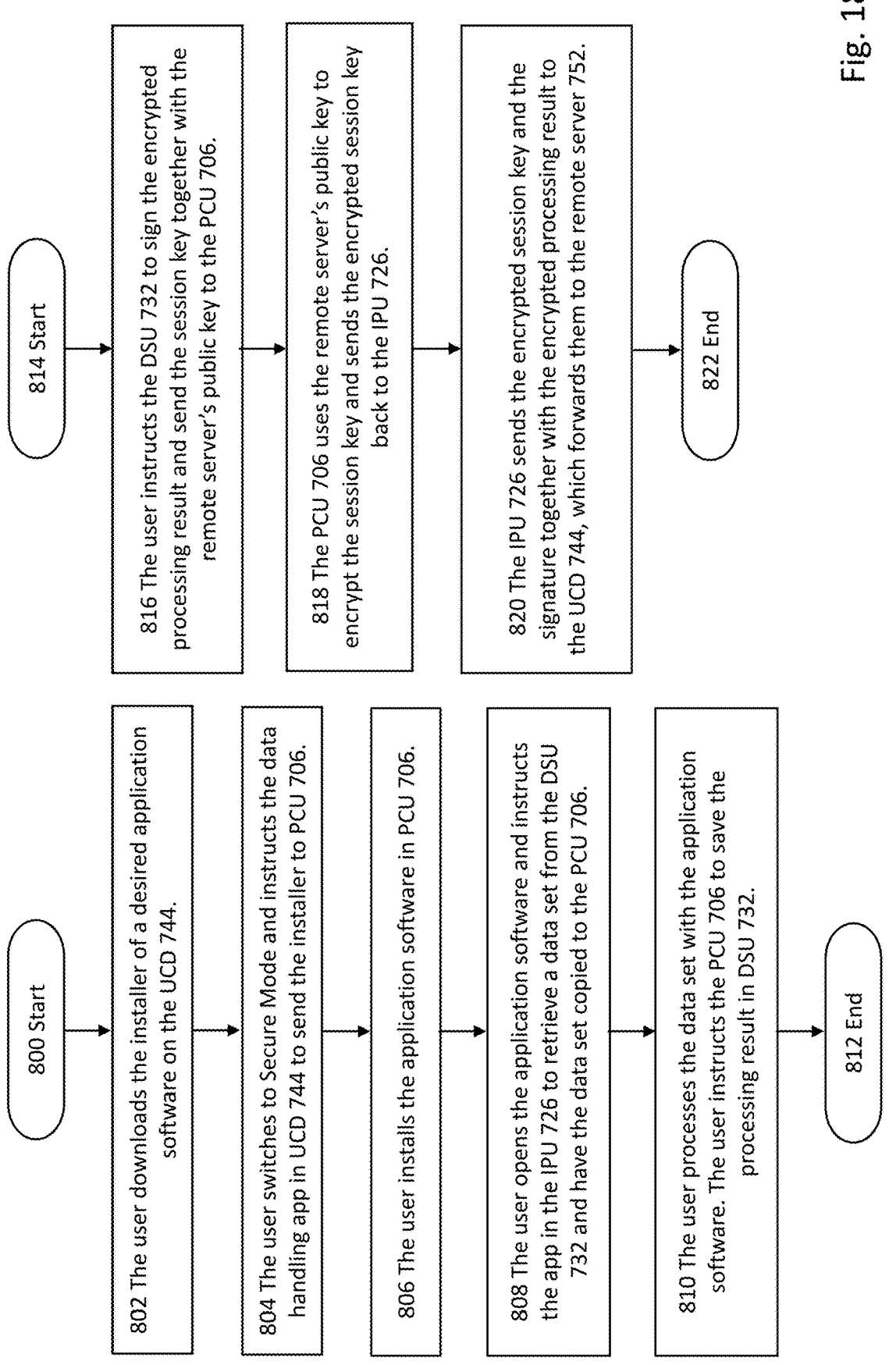
FIG. 18 illustrates a method of installing an application software using the apparatus of FIG. 17.

As an example of how the computing apparatus 700 may be used, FIG. 18 illustrates a method of installing an application software in the PCU 706, using the application software to process a data set retrieved from the DSU 732, saving the processing result in DSU 732, and sending the processing result to the remote server 752. The details of each step are described below.

In step 800, the user wishes to process a data set locally using a new application software that is not yet installed in the user's computing device.

In step 802, the user downloads the installer of the desired application software on the UCD 744.

In step 804, software is executed in the UCD 744, for example the CD 3 data handling app described in FIG. 4 above to send the installer to the PCU 706. In an embodiment, the UCD 744 is configured with a Secure Mode to be switched on by the user in order to execute the software, as described above.

In step 806, the user installs the application software in the PCU 706.

In step 808, the user opens the new application software and instructs the IPU 726, for example via the CD 2 data handling app discussed above, to retrieve the data set from the DSU 732 and copy it to the PCU 706. As the data set is stored in encrypted form in the DSU 732, it is first decrypted either at the hardware decryptor 724 or in the PCU 706 before it can be used for processing.

In step 810, the user processes the data set with the newly installed application software. After the processing is completed, the user instructs the PCU 706 to save the processing result in the DSU 732, for example by executing the CD 1 data handling app as described in accordance with FIG. 5. The processing result is transferred from the PCU 706 to the DSU 732 via the unidirectional link 718 connecting the PCU 706 to the DSU 732. During the transfer, the processing result is encrypted by the hardware encryptor 720 so that any malware that may attempt to infiltrate the IPU 726 by disguising itself as a processing result is rendered harmless by the encryption. The encryption key is sent together with the encrypted processing result to the DSU 732.

In step 812, the processing result is stored securely in the DSU 732.

In step 814, the user wishes to send the processing result to the remote server 752.

In step 816, the user instructs the DSU 732 to sign the hash of the encrypted processing result using the user's signing key, for example via the execution of the CD2 data handling app on the IPU 726, as described above. The key that was used to encrypt the processing result may be used as the session key. Alternatively, the IPU 726 may generate a new session key and use the method described in FIG. 8 above to replace the old key with the new session key. The DSU 732 then sends the session key and the remote server's public key to the PCU 706. If the remote server's public key is stored in encrypted form in the DSU 732, then the decryption key needed to decrypt the remote server's public key is sent to the PCU 706 as well. Either the hardware decryptor 724 or the PCU 706 performs decryption to obtain the remote server's public key.

In step 818, the PCU 706 uses the remote server's public key to encrypt the session key. After that, the encrypted session key is sent back to the IPU 726 via the encrypted link 718.

In step 820, the IPU 726 sends the encrypted session key and signature, together with the encrypted processing result to the UCD 744, which removes encryption by the hardware encryptor 720 and forwards the data to the remote server 752.

Figure 19:
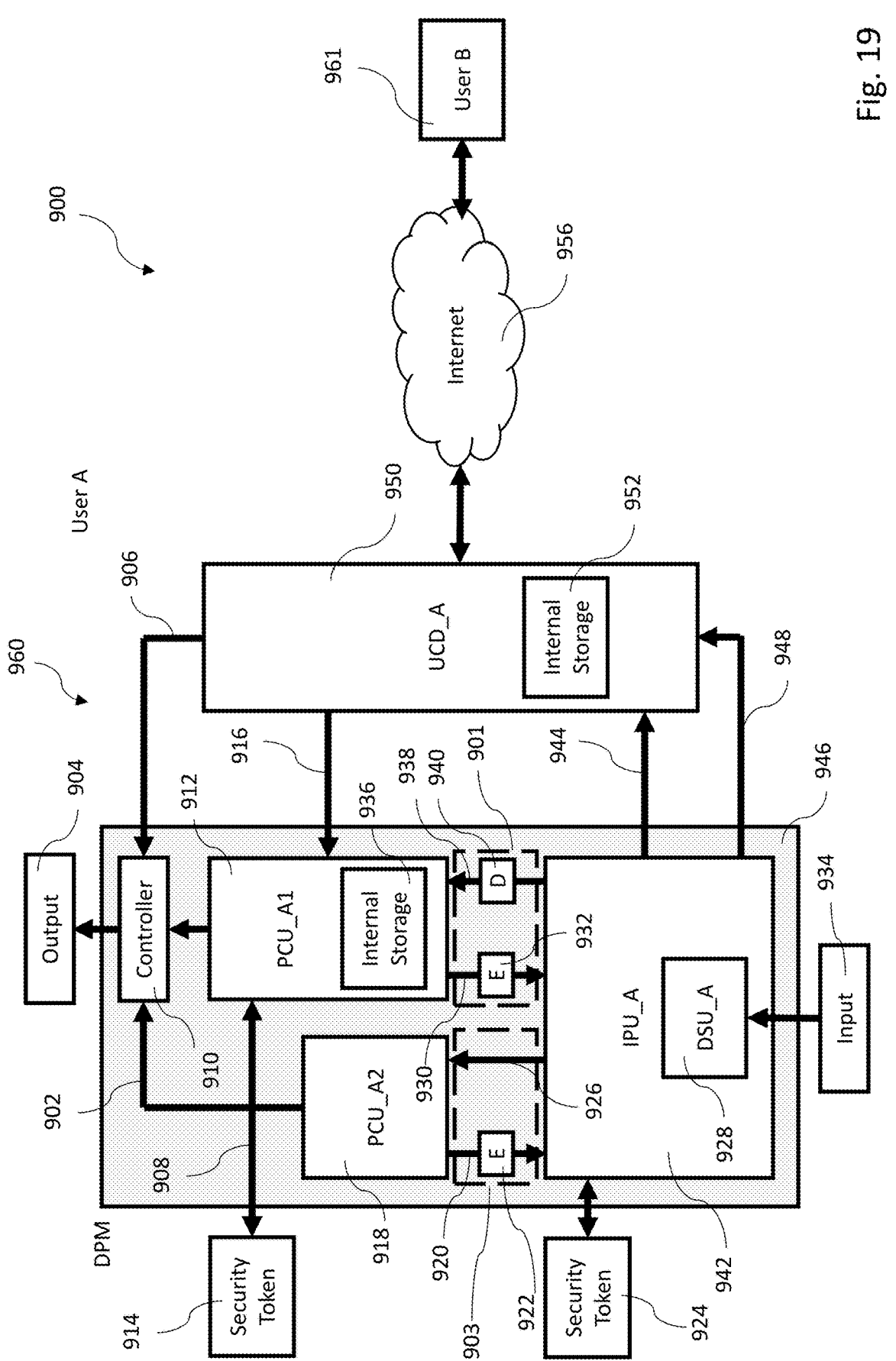
FIG. 19 illustrates an eighth embodiment computing apparatus which includes two users communicating securely over the Internet.

FIG. 19 illustrates an eighth embodiment computing apparatus 900 which is functionally similar to the previously described embodiments. The eighth embodiment computing apparatus 900 comprises two user devices, a user A device 960 and a user B device 961 in two-way connection via the Internet 956. The user A device 960 includes a data protection module (DPM) 946 which includes a first user computer system including first computing device (first private computing device, PCU_A1) 912, itself including an internal storage device 936, and a controller 910; and a data handling device including a second computing device (input processing unit, IPU_A) 942, itself including a data storage unit (DSU_A) 928. In contrast to the above-described embodiments, however, the DPM 946 further includes a second user computer system (second private computing device, PCU_A2) 918. The controller is configured to transfer computer screen data and/or audio data received from both the PCU_A1 912 and the PCU_A2 918, as well as an unsecured computing device (UCD_A) 950 also included in the user A device 960, to output devices 904. The UCD_A 950 includes an internal storage device 952 and is connected to a remote user (User B) 960 via a public network 956 which is over the Internet.

The DPM 946 also includes a first communication link 901 which includes a first unidirectional link 930 for transferring data from the first user computer system to the data handling device and a second unidirectional link 938 for transferring data from the data handling device to the first user computer system. The first unidirectional link 930 includes a hardware encryption module 932 and the second unidirectional link 938 includes a hardware decryption module 940.

Further, the DPM 946 also includes a second communication link 903 which includes a third unidirectional link 920 for transferring data from the second user computer system to the data handling device and a fourth unidirectional link 926 for transferring data from the data handling device to the second user computer system. The third unidirectional link 920 includes a hardware encryption module 922. In the described embodiment, no decryption module is included in fourth unidirectional link 926.

The user A device 960 also includes a fifth unidirectional link 906 for transferring computer screen data and/or audio data from the UCD_A 950 to the controller 910, a sixth unidirectional link 916 for transferring data from the UCD_A 950 to the PCU_A1 912, a seventh unidirectional link 944 for transferring data from the IPU_A 942 to the UCD_A 950 and an eighth unidirectional link 948 for relaying user inputs received from peripheral input devices 934 to the UCD_A 950. It should be appreciated that the only connections for the transfer of data between the UCD_A, the PCU_A1, the PCU_A2 and the IPU_A are the unidirectional links described above and illustrated in FIG. 19.

Further included in the user A device are one or more output devices 904, for example a monitor configured to display computer screen data received from the controller 910; one or more peripheral input devices 934, such as a keyboard and a mouse configured to provide user inputs to the IPU_A 942; a first security token 914 such as a password-protected smartcard or HSM in two-way communication with the PCU_A1 912; and a second security token 924 in two-way communication with the IPU_A 942. The security tokens 914 and 924 are optional and not essential for the DPM 946 to perform its functions.

As should be appreciated from FIG. 19, PCU_A1 912 is connected to the UCD_A 950 via the sixth unidirectional link 916 that allows data to move from the UCD_A 950 to the PCU_A1 912 but not in the opposite direction. In operation, the PCU_A1 912 may hold the user's private key for decrypting incoming messages for the user to view. Alternatively, the private key may be stored in the security token 914 such as a password-protected smartcard or HSM connected to the PCU_A1 912. The user may view and edit files downloaded from the Internet in the PCU_A1 912 and save the files in the DSU_A 928 via the first unidirectional link 930. The hardware encryptor 932 encrypts all data that pass through the first unidirectional link 930 to help to ensure that the IPU_A 942 and the DSU_A 928 are free from malware.

The PCU_A2 918 may be dedicated to private computing activities such as writing personal diaries, drafting confidential reports, creating technical drawings, etc. As the PCU_A2 918 is not connected to the UCD_A 950, there is no possibility of malware, such as spyware or ransomware entering from the UCD_A 950 and thereby performing any malicious actions in the PCU_A2 918.

The PCU_A2 918 may also be used for encrypting session keys for secure communications. When the user wishes to send a private message to a recipient, the IPU_A 942 may encrypt the message with a session key, retrieve the recipient's public key from the DSU_A 928, and send the session key together with recipient's public key to the PCU_A2 918. PCU_A2 918 uses the recipient's public key to encrypt the session key and send the encrypted session key back to the IPU_A 942. Since the PCU_A2 is not connected to the UCD_A 950, it may not be possible for malware originating from the UCD_A 950 to interfere with this process.

Thus, it will be appreciated that multiple private computing units may be employed, each having a different role.

It is envisaged that the user B device 961 may comprise an apparatus identical to the user A device 960 or it may comprise a different computing apparatus, including a computing apparatus according to a different embodiment described herein. Thus, the computing apparatus 900 is flexible.

Figure 20:
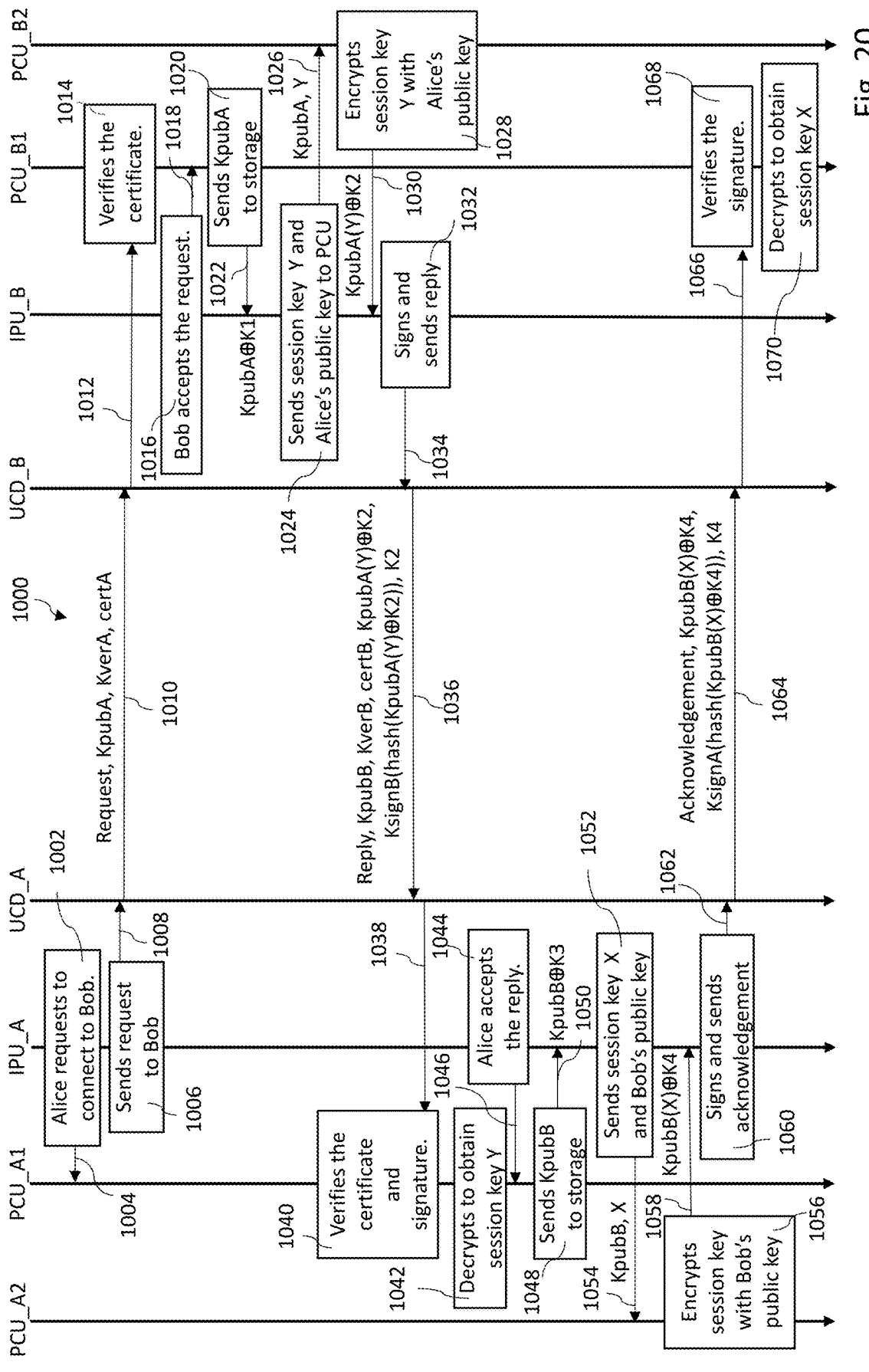
FIG. 20 illustrates a method of establishing session keys between the two users of the apparatus of FIG. 19.

FIG. 20 illustrates an example method of establishing session keys between the user A device 960 and the user B device 961 (i.e., between "Alice" and "Bob", respectively) having an identical architecture as the user A device 960 (the user of which is referred to as Alice below) illustrated in FIG. 19, i.e., the user B device 961 (the user of which is referred to as Bob below) includes a first private computing device, PCU_B1, an input processing unit, IPU_B itself including a data storage unit (DSU_B), a second private computing device, PCU_B2, an unsecured computing device (UCD_B) and corresponding unidirectional links between them, arranged as in the user A device 960.

In step 1002, under the Secure Mode, Alice opens a secure messaging software on the IPU_A 942 and clicks on the 'Request to Connect' button or performs some other equivalent action to activate the "request-to-connect" process. She keys in Bob's name or email address or some other form of identification.

In step 1004, as Alice types on her keyboard 934, the IPU_A 942 sends her keystrokes to the PCU_A1 912 via the second unidirectional link 938 so that the monitor 904 can display on screen what she typed.

In step 1006, when Alice is finished with the typing, she enters a "send request" command or clicks on the 'Send Request' button located on the window of the secure messaging software. The IPU_A 942 sends Alice's request message comprising Alice's public key, KpubA for encrypting data to Alice, her signature verification key, KverA, with the relevant certificates, certA, to UCU_A 950.

In step 1008, the request message is received by the UCU_A 950 via the seventh unidirectional link 944.

In step 1010, the UCU_A 950 forwards Alice's request message to Bob over the public network 956.

In step 1012, the UCD_B receives the request message and forwards it to the PCU_B1 via the corresponding unidirectional link.

In step 1014, upon receiving Alice's request message, the PCU_B1 verifies Alice's certificates, certA. This may be done using root certificates that has already been installed in the PCU_B1.

In step 1016, upon successful verification of Alice's certificate, Bob is notified of Alice's request. The notification may be a pop-up message shown on a computer screen or a message sent to Bob's mobile phone. Bob switches to the Secure Mode, opens a secure messaging software on IPU_B and clicks on the 'Accept Connection Request' button on a window of the secure messaging software or performs some equivalent action to accept the request.

In step 1020, the PCU_B1 saves Alice's signature verification key, KverA, and sends Alice's public key, KpubA, to the DSU_B for storage.

In step 1022, as it travels via the corresponding unidirectional link connecting the PCU_B1 and the IPU_B, KpubA is encrypted by a hardware encryptor to become KpubA⊕K1, where K1 is the encryption key. For simplicity, OTP-encryption is assumed here but other encryption schemes such as AES counter mode may be used as well. In the case of OTP-encryption, both KpubA⊕K1 and the OTP key K1 are saved in the DSU_B included in the IPU_B.

In step 1024, the IPU_B generates a new session key Y. The session key may be supplied to the IPU_B from a hardware RNG connected to it or it may be generated via other means, such as from a cryptographically secure PRNG, etc. The IPU_B sends Y together with KpubA⊕K1 and K1 to the PCU_B2.

In step 1026, the corresponding unidirectional link from the IPU_B to the PCU_B2 does not have a hardware decryptor, and so KpubA⊕K1 remains in encrypted form as it traverses the link.

In step 1028, the PCU_B2 decrypts KpubA⊕K1 using the key K1 and encrypts Y with KpubA to obtain KpubA(Y). The PCU_B2 sends KpubA(Y) back to the IPU_B.

In step 1030, a hardware encryptor on the corresponding unidirectional link connecting the PCU_B2 and the IPU_B encrypts KpubA(Y) into KpubA(Y)⊕K2, and the IPU_B receives both KpubA(Y)⊕K2 and K2, where K2 is the OTP key.

In step 1032, the IPU_B signs the hash of KpubA(Y)⊕K2 using Bob's signing key, KsignB. It then sends the reply message comprising Bob's public key, KpubB, signature verification key, KverB, with the relevant certificates, certB, the encrypted session key, KpubA(Y)⊕K2, the key, K2, and the signature, KsignB(hash(KpubA(Y)⊕K2)) to the UCD_B.

In step 1034, Bob's reply message is sent from the IPU_B to the UCD_B over unidirectional link.

In step 1036, the UCD_B forwards Bob's reply message to Alice over the public network 956.

In step 1038, upon receiving Bob's reply message, UCU_A 950 forwards it to the PCU_A1 912 via the sixth unidirectional link 916.

In step 1040, the PCU_A1 912 verifies Bob's certificates, certB, using root certificates that are already installed in the PCU_A1 912. The PCU_A1 912 calculates the hash of KpubA(Y)⊕K2 and uses Bob's signature verification key, KverB, to verify that KsignB(hash(KpubA(Y)⊕K2)) is indeed signed by Bob.

In step 1042, the PCU_A1 912 obtains the session key Y by first using the received key K2 to decrypt KpubA(Y)⊕K2, and then decrypting KpubA(Y) using Alice's private key, KprivA. The PCU_A1 912 stores the session key Y locally.

In step 1044, upon successful verification of Bob's certificates, certB, and Bob's signature, and successful decryption of KpubA(Y) to obtain the session key Y, Alice is notified of Bob's reply. The notification may be a pop-up message shown on the monitor 904. Alice accepts the reply by clicking on the 'Accept' button or by performing an equivalent action.

In step 1048, the PCU_A1 912 saves Bob's signature verification key, KverB, locally in the internal storage device 936 and sends Bob's public key, KpubB, to the DSU_A 928 for storage. Preferably, the PCU_A1 912 to also sends a copy of KverB to the DSU_A 928 for storage.

In step 1050, as KpubB travels on the unidirectional link 930 from the PCU_A1 912 to the IPU 942, the hardware encryption module 932 encrypts KpubB to KpubB⊕K3 where K3 is the OTP key. Both KpubB⊕K3 and K3 are stored in the DSU_A 928.

In step 1052, the IPU_A 950 generates a new session key X and sends X together with KpubB⊕K3 and K3 to the PCU_A2 918.

In step 1054, the fourth unidirectional link 926 connecting the IPU_A 942 and the PCU_A2 918 does not have a hardware decryptor, and so KpubB⊕K3 remains in encrypted form as it traverses the link.

In step 1056, the PCU_A2 918 decrypts KpubB⊕K3 using the key K3 to obtain KpubB, and it uses KpubB to encrypt the session key X to obtain KpubB(X).

In step 1058, the PCU_A2 918 sends KpubB(X) back to the IPU_A 950 via the third unidirectional link 920. The hardware encryption module 922 encrypts KpubB(X) to obtain KpubB(X)⊕K4, and it sends both KpubB⊕K4 and the OTP key K4 to the IPU_A 942.

In step 1060, the IPU_A 942 signs the hash of KpubB (X)⊕K4 using Alice's signing key, KsignA, and sends an acknowledgement message comprising KpubB(X)⊕K4, KsignA(hash(KpubB(X)⊕K4)) and K4 to the UCD_A 950.

In step 1062, the acknowledgement message is received by the UCD_A 950 via the seventh unidirectional link 944.

In step 1064, the UCD_A 950 sends the acknowledgement message to Bob over the public network 956.

In step 1066, upon receiving Alice's acknowledgement message, the UCU_B forwards the message to the PCU_B1 via the corresponding unidirectional link.

In step 1068, the PCU_B1 first calculates the hash of KpubB(X)⊕K4 to obtain hash (KpubB(X)⊕K4) and then uses Alice's signature verification key, KverA, to verify that KsignA(hash(KpubB(X)⊕K4)) is indeed signed by Alice.

In step 1070, the PCU_B1 decrypts KpubB(X)⊕K4 using the received key K4 and Bob's private key KprivbB to obtain the session key X. The PCU_B1 stores the session key X locally.

Figure 21:
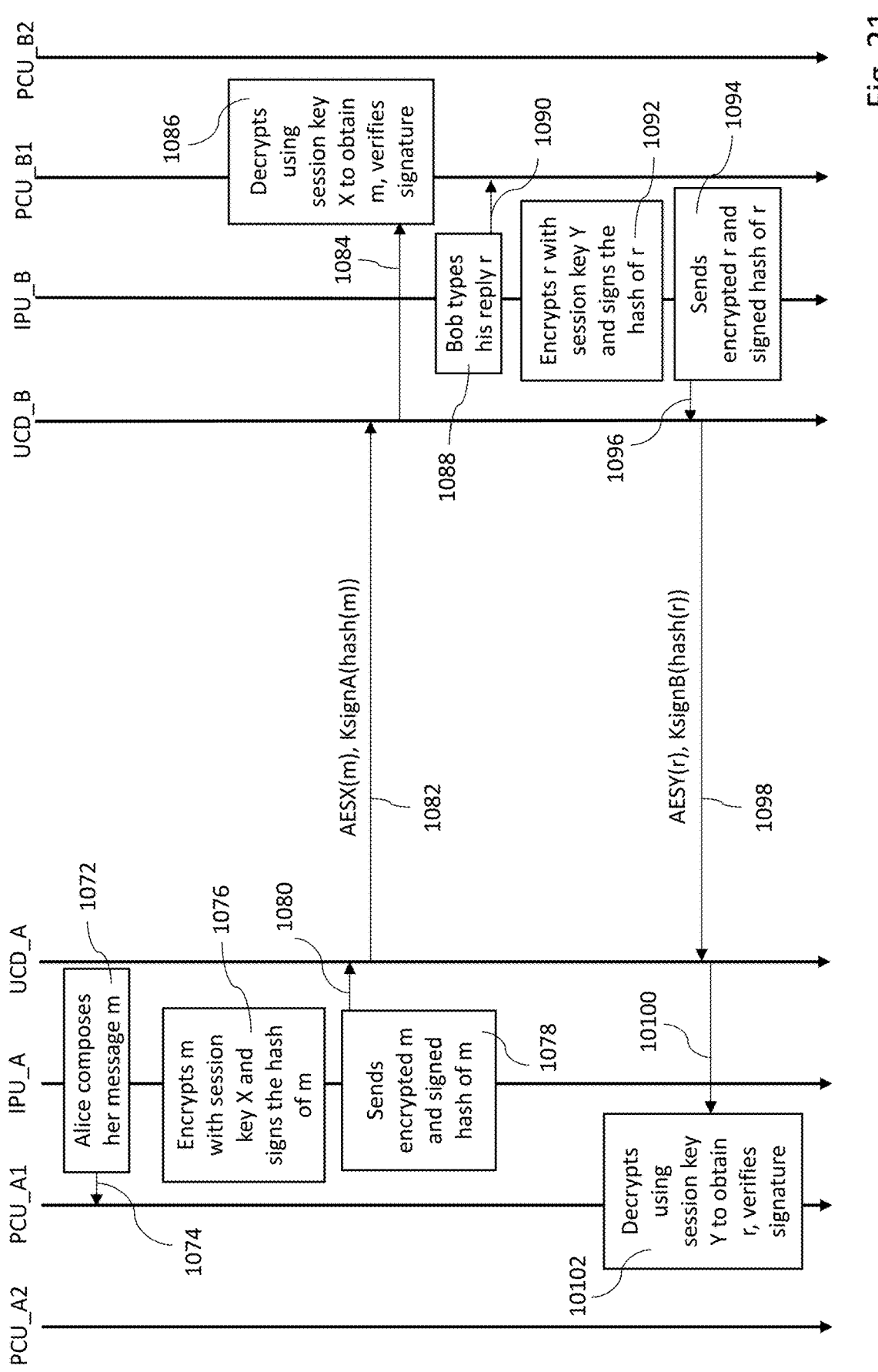
FIG. 21 illustrates a method of secure communication between the two users of the apparatus of FIG. 19.

Following the performance of the method illustrated in FIG. 20, Alice and Bob may then communicate securely using the session keys X and Y. FIG. 21 illustrates a method of communication between the two.

In step 1072, Alice composes her message m in the IPU_A 942.

In step 1074, her keystrokes are sent to the PCU_A1 912 in real-time via the second unidirectional link 938 for her to view on the monitor 904 what she is typing.

In step 1076, when Alice has finished typing her message, she clicks on the 'Encrypt & Send' button located on the window of the secure messaging software. Alternatively, she may enter a corresponding command into IPU_A 942 or perform an equivalent action to initiate the 'encrypt and send' function. The IPU_A 942 encrypts m with session key X using an agreed symmetric cipher such as AES-256 to obtain AESX(m) and signs the hash of m using Alice's signing key, KsignA, to obtain KsignA(hash(m)).

In step 1078, the IPU_A 942 sends the encrypted message AESX(m) and signature KsignA(hash(m)) to the UCD_A 950.

In step 1080, the encrypted and signed message traverses the seventh unidirectional link 944 to the UCD_A 950.

In step 1082, the UCD_A 950 forwards the encrypted message and signature to Bob over the public network 956.

In step 1084, the UCU_B 982 forwards the message received from Alice to the PCU_B1 via the corresponding unidirectional link.

In step 1086, the PCU_B1 uses the session key X to decrypt AESX(m) to obtain Alice's message m. The PCU_B1 hashes m to obtain hash (m) and uses Alice's signature verification key, KverA, to verify that KsignA (hash(m)) is indeed signed by Alice. Alice's message is displayed on Bob's monitor display. Bob reads Alice's message.

In step 1088, Bob composes his reply, r.

In step 1090, as Bob types on his keyboard, his keystrokes are sent to the PCU_B1 in real-time via the corresponding unidirectional link so that he can view what is being typed on his monitor screen.

In step 1092, When Bob is done, he clicks on the 'Encrypt & Send' button located on the window of the secure messaging software or performs an equivalent action. The IPU_B encrypts r with session key Y using the agreed symmetric cipher, which in this example is AES-256, to obtain AESY(r) and signs the hash of r using Bob's signing key, KsignB to obtain KsignB(hash(r)).

In step 1094, the IPU_B sends the encrypted reply AESY (r) and signature KsignB(hash(r)) to the UCD_B.

In step 1096, the encrypted reply and signature traverse the corresponding unidirectional link to the UCD_B.

In step 1098, the UCD_B forwards the encrypted reply and signature to Alice over the public network 956.

In step 10100, the UCD_A 950 forwards the message received from Bob to the PCU_A1 912 via the sixth unidirectional link 916.

In step 10102, the PCU_A1 912 uses the session key Y to decrypt AESY(r) to obtain Bob's reply r. The PCU_A1 912 hashes r to obtain hash (r) and uses Bob's signature verification key, KverB, to verify that KsignB(hash(r)) is indeed signed by Bob. Alice's message is displayed on the monitor display 964. Alice reads Bob's reply.

The communication goes on until one of them terminates the session.

It should be appreciated that in the methods of FIG. 20 and FIG. 21, there are two session keys X and Y. The session key X is for Alice's IPU_A 942 to encrypt messages and for Bob's PCU_B1 to decrypt Alice's messages, whereas session key Y is for Bob's IPU_B to encrypt his messages and for Alice's PCU_A1 912 to decrypt Bob's messages.

It is envisaged that the UCU_A 950 and the UCU_B 982 may utilize standard secure communication protocols such as SSL/TLS or IPsec. With use of the DPM 946, the communicated messages are encrypted end-to-end, even when the security of the messaging software in UCU_A 950 and UCU_B 982 or the standard secure communication protocols become compromised one day due to cyberattacks or zero-day vulnerabilities.

The example method described above may be modified in various ways to achieve the same goal of key establishment and secure data communication. For example, Diffie-Hellman key exchange may be carried out using a similar construction.

The DPM 946 may be integrated into an integrated chip (IC) or System-on-Chip (SoC), making it suitable for embedding into portable or handheld computing devices such as, but not limited to smartphones, tablets, etc. As with other embodiments described above, when implemented in such devices, the DPM 946 may allow users to communicate securely and protect users from malware such as spyware and ransomware.

Figure 22:
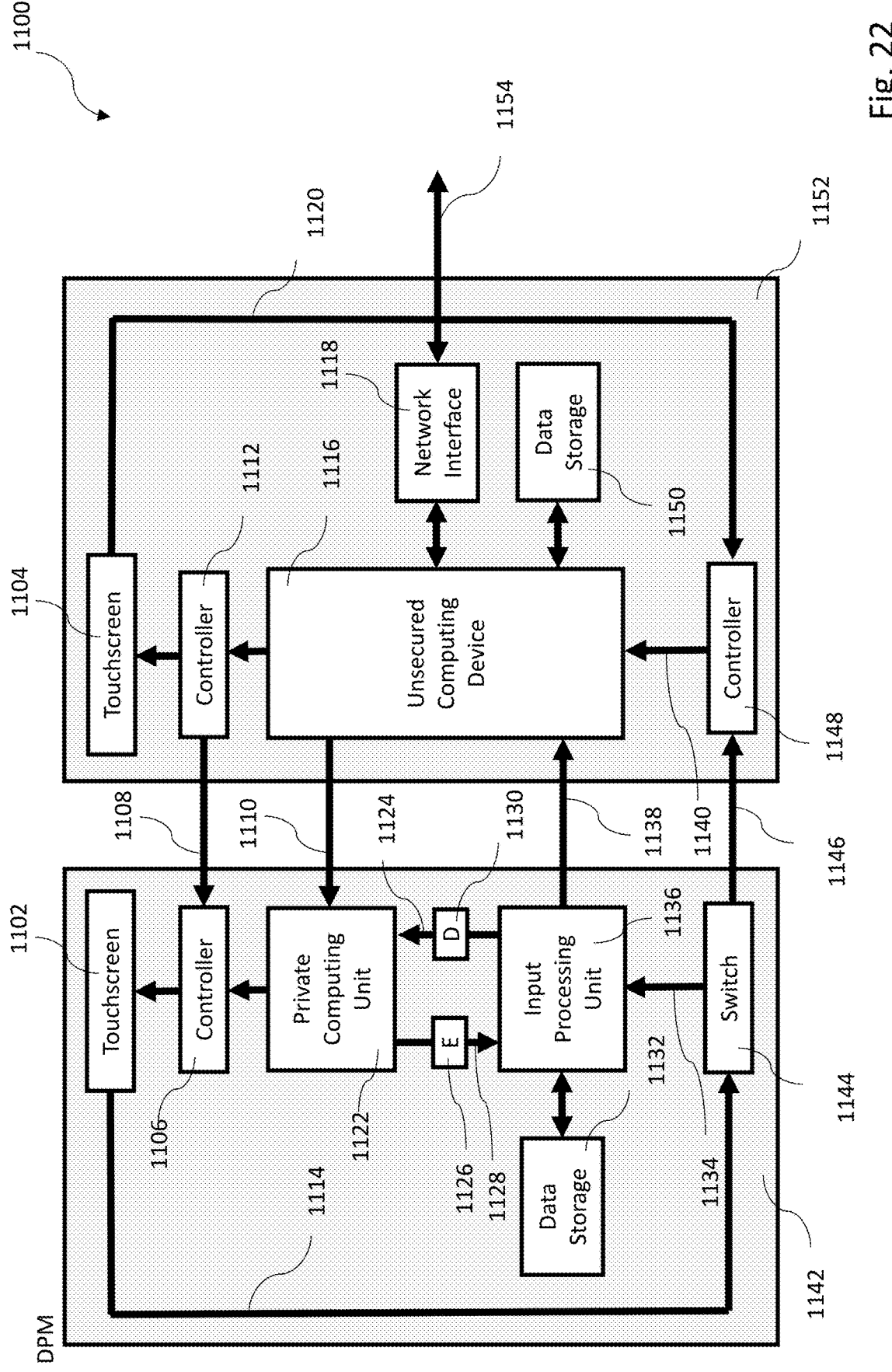
FIG. 22 illustrates a ninth embodiment computing apparatus in the form of a dual-touchscreen smartphone.

FIG. 22 illustrates a ninth embodiment computing apparatus 1100 which is functionally similar to the previously described embodiments. The ninth embodiment computing apparatus 1100 is in the form of a dual-touchscreen smartphone.

The computing apparatus 1100 includes a data protection module (DPM) 1142 which includes a first user computer system including first computing device (also called private computing device, PCU) 1122, a first controller 1106, and a first touchscreen 1102 configured to receive screen data from the first controller 1106; and a data handling device including a second computing device (also called input processing unit, IPU) 1136 and a data storage unit (DSU) 1132. The DPM 1142 further includes a selector switch 1144 which is configured to receive user input data from the first touchscreen 1102 and forward the user input data to the IPU 1136 or to another controller 1148.

The DPM 1142 also includes a first communication link which includes a first unidirectional link 1128 for transferring data from the first user computer system to the data handling device and a second unidirectional link 1124 for transferring data from the data handling device to the first user computer system. The first unidirectional link 1128 includes a hardware encryption module 1126 and the second unidirectional link 1124 includes a hardware decryption module 1130.

The computing apparatus 1100 further includes a networked computer system 1152 including an unsecured computing device (UCD) 1116, a further data storage device 1150, a second controller 1112, a second touchscreen 1104 configured to receive screen data from the second controller 1112, a network interface 1118, and a third controller 1148 which is configured to receive user input data from the second touchscreen 1104 or from the first touchscreen 1102 via the selector switch 1144 and forward the user input data to the UCD 1116.

The computing apparatus 1100 further includes a third unidirectional link 1108 for transferring data from the second controller 1112 to the first controller 1108, a fourth unidirectional link 1110 for transferring data from the UCD 1116 to the PCU 1122, a fifth unidirectional link 1138 for transferring data from the IPU 1136 to the UCD 1116, a sixth unidirectional link 1146 for transferring data from the selector switch 1144 to the third controller 1148, a seventh unidirectional link 1114 for transferring user input data from the first touchscreen 1102 to the selector switch 1144, an eighth unidirectional link 1134 for transferring data from the selector switch 1144 to the IPU 1136, a ninth unidirectional link 1140 for transferring data from the third controller 1148 to the UCD 1116 and a tenth unidirectional link 1120 for transferring user input data from the second touchscreen 1104 to the third controller 1148. It should be appreciated that only the above-described unidirectional links are provided for transferring data between the PCU 1122, the IPU 1136, the UCD 1116, as well as the touchscreens 1102, 1104 and the controllers 1106, 1112, and 1150.

In use, under a Normal Mode (the selector switch 1144 operable to select the Normal Mode), the IPU 1136 is disabled. The fifth unidirectional link 1138 connecting the IPU 1136 and the UCU 1116 is disabled as well. The user may use both of the touchscreens 1102, 1104 for applications not involving private or sensitive data. User inputs from the first touchscreen 1102 can be directed to the UCU 1116 via a path comprising the seventh unidirectional link 1114, the sixth unidirectional link 1146 and the ninth unidirectional link 1140. Screen images from the UCD 1116 can be passed through the second controllers 1112 and the first controller 1106 and the third unidirectional link 1108 to be displayed on the first touchscreen 1102, as well as be displayed on the second touchscreen 1104. The UCD 1116 is connected to the external network via a network interface 1118. When the user wishes to input, view, or edit private and sensitive data, the user flips the selector switch 1144 or pushes a button (not shown) on the smartphone or performs some equivalent action to activate the Secure Mode. Under the Secure Mode, user inputs from the first touchscreen 1102 are instead directed to the IPU 1136 via the seventh unidirectional link 1114 and the eighth unidirectional link 1134. The first touchscreen 1102 may be configured to display the screen of PCU 1122, while the second touchscreen 1104 may be configured to display the screen of UCD 1116.

A camera and microphone (not shown) of the smartphone may also be connected to the IPU 1136. As discussed above, the above arrangement means that the IPU 1136 and the data storage 1132 may be free from malware. Entering, viewing, and editing of private and sensitive data in the DPM 1142 may be protected from spyware. Private and sensitive data such as chat records, private messages, emails, photos, etc. that are stored in the data storage unit 1132 may also be protected from ransomware.

It is envisaged that the concepts described above may applied to smartphones, tablets, or other portable/mobile devices with a single screen or with multiple screens as well. For single-screen devices, the screen may be split into two smaller screens, with one smaller screen displaying private and sensitive data and the other smaller screen displaying non-private and non-sensitive data. For multiple-screen smartphones, one or more of the screens may be configured for entering, viewing, or editing private and sensitive data.

Figure 23:
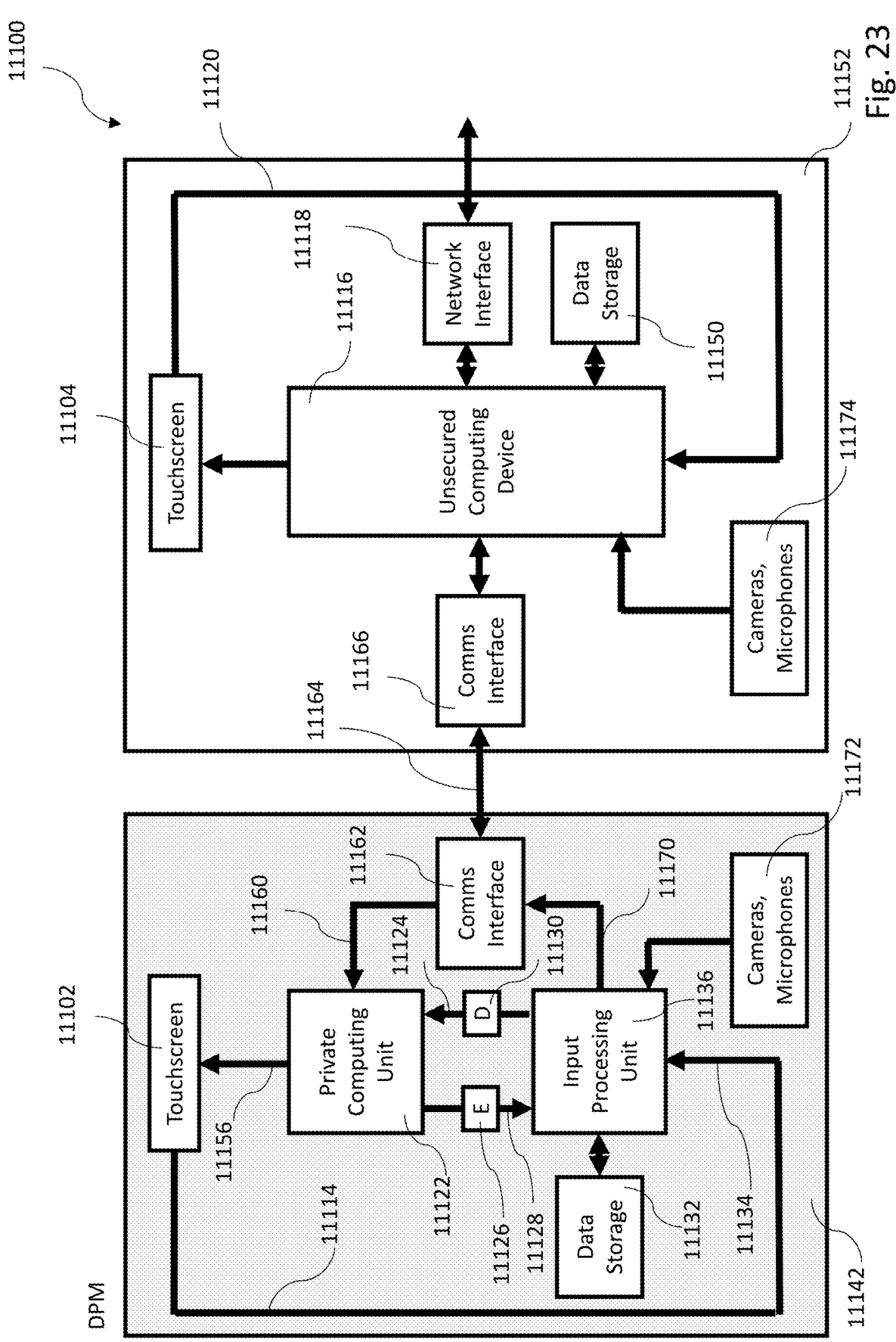
FIG. 23 illustrates a tenth embodiment computing apparatus including a data protection module in the form of a handheld or desktop device and networked computer system for example, a tablet or laptop.

FIG. 23 illustrates a tenth embodiment computing apparatus 11100 which is functionally similar to the previously described embodiments. The tenth embodiment computing apparatus 11100 includes a data protection module (DPM) 11142 in the form of a handheld or desktop device and a networked computer system 11152, for example, a tablet or laptop. The DPM 111142 is physically separated from the networked computer system 11152 but detachably connected via a connection 11164, for example via a wired connection such as USB or Ethernet, or wireless connection such as Bluetooth or Wi-Fi.

the DPM 11142 includes a first user computer system including first computing device (also called private computing device, PCU) 11122, and a first touchscreen 11102; and a data handling device including a second computing device (also called input processing unit, IPU) 11136 and a data storage unit (DSU) 11132. The DPM 21142 further includes peripheral input devices in the form of cameras and or microphones 11172 configured to provide inputs to the IPU 11136 and a communication interface 11162.

The DPM 11142 also includes a first communication link which includes a first unidirectional link 11128 for transferring data from the first user computer system to the data handling device and a second unidirectional link 11124 for transferring data from the data handling device to the first user computer system. The first unidirectional link 11128 includes a hardware encryption module 11126 and the second unidirectional link 11124 includes a hardware decryption module 11130.

The DPM 11142 further includes a third unidirectional link 11160 for transferring data from the communication interface 11162 to the PCU 11122, a fourth unidirectional link 11170 for transferring data from the IPU 11136 to the communication interface 11162, a fifth unidirectional link 11156 for transferring screen data from the PCU 11122 to the first touchscreen 11102 and a sixth unidirectional link 11114 for transferring user input data from the touchscreen 11102 to the IPU 11136.

The networked computer system 11152 includes an unsecured computing device (UCD) 11116, a further data storage device 11150 a second touchscreen 11104, a network interface 11118, further peripheral input devices in the form of further cameras and/or microphones 11174 and a second communication interface 11166.

It will be appreciated that the connection 11164 is between the first communication interface 11162 and the second communication interface 11166.

It should be appreciated that data may only be transferred between the PCU 11122, the IPU 11136 and the networked computer system 11152 only via one or more of the links described above.

The unidirectional link 11160 from the communication interface 11162 to the PCU 11122 ensures that data can only transfer in one direction into the PCU 11122 and not out of it. Similarly, the unidirectional link 11170 from the IPU

11136 to the communication interface 11162 ensures that data can only transfer in one direction out of the IPU 11136 and not into it. It is envisaged that cameras and microphones 11172 for taking private photos and recording private audio are connected to the IPU 11136 of the DPM 11142 and not to the UCD 11116. It is envisaged that further cameras and microphones 11174 that are connected to the UCD 1116 are employed for non-sensitive applications only.

It is envisaged that, optionally, the DPM 11142 may be in the form of a smartphone-like device that the user carries along with the networked computer system 11152 (for example a smartphone). Alternatively, the DPM 11142 may be in the form of a tablet or other form of portable computing device. Without limitation, the communication link 11164 may be implemented with any means of communication, such as Bluetooth, Zigbee, etc. that achieves the transfer of data between the DPM 11142 and the unsecured computing device 11152 (for example, a smartphone or a laptop computer).

Figure 24:
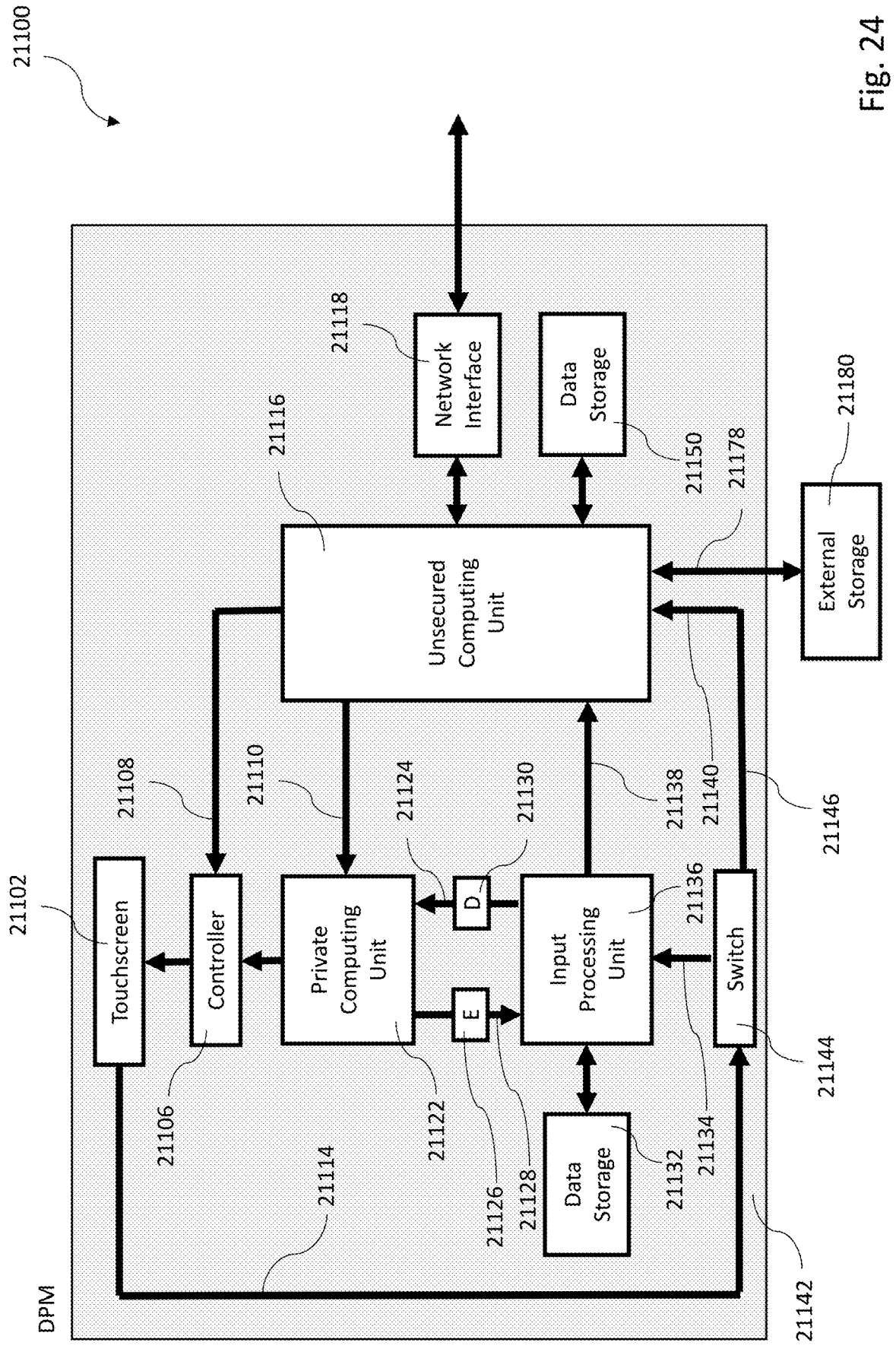
FIG. 24 illustrates an eleventh embodiment computing apparatus in the form of a smartphone with a single touchscreen.

FIG. 24 illustrates an eleventh embodiment computing apparatus 21100 in the form of a smartphone with a single touchscreen 21102. The eleventh embodiment computing apparatus 21100 includes a data protection module (DPM) 21142 including as a first user computer system including a first computing device (also called private computing device, PCU) 21122, a touchscreen 21102 and a controller 21106; and a data handling device including a second computing device (also called input processing unit, IPU) 21136, a secure data storage 21132 and a selector switch 21144.

The DPM 21142 further includes networked computer system including an unsecured computing unit (UCU) 21116, a further data storage device 21150, and a network interface 21118.

The DPM 21142 also includes a first communication link which includes a first unidirectional link 21128 for transferring data from the first user computer system to the data handling device and a second unidirectional link 21124 for transferring data from the data handling device to the first user computer system. The first unidirectional link 21128 includes a hardware encryption module 21126 and the second unidirectional link 21124 includes a hardware decryption module 21130.

The DPM 21142 further includes a third unidirectional link 21108 for transferring screen data from the UCU 21116 to the controller 21106, a fourth unidirectional link 21110 for transferring data from the UCU 21116 to the PCU 21122, a fifth unidirectional link 21138 for transferring data from the IPU 21136 to the UCU 21116, a sixth unidirectional link 21146 for transferring user input data from the selector switch 21144 to the UCU 21116, a seventh unidirectional link 21134 for transferring user input data from the selector switch 21144 to the IPU 21136 and an eighth unidirectional link 21114 for transferring user input data from the touchscreen 21102 to the selector switch 21144. It should be appreciated that data may only be transferred between the UCU 21116, the PCU 21122, and the IPU 21136 only via one or more of the unidirectional links described above.

The computing apparatus 21100 also includes an external storage device 21180 in bidirectional communication via a two-way interface 21178 with the UCU 21116.

The single touchscreen 21102 is shared by the PCU 21122 and the UCU 21116 through the controller 21106. Important data is stored in the secure data storage 21132 that is connected to the IPU 21136. The interface 21178 is in the form of USB, Bluetooth, etc. allowing connection of the external storage device 21180 to the UCU 21116. The user may transfer data in encrypted form from the secure data storage 21132 to the external storage device 21180 for backup or for some other purposes. The path taken by the data is via the IPU 21136 to the UCU 21116 via the fifth unidirectional link 21138 and then to the external storage device 21180 via the interface 21178. The user may also transfer files from the external storage device 21180 to the secure data storage 21132. The path taken by the data in this case is via the interface 21178 to the UCU 21116, via the fourth unidirectional link 21110 to the PCU 21122, and then via the first unidirectional link 21128 (which in the process the data is encrypted via the hardware encryption module 21126) to the IPU 21136, and to the secure data storage 21132. The encryption keys used by the hardware encryption module 21126 may be stored in the secure data storage 21132 as well. Secure encryption conversion as described in relation to FIG. 8 above may be performed in the IPU 21136 as needed.

FIG. 25 illustrates a twelfth embodiment computing apparatus 1200 which is functionally similar to the previously described embodiments, however, in which a DPM is connected to an external unsecured computing device (UCD) and an external private computing device (PCD) that are in the form of a user's computing devices.

As such, the twelfth embodiment computing apparatus 1200 includes a user computer system in the form of a first computing device (also called private computing device, PCD) 1214, for example a user's existing private computing device; and a data protection module (DPM) 1250 which includes a data handling device including a second computing device (also called input processing unit, IPU) 1238, and a data storage unit (DSU) 1242. The DPM 1250 also includes a controller 1232. The computing apparatus 1200 also includes peripheral input devices 1248 connected to the IPU 1236 in the form of a keyboard and output devices 1202 receiving computer screen data or audio data from controller 1232.

The computing apparatus 1200 further includes an unsecured computing device (UCD) 1226, for example the user's existing unsecured computing device itself including an internal storage device 1240. Peripheral input devices 1254 provide user inputs to the UCD 1226. Output devices 1208 display computer screen or play audio for the user.

The user, whom shall be referred to herein as Alice, communicates securely with a remote user, Bob 1264, using session keys received from a key distribution service (KDS) provider 1260. The UCD 1226 is connected to Bob 1264 and the KDS provider 1260 via the Internet 1230.

As in the computing apparatuses of the previously described embodiments, the DPM 1250 also includes a communication link which includes a first unidirectional link 1212 for transferring data from the user's computer system to the data handling device and a second unidirectional link 1216 for transferring data from the data handling device to the user's computer system, specifically the first unidirectional link 1212 is configured to transfer data from the PCD 1214 to the DSU 1244 and the second unidirectional link is configured to transfer data from the DSU 1244 to the PCD 1214. The first unidirectional link 1212 includes a hardware encryption module 1218 and the second unidirectional link 1216 includes a hardware decryption module 1220.

The computing apparatus 1200 also includes a third unidirectional link 1224 for transferring data from the UCD 1226 to the PCD 1214, a fourth unidirectional link 1204 for transferring screen data from the PCD 1214 to the controller 1232, a fifth unidirectional link 1242 for transferring screen data from the DSU 1242 to the controller 1232, a sixth unidirectional link for transferring data from the IPU 1236 to the DSU 1244, a seventh unidirectional link 1222 for transferring data from the IPU 1236 to the PCD 1214, and an eighth unidirectional link 1238 for transferring data from the DSU 1244 to the UCD 1226.

In the described embodiment, the DPM 1250 is employed to protect pre-shared keys and key encryption keys (KEKs) shared with the key distribution service (KDS) provider 1260, as well as session keys that are delivered by the KDS provider 1260.

The KDS provider 1260 delivers session keys to registered users who wish to communicate securely. According to the described embodiment, to do this, the KDS provider 1260 first shares pre-shared keys with all its registered users. For example, a pre-shared key may be preinstalled inside the DPM 1250 before handing the module to a user, or the pre-shared key may be provided to users during registration. One example method may be to use a webcam that is connected to the IPU 1236 to scan a bar code or QR code that automatically inputs a pre-shared key into the IPU 1236 during registration. Alternatively, the user may type a provided pre-shared key manually into the IPU 1236. KEKs may then be derived from the pre-shared key using a key derivation function. The pre-shared key and KEKs may be stored securely in the DSU 1234. Session keys that are received from the KDS provider are used in the DSU 1244 to encrypt messages that the user types into the IPU 1236.

In key distribution methods such as Kerberos, a KDS provider 1260 may use the KEKs to deliver session keys to registered users on-demand. The advantage of such methods is that they are not based on the public key infrastructure (PKI) and are therefore free from all the potential pitfalls of PKI. However, one disadvantage is that the pre-shared key, the KEKs, and the session keys should be stored in the user's computing devices, which are typically connected to the Internet and subject to spyware and cyberattacks. Attackers may use malware to compromise the security of the keys. In contrast, in the described embodiment, the DPM 1250 may be used to protect the keys from malware. Below explains how these keys may be used securely with the DPM 1250.

Figure 26:
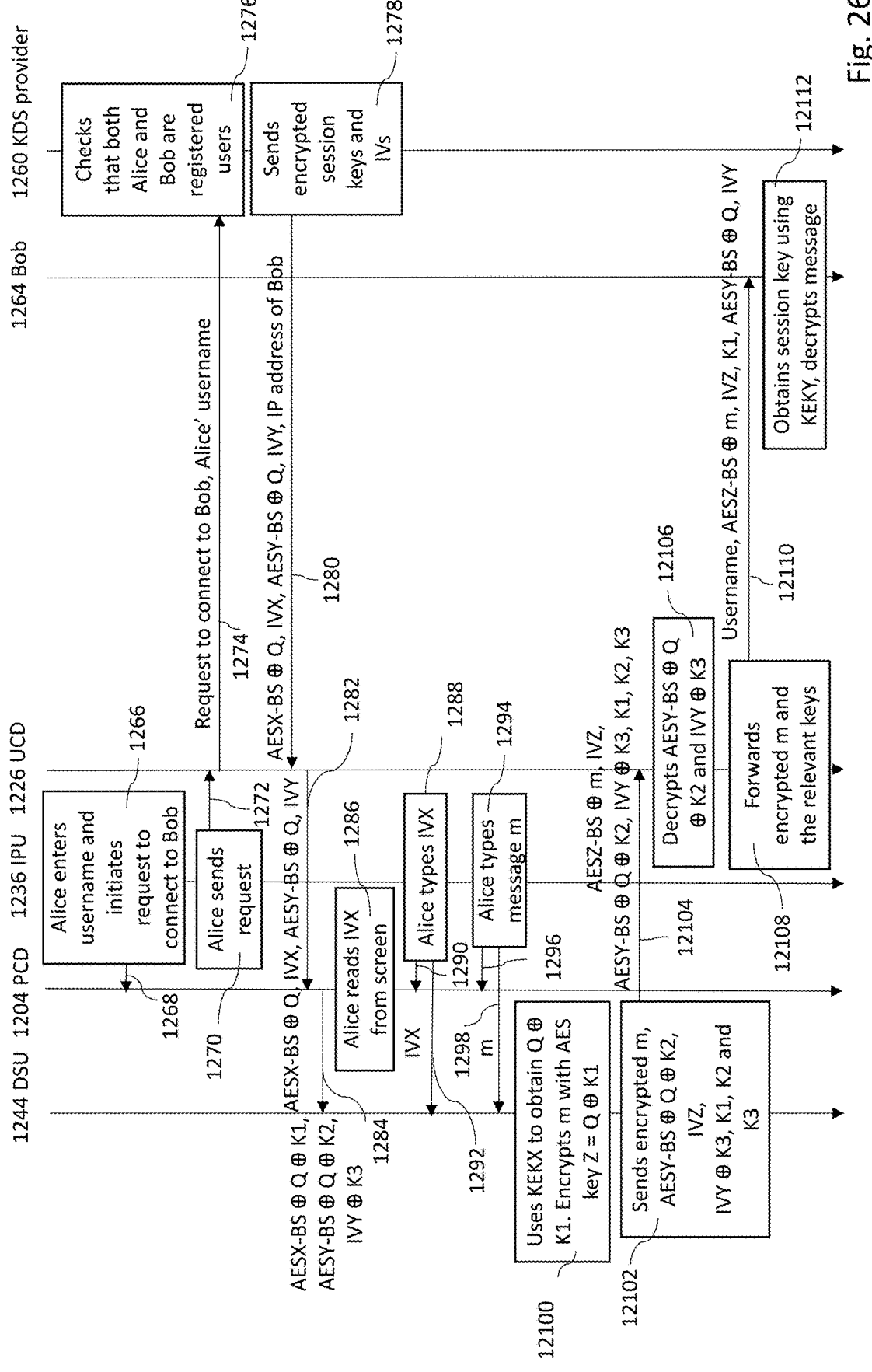
FIG. 26 illustrates a method involving the use of key delivery service for securely sending an encrypted message to a recipient using the computing apparatus of FIG. 25.

FIG. 26 illustrates an example method for Alice to securely send an encrypted message to Bob 1264 using a session key provided by the KDS provider 1260. Alice shares a key encryption key, KEKX, derived from her pre-shared key, with the KDS provider, while Bob shares a key encryption key, KEKY, derived from his pre-shared key, with the KDS provider. It is assumed that Alice and Bob have never interacted before, therefore they do not share any session key beforehand.

In step 1266, Alice enters her username and initiates a request to connect to Bob.

In step 1268, as Alice types on the keyboard, the IPU 1236 sends her keystrokes to the PCD 1214 via the seventh unidirectional link 1222 so that Alice can view what she typed on the monitor screen.

In step 1270, Alice sends her request.

In step 1272, the IPU 1236 forwards Alice's request to the UCD 1226 via the sixth unidirectional link 1234 and the eighth unidirectional link 1238.

In step 1274, the UCD 1226 forwards Alice's request to the KDS provider 1260 via the Internet 1230.

In step 1276, the KDS provider 1260 checks that both Alice and Bob are registered users. The KDS provider may require Alice to log into her user account (not shown).

In step 1278, the KDS provider 1260 then uses KEKX, that it shares with Alice and a randomly generated initialization vector, IVX, to create an AES bitstream, AESX-BS, using the symmetric cipher AES counter mode. The KDS provider 1260 then uses AESX-BS to encrypt a randomly selected session key Q by bitwise-XOR to obtain AESX-BS ⊕ Q. Using KEKY that it shares with Bob and another randomly generated initialization vector IVY, the KDS provider 1260 creates AESY-BS and uses it to encrypt the session key Q to obtain AESY-BS⊕Q.

In step 1280, the KDS provider 1260 sends AESX-BS⊕Q, IVX, AESY-BS⊕Q, IVY, and the IP address of Bob to Alice.

In step 1282, the UCD 1226 forwards AESX-BS⊕Q, IVX, AESY-BS⊕Q and IVY to the PCD 1204.

In step 1284, the PCD 1204 forwards AESX-BS⊕Q, AESY-BS⊕Q and IVY to the DSU 1244. As the data passes through the first unidirectional link 1212, they are encrypted by the hardware encryptor 1218 with keys K1, K2, and K3 to obtain AESX-BS⊕Q⊕K1, AESY-BS⊕Q⊕K2 and IVY⊕K3, respectively, assuming OTP-encryption.

In step 1286, the UCD 1226 displays IVX on the monitor screen. Alice reads the IVX from the screen.

In step 1288, Alice types the IVX, which could be a string of 12 characters (96 bits) on the keyboard connected to the IPU 1236.

In step 1290, Alice's keystrokes are sent to the PCD 1204 for her viewing.

In step 1292, the IVX is sent to the DSU 1244 via the sixth unidirectional link 1234.

In step 1294, Alice composes her message m in the IPU 1236.

In step 1296, Alice's keystrokes are sent to the PCD 1204 for her viewing.

In step 1298, when Alice is done, the IPU 1236 sends m to the DSU 1244 via the sixth unidirectional link 1234.

In step 12100, the DSU 1244 retrieves KEKX from memory and uses it with the IVX that it receives from the IPU 1236 to create the AES bitstream AESX-BS and uses it to decrypt AESX-BS⊕Q⊕K1 to obtain Q⊕K1. The DSU 1244 randomly generates another initialization vector IVZ and uses it and Z=Q⊕K1 as AES encryption key to create an AES bitstream AESZ-BS with AES counter mode. The DSU 1244 then performs bitwise-XOR on AESZ-BS and m to obtain the encrypted message AESZ-BS⊕m.

In step 12102, the DSU 1244 sends the encrypted message AESZ-BS⊕m together with IVZ, K1, AESY-BS⊕Q⊕K2, IVY⊕K3, K1, K2 and K3 to the UCD 1226.

In step 12104, the message is received by the UCD 1226 via the seventh unidirectional link 1222.

In step 12106, the UCD 1226 obtains AESY-BS⊕Q and IVY by decrypting using K2 and K3.

In step 12108, the UCD 126 sends out AESZ-BS⊕m together with IVZ, K1, AESY-BS #Q, IVY and Alice's username.

In step 12110, the data are sent to Bob 1264 over the Internet 1230.

In step 12112, upon receiving these from Alice, Bob can use his key encryption key, KEKY and IVY to decrypt AESY-BS⊕Q to obtain Q, use the obtained Q and K1 to create AESZ-BS, and then use AESZ-BS to decrypt AESZ-BS⊕m and obtain Alice's message m.

After that, Alice and Bob may continue to communicate securely until one of them terminates the session.

The example method described above may be modified in various ways to achieve the same goal of key protection and secure communication using session keys provided by a KDS provider. Without restriction on how the session keys are delivered to Alice and Bob, it is further envisaged that the KDS provider may employ other means of key delivery to the two users, for example, quantum key distribution.

Figure 27:
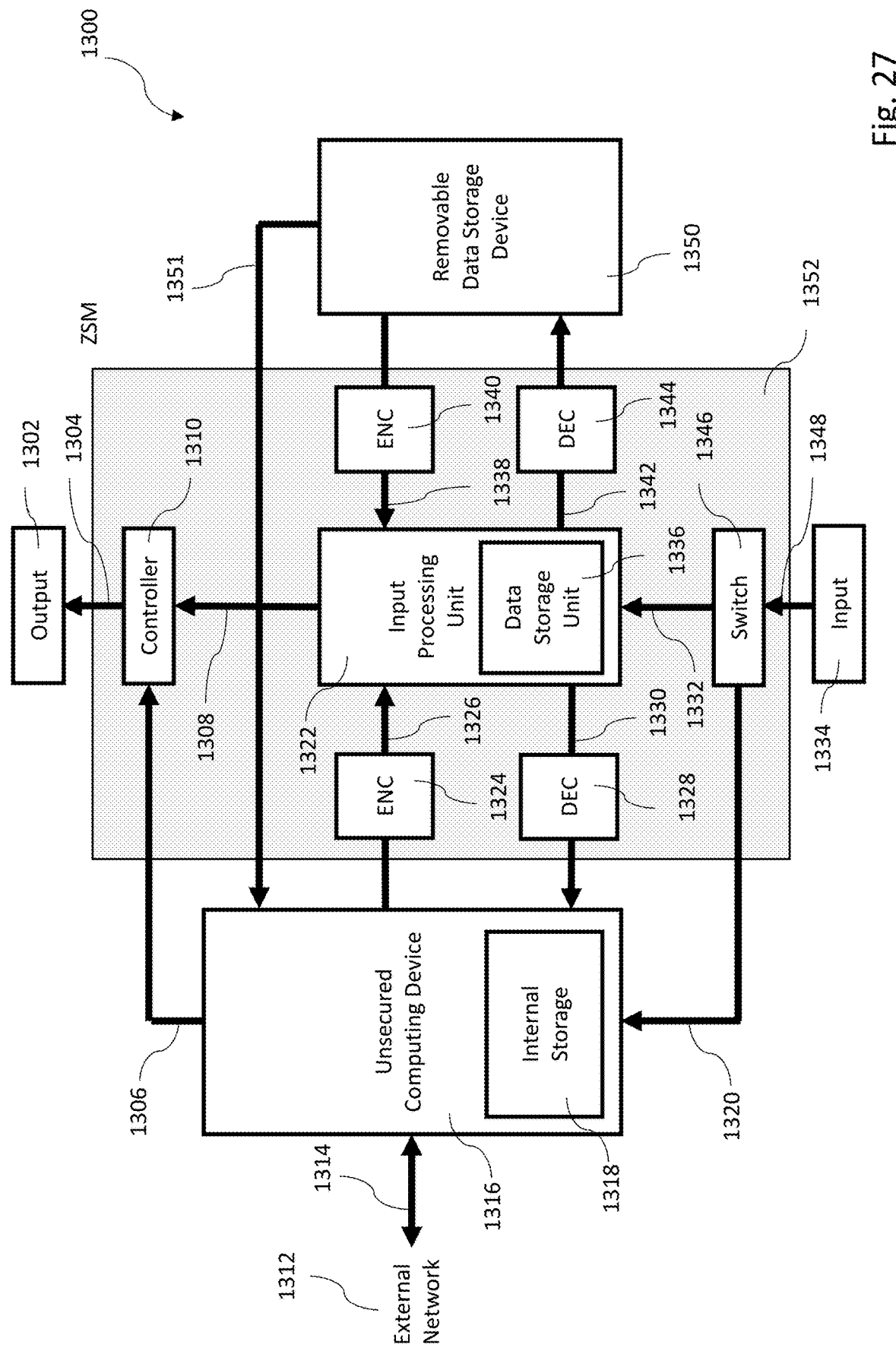
FIG. 27 illustrates a computing apparatus according to a thirteenth embodiment. The computing apparatus includes a Zone Separation Module (ZSM) in the form of a data storage product.

FIG. 27 illustrates a computing apparatus 1300 according to a thirteenth embodiment. The computing apparatus 1300 includes a Zone Separation Module (ZSM) 1352. The ZSM 1352 includes a data handling device in the form of a computing device (also called input processing unit, IPU) 1322 having an internal data storage unit (DSU) 1336; a controller 1310 and a selector switch 1346.

The computing apparatus 1300 further includes a networked computer system in the form of an unsecured computing device (UCD) 1316 having an internal storage device 1318 and in two-way connection with an external network 1312, a removable storage device 1350, peripheral input devices 1334 sending user inputs to the selector switch 1346 and output devices 1302 receiving computer screen and/or audio data from the controller 1310.

The computing apparatus 1300 further includes a first communication link between the networked computer system and the data handling device which includes a first unidirectional link 1326 for transferring data from the UCD 1316 to the IPU 1322 and a second unidirectional link 1330 for transferring data from the IPU 1322 to the UCD 1316. The first unidirectional link 1326 includes a hardware encryption module 1324 and the second unidirectional link 1330 includes a hardware decryption module 1328.

The computing apparatus 1300 further includes a second communication link between the data handling device and the removable data storage device 1350 which includes a third unidirectional link 1338 for transferring data from the removable data storage device 1350 to the IPU 1322 and a fourth unidirectional link 1342 for transferring data from the IPU 1322 to the removable data storage device 1350. The third unidirectional link 1338 includes a hardware encryption module 1340 and the second unidirectional link 1342 includes a hardware decryption module 1344.

The computing apparatus 1300 further includes a fifth unidirectional link 1306 for transferring computer screen and/or audio data from the UCD 1316 to the controller 1310, a sixth unidirectional link 1351 for transferring data from removable storage device 1350 to the UCD 1316, a seventh unidirectional link 1320 from the selector switch 1346 to the UCD 1316, an eighth unidirectional link 1308 from the IPU 1322 to the controller 1310 for sending computer screen and/or audio data, and a ninth unidirectional link 1332 from the selector switch 1346 to the IPU 1322 for sending user input data to the IPU 1322.

Note that the ZSM 1352 may additionally include a plurality of supporting subsystems, components, cables, input/output interfaces, etc. that are not shown.

According to the described embodiment, the IPU 1322 is configured for taking in user input from peripheral input devices 1334, the DSU 1336 is for secure storage of data, the controller 1310 is for selecting the output to send computer screen and/or audio data to output devices 1302, and the selector switch 1346 is for the user to activate and deactivate the ZSM 1352 and decide which device to send user inputs to.

The ZSM 1352 is connected to the user's UCD 1316 via the four unidirectional links 1306, 1326, 1330, 1320. The fifth unidirectional link 1306 is for the UCD 1322 to send computer screen and/or audio data to the controller 1310 via interfaces such as HDMI, VGA, etc. In some embodiments, the UCD 1316 may have its own set of output devices, in which case the fifth unidirectional link 1306 and the controller 1310 may be omitted. In some embodiments, computer screen and/or audio data may be relayed to the controller 1310 through the IPU 1322 via the unidirectional links 1326 and 1308. In this case, the link 1306 may be omitted. As the data will be encrypted by the hardware encryptor 1324, the controller should decrypt the data before sending them to output devices 1302. The seventh unidirectional link 1320 is for the user to send inputs to the UCD 1316 when the ZSM 1352 is deactivated. In some embodiments, the UCD 1316 may have its own set of peripheral input devices, in which case the seventh unidirectional link 1320 and the selector switch 1346 may be omitted. In some embodiments, user inputs may be relayed to the UCD 1316 through the IPU 1322 via the unidirectional link 1330. In this case, the link 1320 may be omitted. The fifth unidirectional link 1326 is for the user to transfer data from the UCD 1316 to the IPU 1322. The hardware encryptor 1324 ensures that all files and data that traverse the fifth unidirectional link 1326 are encrypted before they enter the IPU 1322. As a result, malware from the UCD 1316 may not be able to perform any malicious action to the IPU 1322. The second unidirectional link 1330 is for the user to transfer data out of the IPU 1322 to the UCD 1316. It is unidirectional such that malware in the UCD 1316 will not be able to access the data stored in DSU 1336 from this link. A hardware decryptor 1328 may perform decryption on the data. Alternatively, decryption may be performed via software in the UCD 1316 and the hardware decryptor 1328 may be omitted.

According to the described embodiment, file transfer between the DSU 1336 and other devices, such as the UCD 1316 and the removable data storage device 1350, is initiated by the user. The user connects a removable data storage device 1350 such as a hard disk drive (HDD), a solid-state drive (SSD), etc. to the ZSM 1352. The may transfer files from the DSU 1336 to the removable data storage device 1350 for backup or for other purposes. The transfer is via the fourth unidirectional link 1342. The hardware decryptor 1344 may decrypt the files if instructed by the user. The user may also transfer files from the removable data storage device 1350 into the DSU 1336 via the third unidirectional link 1338. The hardware encryptor 1340 ensures that all files are encrypted before they enter the IPU 1322 via the third unidirectional link 1338. The sixth unidirectional link 1351 connecting the removable data storage device 1350 and the UCD 1322 is optional. It is not a part of the ZSM 1352. It may be included to enable the user to directly transfer files from the removable data storage device 1350 to the UCD 1316 without having the files pass through the IPU 1322. However, for use cases requiring high security, the unidirectional link 1351 should be disconnected or removed such that all files that are to be transferred from the removable data storage device 1350 to the UCD 1316 pass through the IPU 1322. This is to ensure that file transfer out of the removable data storage device 1350 is always initiated by the user through giving specific instructions via peripheral input devices 1334.

It will be appreciated that all important and sensitive data should be stored in the DSU 1336, which is protected from malware. The removable data storage device 1350 may serve as a portable backup of data in encrypted form (i.e., the hardware decryptor 1344 should not decrypt data during data transfer to the removable data storage device 1350).

The hardware encryptors 1324 and 1340, and the hardware decryptors 1328 and 1344, may be implemented in accordance with embodiments described above. The unidirectional links may be implemented with any method that ensures data flow in one direction and forbids data flow in the opposite direction. Examples include using data diodes such as optocoupler or optical isolator over an optical link or using unidirectional UDP over the Ethernet, unidirectional UART or any proprietary unidirectional data transfer protocol.

It should be appreciated that the computing apparatus 1300 is separated into an "unsecured zone" that is directly connected to and accessible via the Internet (i.e., the networked computer system) and a "secure zone" that is isolated from the Internet (the removable storage device). Conventionally, such separation is realized by an air gap between the two zones. However, disallowing data movement across the two zones makes the air gap method impractical in most work environments. In some conventional implementations, users may be allowed to manually copy files from the unsecured zone to the secure zone using portable hard disks or other physical data storage media. This is not only inconvenient but also compromises security since there is a risk of introducing unknown and undetected malware such as ransomware into the secure zone.

In contrast, in the approach according to the described embodiment the user may be able to transfer files seamlessly across unsecured and secure zones without having to physically connect or disconnect any devices before or after the file transfer. Important data that are stored in encrypted form in the DSU 1336 may be protected from malware, including unknown and undiscovered spyware or ransomware.

Figure 28:
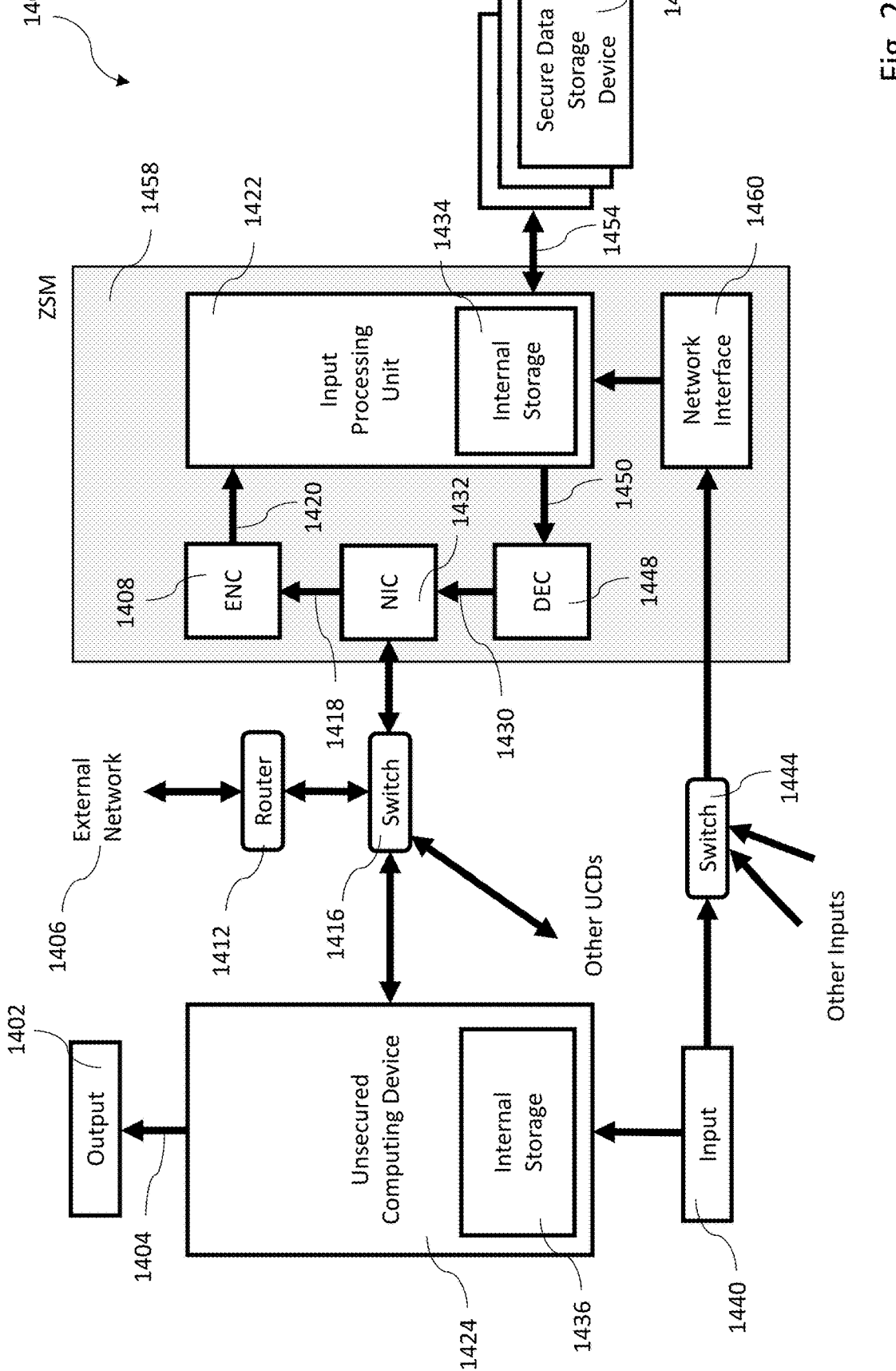
FIG. 28 illustrates a computing apparatus according to a fourteenth embodiment including a ZSM in the form of a network attached storage (NAS)

FIG. 28 illustrates a computing apparatus 1400 according to a fourteenth embodiment. The computing apparatus 1400 includes a Zone Separation Module (ZSM) 1458 in the form of a local area network attached storage (NAS).

The ZSM 1458 includes a data handling device in the form of a computing device (also called input processing unit, IPU) 1422 having an internal storage 1434; an interface 1460; and a network interface controller (NIC) 1432. The ZSM 1458 further includes a communication link between the NIC 1432 and the data handling device which includes a first unidirectional link 1418, 1420 for transferring data from the NIC 1432 to the IPU 1422 and a second unidirectional link 1430, 1450 for transferring data from the IPU 1422 to the NIC 1431. The first unidirectional link 1418, 1420 includes a hardware encryption module 1408 and the second unidirectional link 1430, 1450 includes a hardware decryption module 1448.

The IPU 1422 is in two-way communication with one or more secure data storage devices 1456 which are also included in the computing apparatus 1400.

The computing apparatus 1400 further includes a networked computer system in the form an unsecured computing device (UCD) 1424 having an internal storage device 1436, peripheral input devices 1440 and output devices 1402. Although other unsecured computing devices are not shown in FIG. 28, the UCD 1424 may be one of several included in the computing apparatus 1400.

The computing apparatus 1400 also includes a first network switch 1416 in two-way connection with both the NIC 1432 and the UCD 1424 (as well as other UCDs not shown). A first router is also included in the computing apparatus 1400 which is in two-way connection with the first network switch 1416 and an external network 1406.

It will be appreciated that the NIC 1432 is in two-way connection with the UCD 1424 via the first network switch 1416 and, as such, the first unidirectional link 1420 the second unidirectional link 1450 form part of a communication link between the data handling device and the networked computer system.

The computing apparatus 1400 further includes a second network switch 1444 via which peripheral input devices 1440 may be configured to transmit user input data to the network interface 1460. The network interface 1460 relays all the user inputs to the IPU 1422. The peripheral input devices 1440 may be designed, configured, and operated similar to the new PID in FIGS. 11 and 12.

In the described embodiment, users may store data securely in the one or more data storage devices 1456 that are connected to the IPU 1422. The IPU 1422 may also be connected to a virtualized data storage. The link 1454 is a two-way link. It should be appreciated that as long as the files are transferred and stored in encrypted form, both the IPU 1422 and the secure data storage devices 1456 may remain free from malware.

The network interface controller (NIC) 1432 enables the ZSM 1458 to be connected to the first network switch 1416 or, alternatively, the ZSM 1458 may be directly connected to the router 1412 in a local area network (LAN). The connection between the NIC 1432 and the first network switch 1416 may be implemented with Ethernet or Wi-Fi or any other suitable communication technology. Multiple users may transfer files between their respective UCD 1424 and the one or more secure data storage devices 1456 via the ZSM 1458 over this network connection. User inputs to the ZSM interface 1460, for example via the peripheral input device 1440 are sent via the second network switch 1444 forming part of an internal network. The internal network connections may be implemented with Wi-Fi or other wired or wireless means of communication such as Bluetooth, USB, Ethernet, etc. It is important that user inputs to the ZSM 1458 via the peripheral input device 1440 are not routed via the first network switch 1416 because the first network switch 1416 may experience malware attacks coming from the UCD 1424. There is also possibility of cyber-attacks coming from the external network 1406 that may compromise the security of the user inputs if routed through the first network switch 1416. In other words, user input data should be sent to the ZSM 1458 via an internal network that is free from malware.

Figure 29:
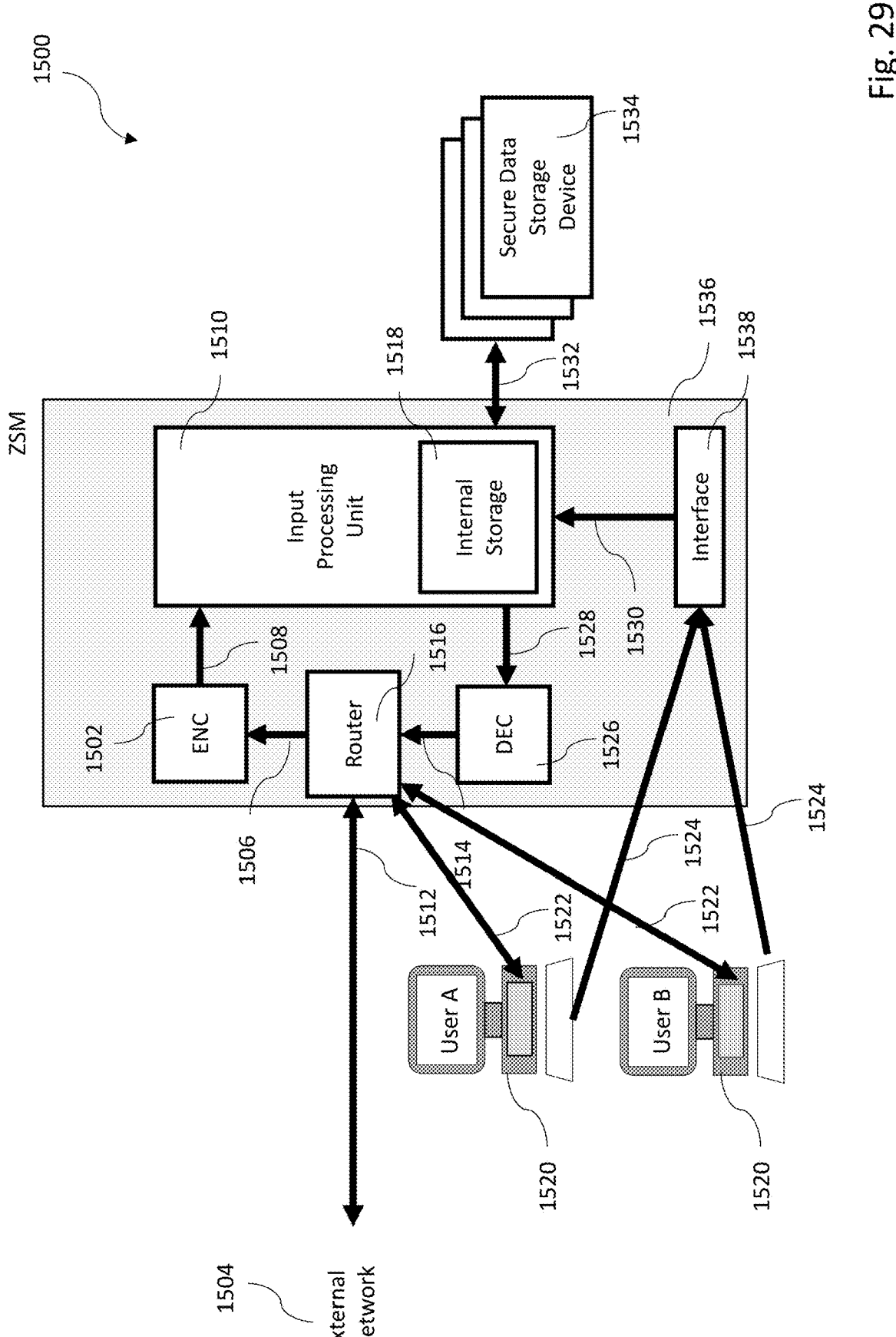
FIG. 29 illustrates a computing apparatus according to a fifteenth embodiment including a ZSM including integrated network switching or routing facilities.

FIG. 29 illustrates a computing apparatus 1500 according to a fifteenth embodiment. The computing apparatus 1500 includes a Zone Separation Module (ZSM) 1536 that is identical to the ZSM 1458 in the computing apparatus 1400 of the fourteenth embodiment but with a router integrated into the module.

The ZSM 1536 includes a data handling device in the form of a computing device (also called input processing unit, IPU) 1510 having an internal storage 1518; a network interface 1538; and an integrated router 1516. It should be appreciated that the integrated router 1516 may be substituted by a network switch or other suitable networking device without affecting the intended functions of the ZSM 1536. The ZSM 1536 further includes a communication link between the integrated router 1516 and the data handling device which includes a first unidirectional link 1508 for transferring data from the integrated router 1516 to the IPU 1510 and a second unidirectional link 1528 for transferring data from the IPU 1510 to the integrated router 1516.

The first unidirectional link 1508 includes a hardware encryption module 1502 and the second unidirectional link 1528 includes a hardware decryption module 1526.

The IPU 1510 is in two-way communication with one or more secure data storage devices 1534 which are also included in the computing apparatus 1500.

Further, the computing apparatus 1500 includes as an example two computer systems 1520 which are each in two-way connection with the integrated router 1516 and the network interface 1538. The integrated router is also in two-way connection with an external network 1504. There may be more computer systems or network switches (not shown) connected to the integrated router 1516.

It will be appreciated that, via the integrated router 1516, the first unidirectional link 1508 and the second unidirectional link 1528 form part of a communication link between the data handling device and each of the two computer systems 1520.

Thus, multiple users may connect to the same ZSM 1536 via the integrated router 1516. As in the fourteenth embodiment, commands are transmitted from peripheral input devices of the computer systems 1520 to the IPU 1510 via an internal secure channel 1524 and the dedicated network interface 1538. This ensures that commands that are sent to the IPU 1510 via the network interface 1538 are from the users. Malware might successfully compromise one or more of the two computer systems 1520 and even the integrated router 1516, but it may be unable to access data stored in the secure data storage devices 1534.

Figure 30:
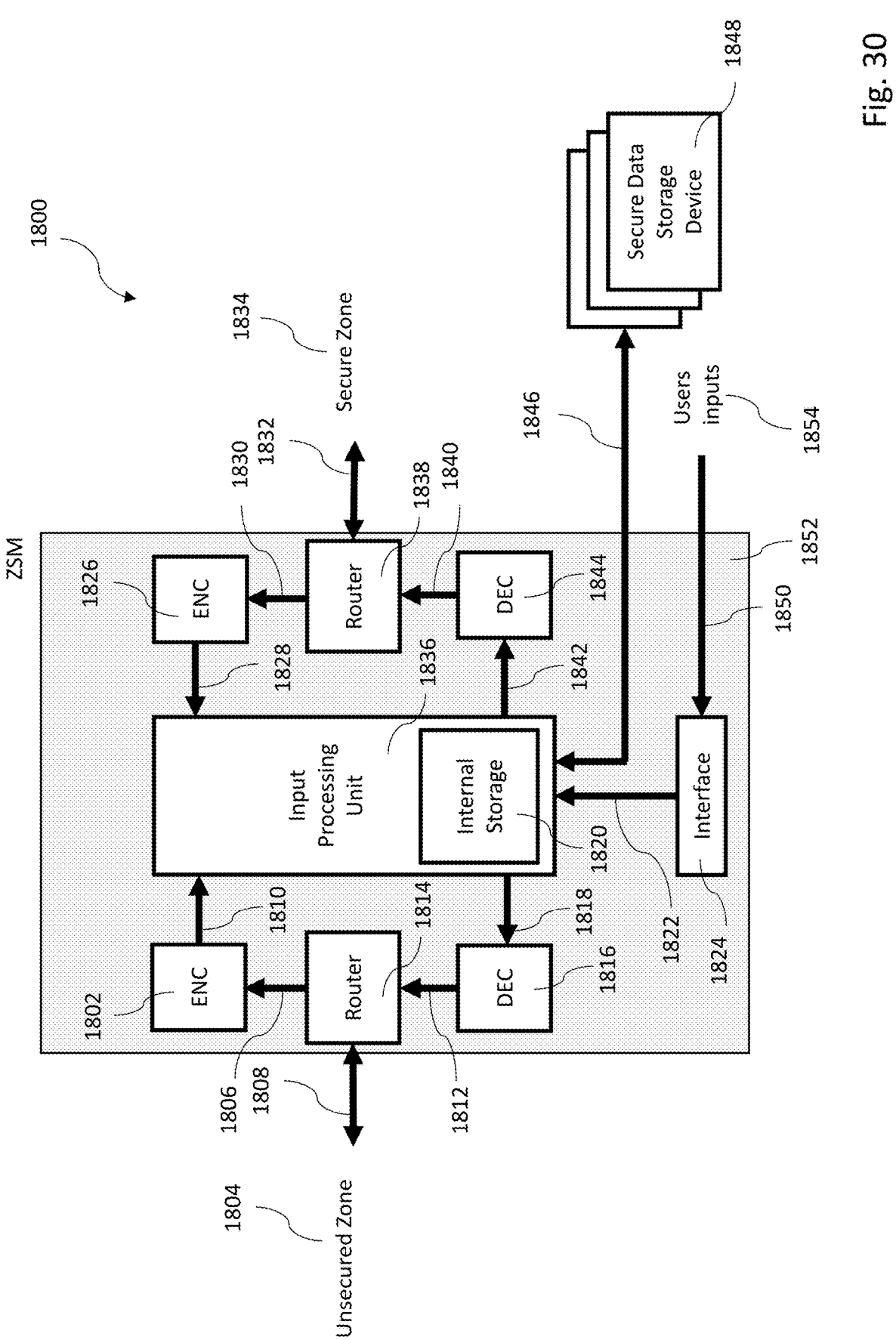
FIG. 30 illustrates a computing apparatus according to a sixteenth embodiment in which a ZSM serves as a bridge between two network zones having different security and privacy requirements.

FIG. 30 illustrates a sixteenth embodiment similar to the fourteenth and fifteenth embodiments in which a ZSM 1852 serves as a bridge between two networks, an unsecured zone network 1804 and a secure zone network 1834. There are two integrated routers or network switches 1814, 1838 in the ZSM 1852. A first integrated router or network switch 1814 connects to the unsecured zone network 1804, while a second integrated router or network switch 1838 connects to the secure zone network 1834. Two respective communication links each including first hardware encrypted unidirectional link from the respective one of the two integrated routers or network switches 1804, 1838 to the IPU 1836 and a second unidirectional link from the IPU 1836 to the respective one of the two integrated routers or network switches 1804, 1838 is also included in the ZSM 1852. User inputs to the IPU 1836 are transmitted via a dedicated link 1850 and network interface 1824 that may be implemented with a suitable communication method such as Wi-Fi, Ethernet, Bluetooth, etc. Similar to the fourteenth and fifteenth embodiments, secure data storage devices 1848 are connected to the IPU 1836 via a link 1846 for users to store important data. Functions that have already been described in the fourteenth and fifteenth embodiments are not repeated here, for brevity.

Figure 31:
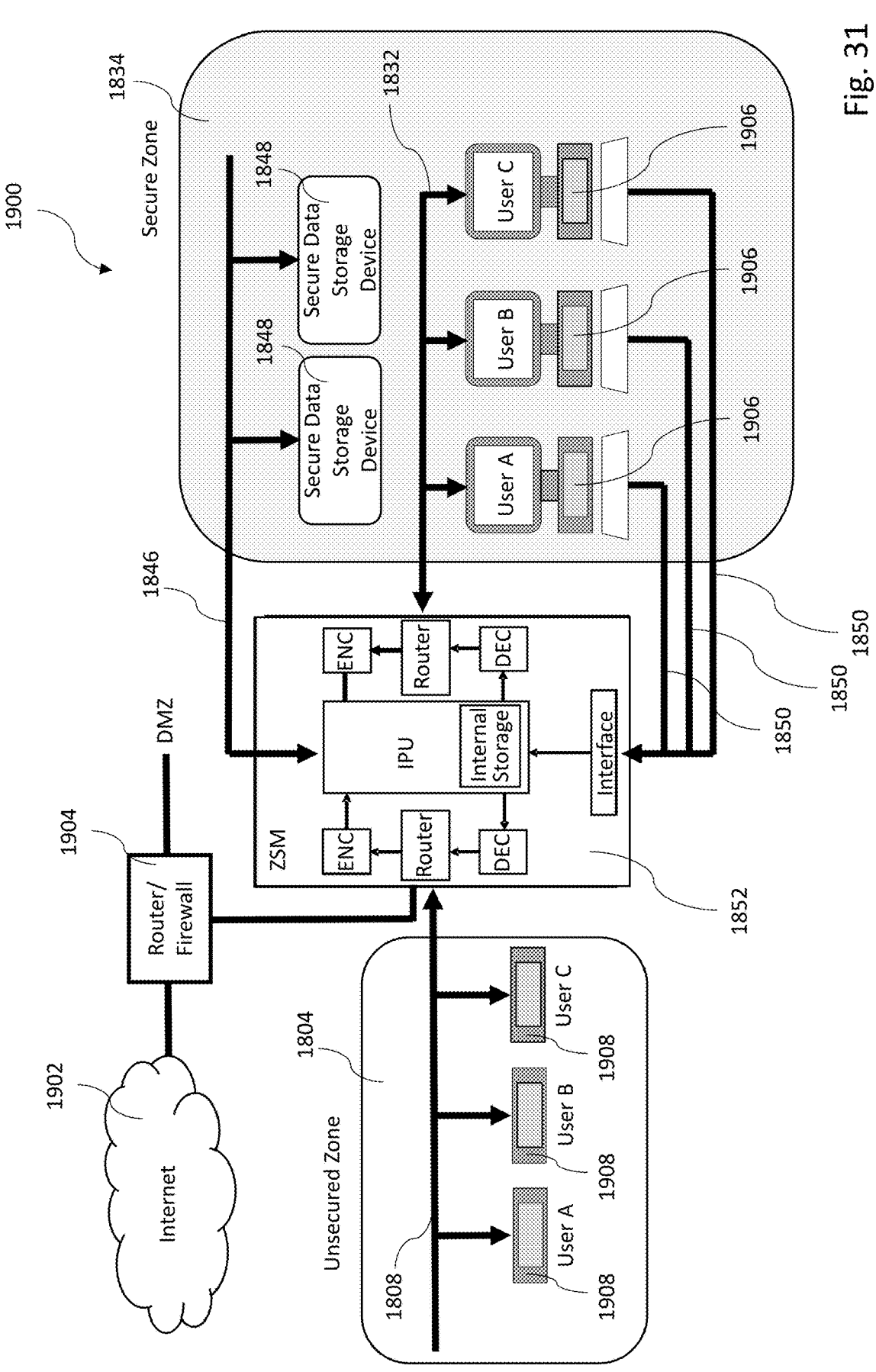
FIG. 31 illustrates a network architecture according to a seventeenth embodiment in which the computing apparatus of FIG. 30 separates a network into an unsecured zone network and a secure zone network.

FIG. 31 illustrates a seventeenth embodiment in which a ZSM 1852 separates a network 1900 into an unsecured zone network 1808 and a secure zone network 1834. Both the unsecured zone network 1808 and the secure zone network 1834 are within the perimeter protected by a conventional firewall 1904. While the unsecured zone network 1808 may be exposed to malware and cyberattacks coming from the Internet 1902, the secure zone network 1834 is isolated from the Internet 1902 through use of the ZSM 1852.

In the secure zone network 1834, each user operates a personal computing device (PCD) 1906 and saves important files in secure data storage devices 1848 that are connected to the IPU 1836 of the ZSM 1852 via the bidirectional communication link 1846. The files are stored in encrypted form together with the keys needed for decryption, according to the disclosed invention. The secure data storage devices 1848 may also be virtualized for better manageability.

User instructions to move files between the two zones are sent to the ZSM 1852 via dedicated connections 1850. The users also send commands to UCDs 1908 placed in the unsecured zone network 1808 to access the Internet 1902. The commands may be relayed to the UCDs 1908 through the ZSM 1852 via the link 1808. The method of relaying commands to the UCDs 1908 is very similar to the second and third embodiments, using new PIDs, network switches and/or relay devices, as described in association with FIG. 10, FIG. 11, and FIG. 12 and therefore shall not be described again here.

Computer screen and/or audio data from the UCDs 1908 may be delivered to the output devices, for example monitor displays, of the PCDs 1906 via the ZSM 1852. For example, one possible path may be through the connection 1808, the unidirectional links 1806, 1810, 1842, 1840 and through the connection 1832. The data may undergo encryption at the hardware encryption module 1802 and decryption at the hardware decryption module 1844. Another possible route to deliver this data to the output devices of the UCDs 1908 may be via making appropriate modifications according to the methods described in the thirteenth embodiment. They shall not be described again here for brevity.

All computing devices in the unsecured zone network 1808 as well as the secure zone network 1834 may have antivirus software installed in them and preferably, users also exercise caution when transferring files from the unsecured zone network 1808 into the secure zone network 1834 because untrusted files may contain malware such as spyware and ransomware. Nevertheless, by virtue of the disclosed invention, when hit by ransomware, important files that are stored in the secure data storage devices 1848 in the secure zone network 1834 may remain protected from the attack. Spyware may also be unable to transfer data out of the secure zone network 1834 as it has no direct path out to the Internet 1902. File movements out of the ZSM 1852 require user consent received via the user input network 1850, according to the disclosed invention.

Figure 32:
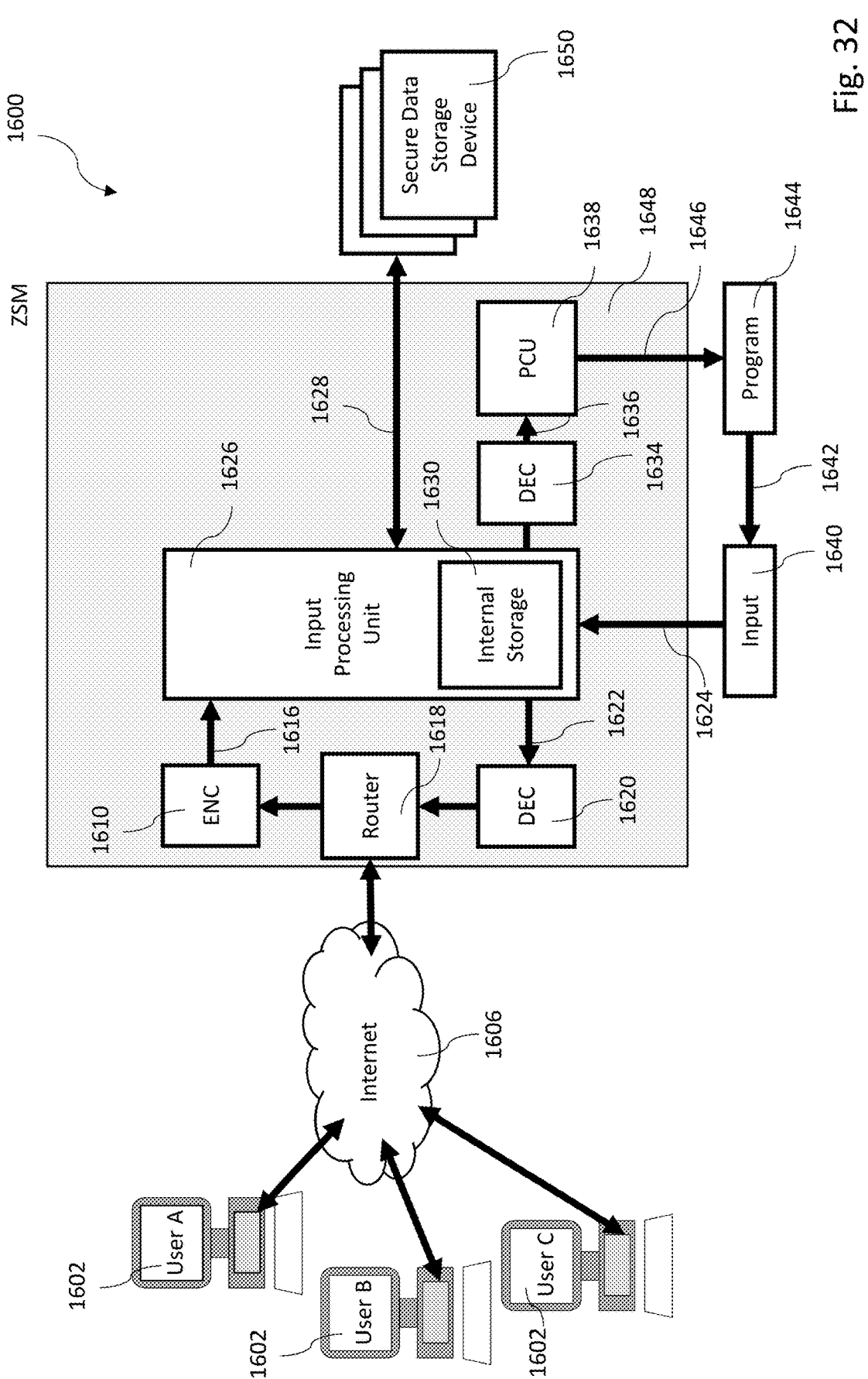
FIG. 32 illustrates a computing apparatus according to an eighteenth embodiment including a ZSM configured as a file server in a cloud computing environment.

FIG. 32 illustrates a computing apparatus 1600 according to an eighteenth embodiment. The computing apparatus 1600 includes a Zone Separation Module (ZSM) 1648 that is configured as a file server in a cloud computing environment.

The ZSM 1648 includes a data handling device in the form of a computing device (also called input processing unit, IPU) 1626 having an internal data storage 1630; a private computing unit (PCU) 1638; and an integrated router 1618. The ZSM 1648 further includes a communication link between the integrated router 1618 and the data handling device which includes a first unidirectional link 1616 for transferring data from the integrated router 1618 to the IPU 1626 and a second unidirectional link 1622 for transferring data from the IPU 1626 to the integrated router 1618. The first unidirectional link 1616 includes a hardware encryption module 1610 and the second unidirectional link 1622 includes a hardware decryption module 1620.

The ZSM 1648 also includes a third unidirectional link 1636 for transferring data from the IPU 1626 to the PCU 1638. The third unidirectional link 1636 includes a hardware decryption module 1634. The hardware decryption module 1634 may be omitted as decryption may be performed in the PCU 1638 using software.

The IPU 1626 is in two-way communication with one or more secure data storage devices 1650 which are also included in the computing apparatus 1600. Also included in the computing apparatus 1600 are a peripheral input device 1640 for providing inputs to the IPU 1626 and a processor 1644 which may be external to the ZSM 1648 for executing a computer program and a further unidirectional link 1646 for transferring data from the PCU 1638 to the processor 1644. A fifth unidirectional link 1642 is also provided in the computing apparatus 1600 for sending commands to the peripheral input device 1640. The commands are received by the ZSM 1648 via the connection 1624.

Further, the computing apparatus 1600 includes as an example three computer systems 1602 which are each in two-way remote connection with the integrated router 1618 via the Internet 1606. It should be appreciated that there may be other computer systems that are connected to the integrated router 1618 which are not shown in FIG. 32.

It will be appreciated that, via the integrated router 1618, the first unidirectional link 1616 and the second unidirectional link 1622 form part of a communication link between the data handling device and each of the three computer systems 1602.

Thus, the ZSM 1648 is implemented as a file server in the cloud such that it can be remotely accessed by a plurality of geographically dispersed users. The users at the three computer systems 1602 may use either secure thin clients (described below) or secure thick clients (for example, as illustrated in FIG. 17) to access the ZSM 1648 to store files in encrypted form in secure data storage devices 1650 and retrieve them when desired. The clients may utilize standard secure protocols such as secure shell (SSH), transport layer security (TLS), IPsec, etc. to communicate with the ZSM 1648 on top of the security protocols implemented with the use of DPM 740.

In the described embodiment, commands to the ZSM 1648 are encrypted at the users' computing devices 1602 before being sent over the Internet 1606. The use of DPM 740 at the users' computing devices 1602 may protect the commands from malware. At the ZSM 1648, all incoming data received by the integrated router 1618 are directed to the hardware encryptor 1610 for encryption before they enter the IPU 1626 via the unidirectional link 1616. The IPU 1626 logs the encrypted commands and the encryption keys used by the hardware encryptor 1610 for future audit or forensic purposes. Data to be stored may be sent to the secure data storage devices 1650. Encrypted commands and the corresponding decryption keys retrieved from the internal storage 1630 are sent to the hardware decryption module 1634 for decryption. In some embodiments, the hardware decryption module 1634 may be omitted and the decryption may be performed in the PCU 1638 by software.

The decrypted commands are sent to the PCU 1638 which authenticates the commands and upon successful authentication outputs them to an external processor 1644 running a computer program via the further unidirectional link 1646. It is important to authenticate the commands to prevent cybercriminals from attempting to exfiltrate the data stored in the secure data storage devices 1650. According to the described embodiment, the computer program that is run external to the ZSM 1648 replaces the human user described in other embodiments. It analyses the commands before sending them to the IPU 1626 for execution. The computer program 1644 may send commands in response to data it receives from the PCU 1638. The computer program 1644 may be rule-based or AI-based to monitor the behaviour of remote users and it may block commands if it detects suspicious activities. Additional security measures may include restricting the types of commands that can be executed in the IPU 1626, having latest antivirus software installed in the PCU 1638 and the external processor 1644, etc.

It should be appreciated that in all the embodiments described herein, peripheral input devices may receive commands from either humans or computer programs that make decisions, including giving consent to file transfers, etc., depending on the design of the overall system.

Figure 33:
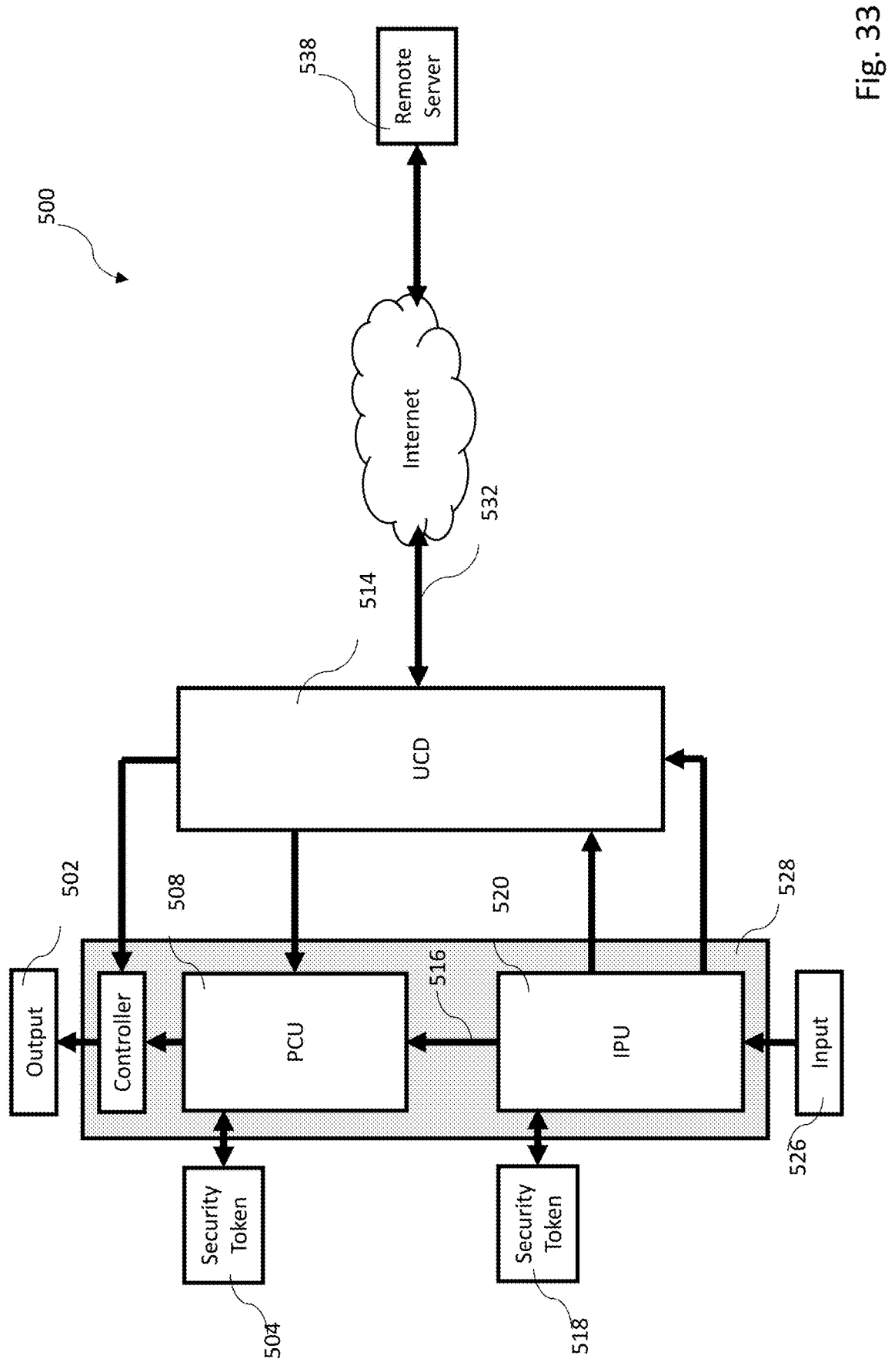
FIG. 33 illustrates a secure thin client which may be employed by a user to access a remote server, for example, the file server of FIG. 32.

FIG. 33 illustrates a secure thin client 528 which may be employed by a user, for example the users at computer systems 1602 to access a remote server 538, for example the file server implemented with ZSM 1648 in the eighteenth embodiment. The secure thin client 528 consists of an IPU 520 that takes in and encrypts commands to be sent to the remote server 538 and a PCU 508 that decrypts and displays received virtual desktop images on an output device 502 such as a monitor. The secure thin client 528 in this embodiment does not contain an UCU but it is connected to the user's personal unsecured computing device (UCD) 514 that has an Internet connection 532. Alternatively, the secure thin client 528 may be connected to a gateway device that enables it to access the Internet 532. In this embodiment, the user may view virtual desktop images received from a remote server 538 but is not allowed to save any data locally. As such, there is no DSU in this embodiment. Security tokens 504 and 518, such as password-protected smartcards, HSMs, etc. may be used to store the user's cryptographic keys.

Figure 34:
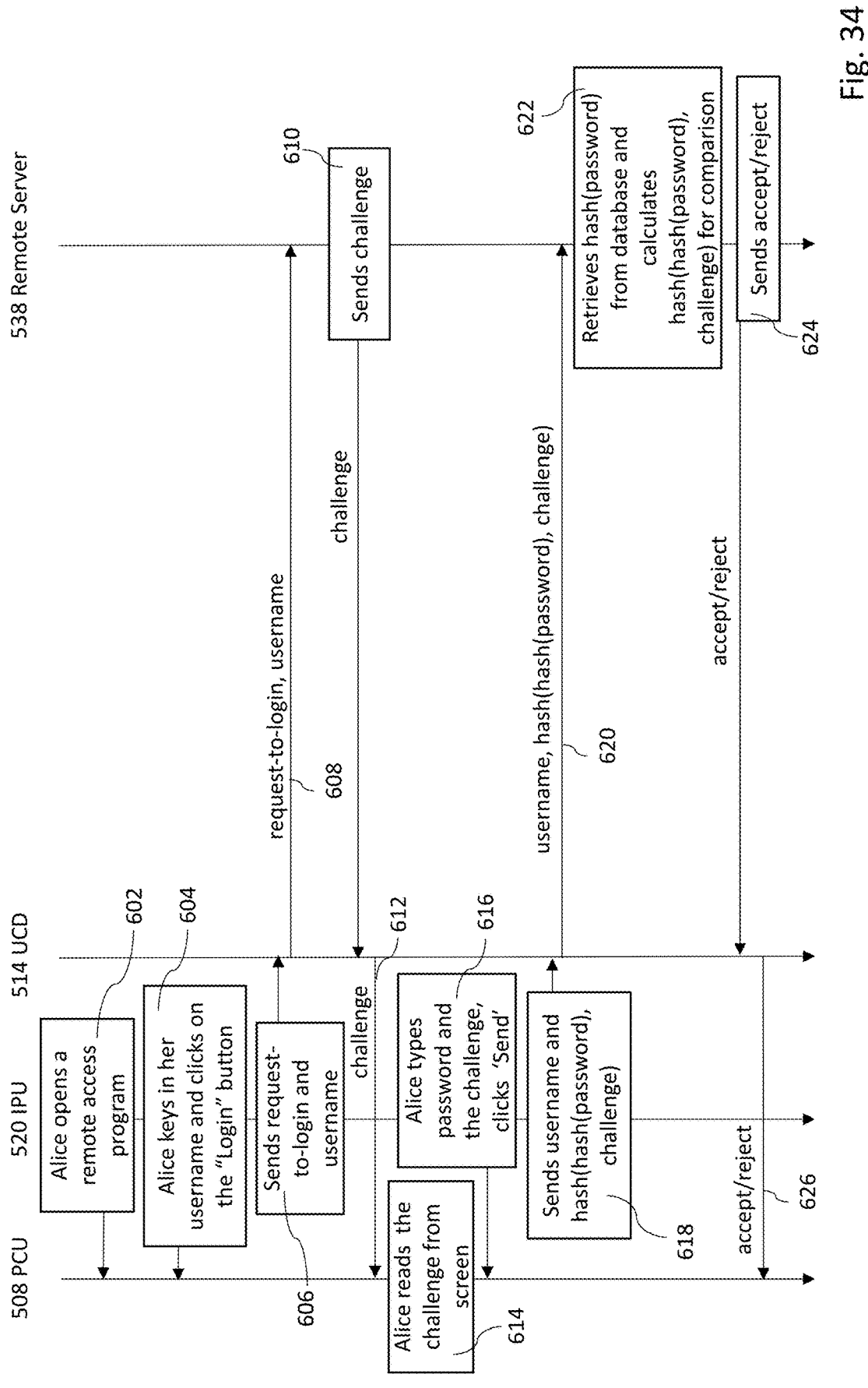
FIG. 34 illustrates a method of logging into a remote server using the secure thin client of FIG. 33.

FIG. 34 describes how a user, Alice, may securely login to the remote server 538 from her thin client implemented with the secure thin client 528.

In step 602, under the Secure Mode, Alice opens a remote access program in the IPU 520 and the PCU 508. She inputs her commands to the IPU 520 using keyboard and mouse 526 and views what she typed on the computer screen 502 connected to the PCU 508.

In step 604, Alice keys in her username and clicks on the 'Login' button.

In step 606, the IPU 520 sends Alice's request-to-login with her username to the UCD 514.

In step 608, the UCD 514 forwards Alice's request message to the remote server 538.

In step 610, upon receiving Alice's request message, the remote server 538 proceeds to verify that the username corresponds to a registered user. Upon successful verification, the remote server 538 sends a reply which contains a challenge or nonce to the UCD 514. In some embodiments, the challenge may be sent to Alice's mobile phone for two-factor authentication. Thus, the remote server 538 acts as a verifier in the present embodiment.

In step 612, the UCD 514 forwards the received challenge to the PCU 508 for it to display on screen 502.

In step 614, Alice reads the challenge from the screen 502.

In step 616, Alice inputs her password and the challenge using keyboard and mouse 526 connected to the IPU 520 and clicks 'Send'. In some embodiments, the password may be stored in the internal storage (not shown) of the IPU 520 or in a security token 518 that is connected to the IPU. In these embodiments, the user may not need to input her password manually.

In step 618, the IPU 520 hashes the password to obtain hash (password) and hashes the hash of the password together with the challenge to obtain H=hash (hash (password), challenge). The IPU 520 sends the username and the final hash H to the UCD 514.

In step 620, the UCD 514 forwards the message to the remote server 538.

In step 622, the remote server 538 retrieves the stored hash (password) for the username from internal database and calculates H'=hash (hash (password), challenge).

In step 624, if H' equals H, the remote server 538 sends an 'accept' message to the UCD 514. On the other hand, if H' is not equal to H, the remote server 538 sends a 'reject' message to the UCD 514.

In step 626, the UCD 514 forwards the 'accept/reject' message to the PCU 508 for display on screen 502.

Note that the type of hash algorithm to use should be predetermined or the IPU 520 would have to include this information in the message sent to the remote server 538.

The remote login process described above is just one example and is envisaged that the process may be modified in various ways.

After the user has successfully logged in, the remote server 538 starts sending encrypted virtual desktop images to the UCD 514. The UCD 514 forwards the images to the PCU 508 where they are decrypted and displayed on monitor screen 502.

The user may interact with the remote server 538 by keying in commands into the IPU 520. The commands are encrypted in the IPU 520 and sent to the UCD 514, which forwards them to the remote server 538.

The encryption and decryption keys may be pre-installed inside the secure thin client 528 before issuance of the secure thin client to the user, and so there is no need for the user and the remote server to perform key exchange. Alternatively, the keys may be provided to the user in the form of security tokens 504 and 518, such as password-protected smartcards, HSMs, etc. The security tokens may be renewed or updated regularly for greater security assurance.

Figure 35:
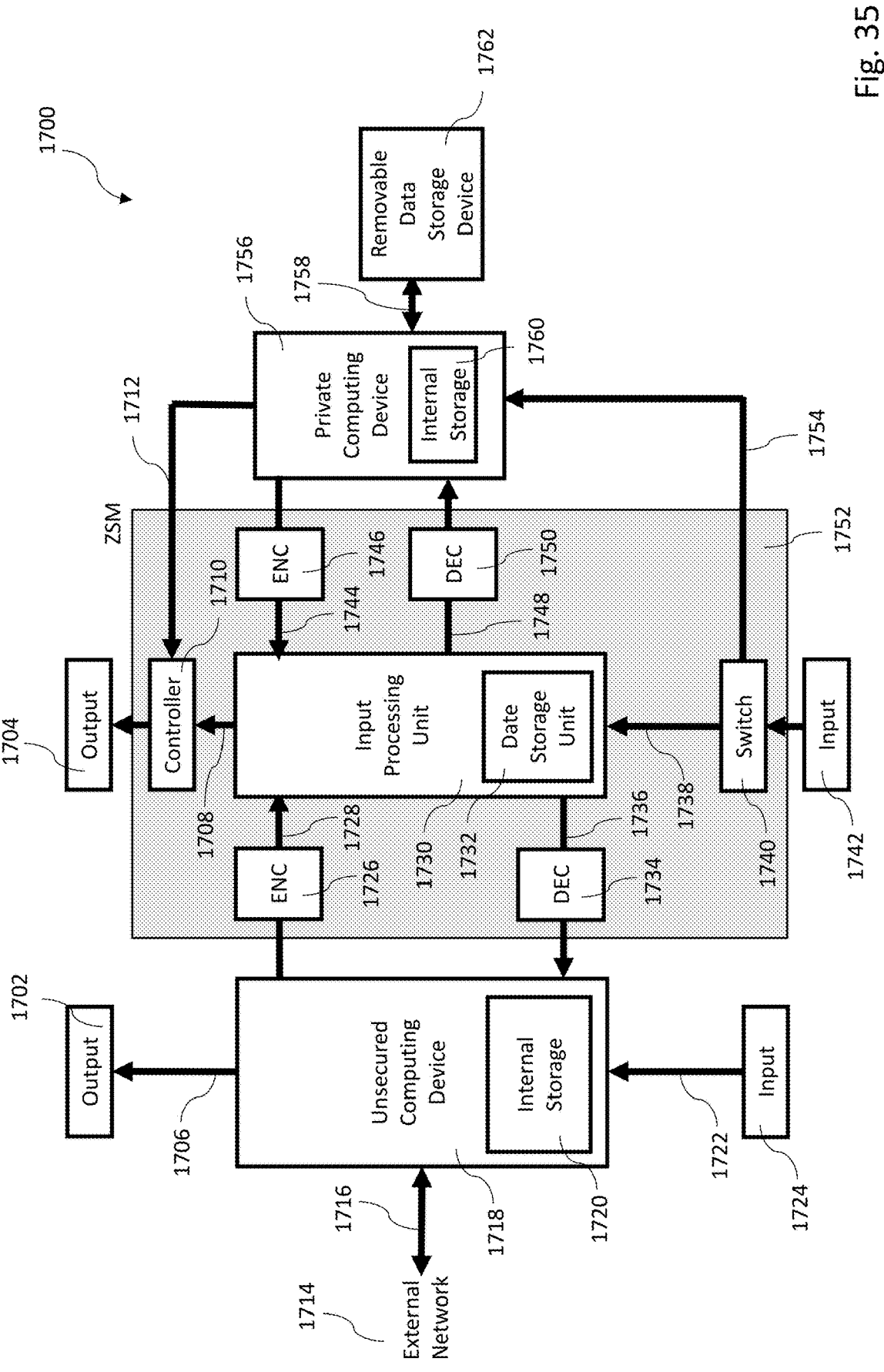
FIG. 35 illustrates a computing apparatus according to a nineteenth embodiment in which a ZSM serves as a bridge between two computer systems.

FIG. 35 illustrates a computing apparatus 1700 according to a nineteenth embodiment in which a ZSM 1752 serves as a bridge between two computer systems. A user may have one UCD 1718 for accessing the Internet and one PCD 1756 that is not connect to the Internet for private computing activities such as diary writing, viewing of personal photos and videos, writing confidential reports, etc. Two respective communication links each including a respective first hardware encrypted unidirectional link 1728, 1744 from the respective one of the two computer systems to the IPU 1730 and a respective second unidirectional link 1736, 1748 from the IPU 1730 to the respective one of the two computer systems. As already described above, preferably, the user stores all important data including personal diaries, photos, videos, reports, etc. in a DSU 1732 so that they may be protected from malware. In this embodiment, the user may transfer downloaded contents from the UCD 1718 to the PCD 1756 as well as private data from the PCD 1756 to the UCD 1718. Hardware encryptors 1726 and 1746 encrypt all files that enter the IPU 1730, ensuring that the IPU 1730 and the DSU 1732 incorporated within it are free from malware threat. The user may connect a removable data storage device 1762 to the PCD 1756 for backing up of files stored in the internal storage 1760 of the PCD 1756 or for other purposes. However, as described above, the PCU may not store important files in the internal storage 1760 or the removable data storage device 1762. Important files should be stored in the DSU 1732 which may be protected from malware. It is preferable to connect a dedicated backup storage device (not shown) to the IPU 1730 to back up the important files. Preferably, the backup storage device is not connected to other computer systems to enable its potentially malware-free status to be maintained.

The PCD 1756 may run a virtual machine (VM) so that it can be reset to its original state or snapshot whenever it is powered up. The user is free to save a new snapshot of the VM after installing new application software. So long as the user does not save important data in the VM, recovery from malware attacks, such as a ransomware attack, may be simple and straightforward. Other features of this nineteenth embodiment that are similar to the thirteenth embodiment are not described again here for brevity.

Having now fully described the invention, it should be apparent to one of ordinary skill in the art that many modifications can be made hereto without departing from the scope as claimed.

The invention claimed is:

1. A communication link for transferring data between a first computing device and a second computing device, comprising:

(i) a first unidirectional link for transferring data from the first computing device to the second computing device; and (ii) a second unidirectional link for transferring data from the second computing device to the first computing device; and (iii) a hardware encryption device configured to perform the encryption on the data transferred using the first unidirectional link, wherein the second computing device is comprised in a data handling device, wherein encryption is performed on the data transferred using the first unidirectional link to encrypt the data prior to being received at the second computing device, and the encrypted data is not decrypted within the second computing device, wherein the hardware encryption device is configured to generate random bits or receive random bits from the second computing device for use at the hardware encryption device as encryption keys, and wherein the hardware encryption device is configured not to provide the generated or received encryption keys to the first computing device.

2. The communication link according to claim 1, wherein the first computing device or the second computing device is a single computer or comprises two or more computers in communication with each other.

3. The communication link according to claim 1, wherein the first unidirectional link further includes a first data diode and the second unidirectional link includes a second data diode, wherein the first data diode is positioned between the first computing device and the hardware encryption device.

4. The communication link according to claim 3, wherein the second unidirectional link includes a hardware decryption device to decrypt data prior to being received at the first computing device, wherein the second data diode is positioned between the second computing device and the hardware decryption device.

5. The computing apparatus including at least one first computing device; a second computing device, and at least one communication link according to claim 1 for transferring data between the at least one first computing device and the second computing device.

6. The computing apparatus according to claim 5, wherein the at least one first computing device and the second computing device are communicatively connected only via the at least one communication link between them.

7. The computing apparatus according to claim 5, wherein the at least one first computing device is configured to transfer data out of the at least one first computing device only via the first unidirectional link of the at least one communication link.

8. The computing apparatus according to claim 5, wherein the second computing device is configured not to receive transferred data into the second computing device except via the first unidirectional link of the at least one communication link.

9. The computing apparatus according to claim 5, wherein the at least one first computing device is configured to receive transferred data into the at least one first computing device only via the second unidirectional link of the at least one communication link.

10. The computing apparatus according to claim 5, wherein the second computing device is configured to perform data handling operations only in accordance with its internal computer programs or instructions received through direct inputs from one or more peripheral input devices.

11. The computing apparatus according to claim 5, further comprising a network interface;

at least one third unidirectional link; and a fourth unidirectional link, wherein the at least one third unidirectional link is configured to transfer data from the network interface to the at least one first computing device, and wherein the fourth unidirectional link is configured to transfer data from the second computing device to the network interface.

12. The computing apparatus according to claim 11, further comprising a third computing device, wherein the third computing device is configured to send data to the at least one first computing device via the at least one third unidirectional link; and wherein the third computing device is configured to receive data from the second computing device via the fourth unidirectional link.

13. The computing apparatus according to claim 12, wherein only the fourth unidirectional link is provided between the third computing device and the second computing device, and wherein only the at least one third unidirectional link is provided between the at least one first computing device and the third computing device.

14. The computing apparatus according to claim 13, wherein the network interface is in bidirectional communication with the third computing device.

15. The computing apparatus according to claim 14, wherein the network interface is further configured to enable a plurality of additional computing devices to send data to the at least one first computing device via the at least one third unidirectional link, and to receive data from the second computing device via the fourth unidirectional link.

16. The computing apparatus according to claim 5, wherein the at least one first computing devices is connected to a network.

17. The communication link according to claim 1, wherein the second computing device is configured to perform data handling operations in accordance with its internal computer programs or instructions received through direct inputs from one or more peripheral input devices.

18. A computing apparatus for protecting data against malware, comprising:

a networked computer system;

a user computer system;

a data handling device;

a first unidirectional link, wherein the user computer system is configured to output data only via the first unidirectional link, and the data handling device is configured to receive data only via the first unidirectional link;

a second unidirectional link, wherein the data handling device sends data to the user computer system via the second unidirectional link;

a third unidirectional link for transferring data from the networked computer system to the user computer system;

a fourth unidirectional link for transferring data from the data handling device to the networked computer system;

a hardware encryption device configured to perform the encryption on the data transferred using the first unidirectional link; and at least one peripheral input device in communicative connection with the data handling device wherein encryption is performed on the data that pass through the first unidirectional link prior to the data being received by a computing device in the data handling device, and wherein the encrypted data are not decrypted within the computing device, wherein the hardware encryption device is configured to generate random bits or receive random bits from the networked computing system for use at the hardware encryption device as encryption keys, and wherein the hardware encryption device is configured not to provide the generated or received encryption keys to the user computing system.

19. The computing apparatus according to claim 18, wherein the data handling device is configured to receive data from the user computer system only in response to a command being received at the at least one peripheral input device.

20. The computing apparatus according to claim 18, wherein the data handling device is configured to store received data in encrypted form in the data handling device.

21. The computing apparatus according to claim 18, further comprising a storage device communicatively connected to the data handling device and wherein the data handling device is configured to transmit data received by the data handling device to the storage device in encrypted form for storage in the storage device.

22. The computing apparatus according to claim 18, wherein the data handling device is configured to transfer data out of the data handling device only in response to a further command being received at the at least one peripheral input device.

23. The computing apparatus according to claim 18, wherein the data handling device is configured to transfer a decryption key from the data handling device only in response to a decryption key transfer command being received at the at least one peripheral input device.

24. The computing apparatus according to claim 18, wherein the user computer system does not have access to an encryption key used in the encryption.

25. The computing apparatus according to claim 18, wherein the second computing device is configured to perform data handling operations in accordance with its internal computer programs or instructions received through direct inputs from one or more peripheral input devices.

26. A communication link for transferring data between a first computing device and a second computing device, comprising:

(i) a first unidirectional link for transferring data from the first computing device to the second computing device; and (ii) a second unidirectional link for transferring data from the second computing device to the first computing device; and (iii) a hardware encryption device configured to perform transformation on the data transferred using the first unidirectional link, wherein the hardware encryption device is configured to perform data transformation prior to the data being received at the second computing device, wherein and the first computing device does not have means to figure out the data transformation, wherein the transformed data is not reversed within the second computing device, wherein the hardware encryption device is configured to generate random bits or receive random bits from the second computing device for use at the hardware encryption device as keys, and wherein the hardware encryption device is configured not to provide the generated or received keys to the first computing device.

27. The communication link according to claim 26, wherein the second unidirectional link includes a hardware decryption device configured to reverse the data transformation before data is sent back to the first computing device.

28. The communication link according to claim 26, wherein the second computing device is configured to perform data handling operations in accordance with its internal computer programs or instructions received through direct inputs from one or more peripheral input devices.

* * * * *